United States Patent
Svantesson et al.

(10) Patent No.: US 11,863,314 B1
(45) Date of Patent: Jan. 2, 2024

(54) SYSTEMS AND METHODS FOR PER-SUB-BAND, PER-STREAM, AND PER-USER SELECTION OF MODULATION AND CODING SCHEMES INCLUDING SCHEDULING USING CHANNEL CONDITION METRICS INDICATIVE OF CHANNEL INTERFERENCE

(71) Applicant: Tarana Wireless, Inc., Santa Clara, CA (US)

(72) Inventors: Thomas Svantesson, Santa Clara, CA (US); Eric Pierre Rebeiz, Mountain View, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

(21) Appl. No.: 17/586,691

(22) Filed: Jan. 27, 2022

(51) Int. Cl.
*H04B 7/02* (2018.01)
*H04L 1/00* (2006.01)
*H04L 5/00* (2006.01)

(52) U.S. Cl.
CPC ............ *H04L 1/001* (2013.01); *H04L 1/0004* (2013.01); *H04L 1/0017* (2013.01); *H04L 5/0085* (2013.01)

(58) Field of Classification Search
CPC .... H04B 7/0417; H04B 7/063; H04B 7/0639; H04B 10/25; H04B 7/10; H04B 1/50; H04B 7/0695; H04B 1/401; H04B 7/088; H04B 7/0408; H04L 25/0242; H04L 25/0204; H04L 25/0224; H04L 27/01; H04L 5/0007; H04L 27/2636; H04L 25/03828; H04L 27/2601; H04L 1/0001; H04L 1/004; H04L 1/18; H01Q 1/50; H01Q 21/064; H01Q 21/065; H01Q 1/246; H01Q 1/48; H01Q 25/001; H01Q 25/005; H01Q 21/24;
(Continued)

(56) References Cited

U.S. PATENT DOCUMENTS

| | | | | |
|---|---|---|---|---|
| 8,184,752 B2 * | 5/2012 | Ko | ........................ | H04B 7/0639 375/267 |
| 9,577,700 B2 * | 2/2017 | Lea | ........................ | H01Q 1/246 |

(Continued)

OTHER PUBLICATIONS

Dahlman, Erik, et al., "4G: LTE/LTE-Advanced for Mobile Broadband", Orlando, FL, USA: Academic Press, Inc.,, 2011.

*Primary Examiner* — Jung Liu
(74) *Attorney, Agent, or Firm* — Stoel Rives LLP

(57) ABSTRACT

The present disclosure describes systems and methods for the granular, interference aware selection of modulation and coding schemes (MCS) per-sub-band, per-stream, and in some examples, per-user. In some examples, channel condition metrics regarding wireless communication conditions, including interference conditions, from a communication node of a wireless access system may be received. Based at least on the received channel condition metrics indicative of interference, a multidimensional interference margin generator may determine a per-sub-band per-stream margin. A modulation and coding scheme may be selected based on the per-sub-band per-stream margin. In some examples, the selected modulation and coding scheme may be transmitted to various modulators/demodulators, encoders/decoders, and/or other communication nodes within the wireless access system. In some examples, a scheduler may select an allocation based at least on the per-sub-band per-stream margin.

58 Claims, 16 Drawing Sheets

(58) Field of Classification Search
CPC ...... H01Q 21/29; H01Q 25/00; H01Q 21/062; H04W 88/08
See application file for complete search history.

(56) References Cited

U.S. PATENT DOCUMENTS

| | | | |
|---|---|---|---|
| 10,938,540 | B2 | 3/2021 | Seo et al. |
| 11,632,189 | B1 | 4/2023 | Svantesson et al. |
| 2007/0206695 | A1* | 9/2007 | Ye .................. H04L 1/0009 375/267 |
| 2010/0046445 | A1* | 2/2010 | Sawahashi ........... H04L 5/0037 455/507 |
| 2010/0202561 | A1* | 8/2010 | Gorokhov ............. H04L 27/36 375/295 |
| 2012/0063336 | A1* | 3/2012 | Shany ................ H04L 1/20 370/252 |
| 2015/0163773 | A1 | 6/2015 | Wang et al. |
| 2017/0134050 | A1* | 5/2017 | Abu-Surra ........ H03M 13/6527 |
| 2017/0366328 | A1 | 12/2017 | Seo et al. |
| 2018/0205442 | A1* | 7/2018 | Oteri ................. H04W 88/08 |
| 2018/0279270 | A1* | 9/2018 | Sano ................. H04J 11/004 |
| 2021/0314877 | A1 | 10/2021 | Ryu et al. |
| 2022/0053385 | A1 | 2/2022 | Li et al. |
| 2022/0190884 | A1* | 6/2022 | Lea ................... H01Q 1/50 |

* cited by examiner

… (1)

SYSTEMS AND METHODS FOR PER-SUB-BAND, PER-STREAM, AND PER-USER SELECTION OF MODULATION AND CODING SCHEMES INCLUDING SCHEDULING USING CHANNEL CONDITION METRICS INDICATIVE OF CHANNEL INTERFERENCE

TECHNICAL FIELD

Examples described herein generally relate to wireless communication technology. Examples of adaptive coding and modulation (ACM) are described for selecting modulation and coding schemes (MCS) in some examples, per-sub-band, per-user, and per-stream (e.g., per number of streams), and may be based in part on interference. Example ACM systems and methods may be used in time-division-duplex (TDD) retro-directive beamforming (RDB) broadband wireless communications (e.g., access) systems, or other wireless communications (e.g., access) systems. Some examples use signal to interference plus noise power ratio (SINR) and transport block error (TBE) metrics to adaptively select MCS. Some examples determine interference that impacts the SINR and TBE metrics, and adaptively generate per-sub-band per-user and per-stream margins for use in MCS selection. Some examples of such interference may be spatially inseparable interference that cannot be mitigated through spatial means such as multiple antennas. Such interference may be common in unlicensed bands. Some examples utilize the generated per-sub-band per-user margin to make bandwidth scheduling determinations.

BACKGROUND

Most broadband wireless communications (e.g., access) systems such as LTE use a broadcast control channel where allocations are signaled with one MCS per allocation. To overcome potentially different channel conditions across the scheduled frequency band, the information bits (e.g., in a packet) are coded and interleaved to even out the effects of different channel conditions at different parts of the frequency band. Packet error rates are further reduced by using hybrid-automatic-repeat-request (HARQ) that sends a Negative Acknowledgement (NACK) if errors in the transmission are detected, and all or portions of the transmission are repeated. If the message is received correctly, an Acknowledgement (ACK) is sent back to the transmitter and a new message is sent. For improved performance, the decoder combines information from multiple transmissions and not just the last one. Often a version of HARQ, called incremental redundancy (IR), is used where only a portion of the message is re-transmitted and the receiver combines the log-likelihood-ratios (LLRs) of the original message with the re-transmission. This may allow for fine-tuning over the effective data rate without very precise MCS, which works well with the constraint of a broadcast channel that signals only one MCS per allocation where an allocation can span a small or large frequency band.

BRIEF DESCRIPTION OF THE DRAWINGS

Reference is now made to the following descriptions taken in conjunction with the accompanying drawings, in which.

DETAILED DESCRIPTION

Figure 1A:
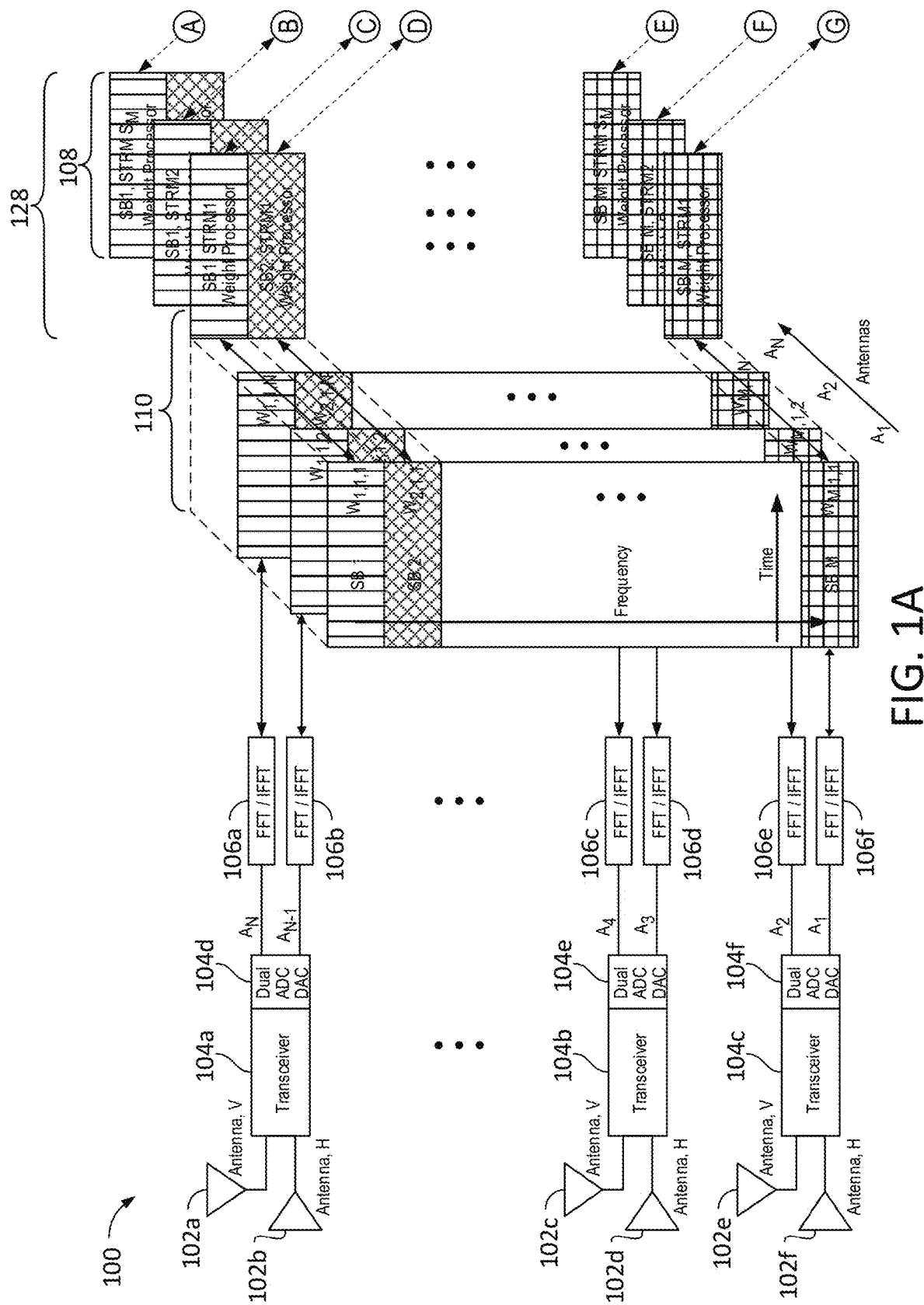
FIGS. 1A and 1B are schematic illustrations of a system for interference aware adaptive selection of modulation and coding schemes, arranged in accordance with examples described herein.

Certain details are set forth herein to provide an understanding of described embodiments of technology. However, other examples may be practiced without various ones of these particular details. In some instances, well-known circuits, control signals, timing protocols, and/or software operations have not been shown in detail in order to avoid unnecessarily obscuring the descried embodiments. Other embodiments may be utilized, and other changes may be made, without departing from the spirit or scope of the subject matter presented herein.

Examples described herein include systems and methods for granular interference aware selection of modulation and coding schemes (MCS) including user scheduling.

Examples may make MCS selections per-sub-band and/or per-user, and in some examples, per-sub-band, per-user, and/or per-stream (e.g., per-number of streams), which may allow for a finer-grain selection of MCS—for example, an appropriate MCS may be selected for each sub-band per-user per-stream based at least in part on the observance of interference (e.g., channel interference), which may improve transmission performance at each sub-band. In some examples, the interference aware adaptive MCS selection, including user scheduling, techniques described herein may be utilized in broadband wireless access time-division-duplex (TDD) retro-directive beamforming (RDB) systems. As should be appreciated, and as used here, per-sub-band per-stream may be referred to as "granular." As one example, signaling of a subMar, as described herein, may occur at a granular level, per-sub-band per-stream.

Examples described herein generally pertain to broadband wireless access systems with dynamic user allocations in either time or frequency or spatial dimensions. Examples of broadband wireless access systems include Long-Term-Evolution (LTE) and WiMAX systems. Such systems generally select the modulation and coding scheme (MCS) based on different metrics to achieve a desired throughout and error rate operating point. The techniques (e.g., algorithms) for selecting the MCS may be referred to as adaptive coding and modulation (ACM) techniques (e.g., algorithms), which may distinguish them from systems that use a fixed MCS.

One problem in wireless access is interference, which in some examples may be caused by other wireless transmitters nearby. This may particularly be a problem in unlicensed parts of the radio frequency band but can be a problem in any band. ACM techniques that detect interference and consider interference in MCS selection, (e.g., interference aware ACM techniques), may perform better in areas or bands where the wireless access system is subject to interference that may not be spatially separable. Further improvements may be achieved by including interference awareness in the scheduling of users. For example, avoiding scheduling users on frequency bands with interference may improve user experience as well as improving the network efficiency.

Examples described herein include a suite of ACM techniques for selection of MCS and user scheduling techniques. Examples described herein include examples designed for time-division-duplex (TDD) retro-directive beamforming (RDB) broadband wireless communications (e.g., access) systems with dynamic allocations in time, frequency, or space (e.g., spatial multiplexing of multiple users). Generally, a user herein may refer to a particular communications node (e.g., a residential node) and/or a particular computing system connected to a wireless communications node.

Examples described herein may include one or more base nodes, which may be intended to communicate wirelessly to one or more other communications nodes (e.g., residential nodes). A base node may, for example, be positioned on a tower or other centralized location. A residential (remote) node may be particular to a building, home, office, or other location. The residential node may in turn be in communication with one or more electronic devices and may facilitate communication between the electronic devices and the base node. Any number or type of electronic device may be serviced using communication techniques described herein including, but not limited to, computing systems, servers, desktops, laptops, tablets, cellular phones, appliances, vehicles, etc.

Recall many existing wireless systems utilize a broadcast control channel where allocations are signaled with one MCS per allocation where an allocation may, in some examples, span a small and/or a large frequency band. Error rates may be reduced in such systems by using hybrid-automatic-repeat-request (HARQ) that sends a Negative Acknowledgement (NACK) if errors in the transmission are detected, and all or portions of the transmission are repeated. A drawback of this scheme is a high implementation complexity of the HARQ including storage on the LLRs. Often many parallel HARQ streams are used which further increases storage requirements. Another drawback of several re-transmissions is an increased latency. Frequency domain duplex (FDD) systems that can quickly send an ACK/NACK on another frequency have a relatively low latency even with multiple re-transmissions. Time-domain-duplex (TDD) systems have to wait until the switch in link-direction plus a transmit time gap due to propagation delays between uplink and downlink, causing an increase in the latency of the system. As used herein, downlink (DL) may refer to a transmission from a base station (BS) to user equipment (UE). Similarly, and as used here, uplink (UL) may refer to a transmission from a BS to a UE.

Examples described herein include ACM systems and techniques for selection of the MCS, which may be used with TDD retro-directive beamforming (RDB) broadband wireless access systems with dynamic allocations in time, frequency, and/or spatial multiplexing of multiple users.

Retro-directive beamforming generally refers to use of the spatial structure of the received signal to decide the spatial structure of a transmitted signal. For example, if a received signal impinging on the receiving antenna array comes primarily from one direction, the transmitter may then transmit back in the same direction. Both analog and digital forms for RDB are possible but the examples herein generally focus on a digital implementation. Since the characteristics of the radio channel typically are frequency dependent, RDB is often implemented for TDD systems where both transmission directions (e.g., from the BS to the UE, from the UE to the BS, from a BN to an RN, from an RN to a BN, etc.) use the same frequency so the receive beamforming weights can be used to derive the transmit beamforming weights.

Beamforming weights generally refer to how to weight the signals received and/or transmitted to and/or from different antennas. This weighting of signals corresponds to forming a spatial signature that may match the channel and may change (e.g., improve and/or optimize) a performance metric. Examples of performance metrics include throughput and signal to noise plus interference ratio (SNIR). For a RDB system with allocations that are dynamic in time, frequency, and or space, a single MCS per allocation may not be optimal.

Consider an orthogonal frequency-division multiple access (OFDMA) RDB system where the allocation unit is a sub-band that is defined as a group of consecutive sub-carriers. The size of a sub-band may be selected such that the channel conditions are similar within a sub-band. However, the conditions between sub-bands can potentially be very different due in part to retro directive beamforming and the spatial compatibility with other users allocated at each sub-band.

Another example that leads to different MCS per-sub-band per-stream (e.g., per-spatial-stream, per-number of streams) is that a new spatially multiplexed user can enter the sub-band and change the conditions on that sub-band compared to other sub-bands for a short time. Hence, the signal quality conditions change over both time, sub-band (frequency), and spatial multiplexing conditions (other users). Operating in an un-licensed band (as may occur in examples described herein) may further expose the system to external interference that also can be dynamic in terms of time, frequency, and space. Under these conditions, a single MCS for an allocation spanning multiple (or many) sub-bands may not be optimal.

In some systems, such as RDB systems with dynamic scheduling in time, frequency, space, and possibly exposed to external interference, a better solution may be to use a separate MCS across different parts of the allocation, e.g., a fine-grained MCS selection scheme. A scheme that uses a separate MCS per-sub-band and spatial multiplexing dimension may substantially improve performance in some examples as the MCS is selected to match the channel conditions better. Another benefit may be that fewer re-transmissions typically are required since many errors can be reduced and/or avoided by selecting a lower MCS for parts of the band with challenging conditions. This reduces latency, which may be advantageous, for example, in TDD systems. It also may greatly reduce complexity by providing solutions that do not store many LLRs for parallel streams. Of course, example techniques for fine-grained MCS may still be compatible with HARQ which may yield even higher performance but at a higher complexity. It may also compatible with ARQ, which is a simpler version of HARQ where the full message is retransmitted as opposed to HARQ where the re-transmissions typically modify the transmission and the receiver combines information for all transmissions.

In some examples, ARQ and HARQ may be implemented in a plurality of ways. As such, the suite of techniques described herein may be applicable to any implementation. As one example, ARQ and HARQ schemes (e.g., techniques) may be implemented by repeating either packets or transport blocks, and the suite of techniques described herein, in some examples, is compatible with both.

In some examples, an allocator, such as those described herein, may determine (e.g., decide) a number of streams based on a multi-dimensional interference margin generator, such as those described herein.

In some examples, a signaling of a subMar may occur at a granular level, e.g., per-sub-band, per-stream, etc.

In some examples, a "no data" MCS indicator may be a solution to the problem that even the lowest MCS may not support low error transmissions. This "no data" MCS indicator may also be referred to, in some examples, as the FORBID option since it forbids user data to be striped on the affected sub-bands although these sub-bands may be allocated to this user by the scheduler.

In some examples, the base SINR (as computed, in some examples, by UL & DL Base SINR 720 of FIG. 7 as described herein) may be used by a network management system to determine whether the majority of the users are experiencing a throughput that is far from optimal.

Note that in some examples, the adaptive rate of change as described herein may help reduce the starvation occurrences but there may still be a duration (e.g., 10-20 mins) before the subMar decays enough to allow for new allocations.

As described herein, a common problem in wireless access is interference (e.g., channel interference, etc.), which may in some examples be caused by other wireless transmitters nearby. This may be particularly a problem in unlicensed parts of the radio frequency band but may be a problem in any band. Fine-grained interference aware MCS selection schemes may be able to handle interference generally, and more specifically, may be able to handle interference that covers parts of the band. Detecting and/or observing interference and making the ACM techniques aware of the interference in a fine-grained manner to adjust the MCS in the interfered parts of the band can substantially improve performance in presence of spatially unresolvable (and/or spatially inseparable) interference. Furthermore, including interference knowledge in the scheduling of users may further improve performance and improve the network efficiency. As used herein, spatially inseparable interference refers to interference that cannot be mitigated through spatial means such as multiple antennas. As should be appreciated, and in some examples, systems and methods described herein may be implemented in unlicensed bands that may have none and/or some and/or significant interference. In some examples, the bands (e.g., unlicensed bands) may include spatially inseparable interference. In some examples, systems and methods described herein may be implemented in licensed bands."

Accordingly, examples described herein include ACM systems and techniques (e.g., algorithms) using metrics for selecting the fine-grained MCS and user scheduling techniques under a variety of conditions, including the observance and/or determination of interference. To implement fine-grained MCS selection schemes, fine-grained control and feedback channels may be used.

Figure 1B:
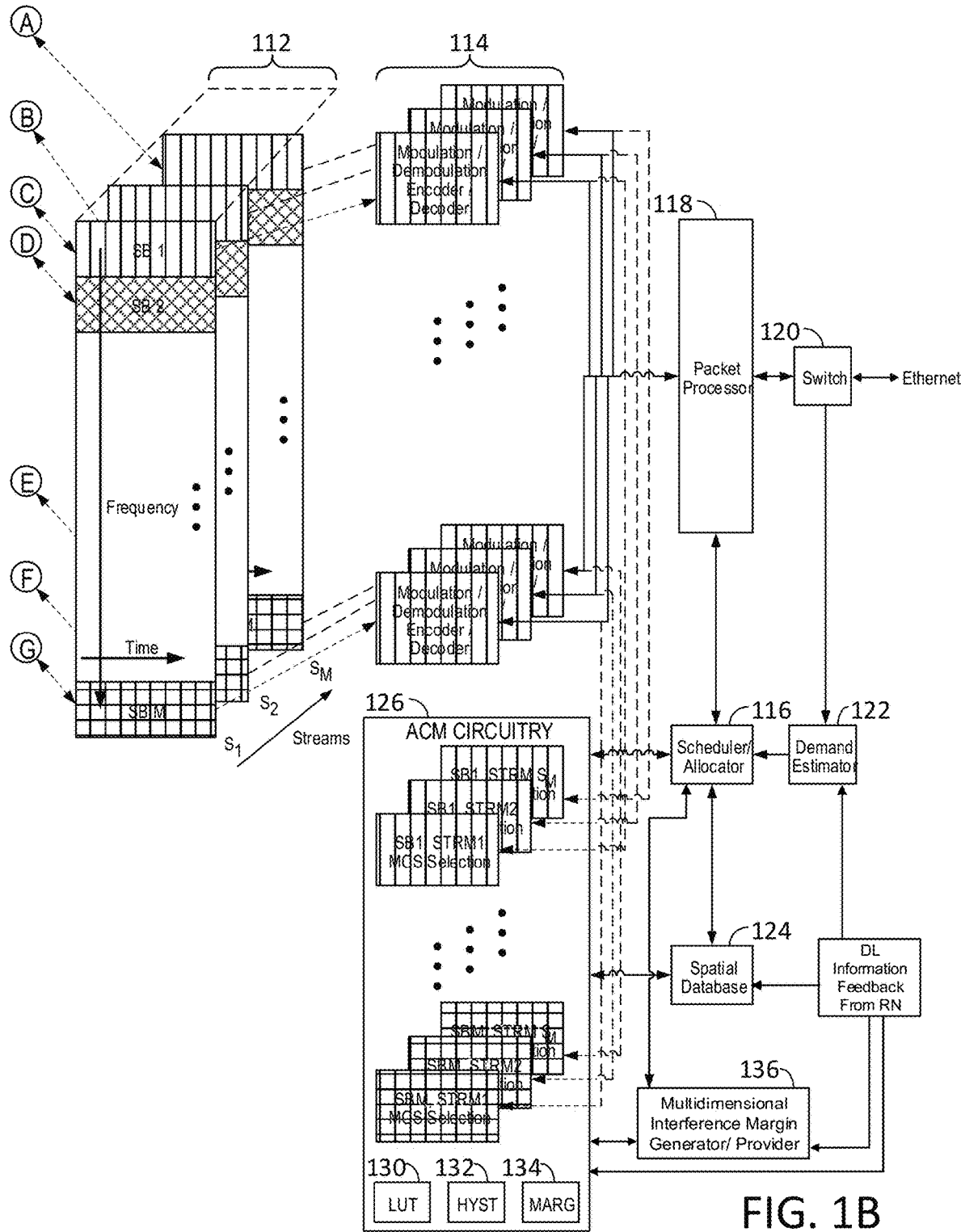

FIGS. 1A and 1B are schematic illustrations of a communication system 100 for interference aware adaptive selection of modulation and coding schemes (MCS), arranged in accordance with examples described herein. As described herein, system 100 of FIGS. 1A and 1B includes multiple transceivers, including transceivers 104a, 104b, and 104c. Each transceiver is depicted with two antennas. Transceiver 104a is coupled to antenna 102a and 102b. Transceiver 104b is coupled to antenna 102c and 102d. Transceiver 104c is coupled to antenna 102e and 102f. The transceivers are each coupled to a transform block (e.g., FFT/IFFT 106a-f). The signals at the right-hand side of the transform blocks in FIGS. 1A and 1B are depicted by sets 110. One set (shown as signals arranged in frequency over time) is depicted for each antenna, and within each set are multiple sub-bands of frequencies (e.g., SB1 through SB M). There is one set for each antenna (e.g., antenna $A_1$ through $A_N$). The transform blocks are coupled to weight processors 108. Signals at the right-hand side of the weight processors are depicted as streams 112. Each stream may include a weighted combination of the per-antenna sets of signals. In some examples, each stream in streams 112 may be a communication stream, and in some examples, each communication stream may include a weighted combination of a per-antenna set of signals that, in some examples, an output of a weight processor. In some examples, a system (e.g., system 100) may transmit (or multiplex) multiple information/communication streams on the same time and frequency resource using the spatial dimension (e.g., antennas through the weight processors in system 100) to separate them. This is sometimes called spatial division multiplexing as opposed to time or frequency division multiplexing. In some examples system 100 may use time, frequency, and spatial division multiplexing where the spatial streams (through the antennas and weight processors) provide the spatial division.

The weight processors are coupled to modulation/demodulation encode/decoders 114. In some examples, there may be one or more weight processors per-sub-band and per-stream, which each may be coupled to modulation/demodulation encode/decoders 114. The modulation/demodulation encoder/decoders may modulate, demodulate, encode, and/or decode the streams in accordance with modulation coding scheme selections made as described herein. Generally, a modulator/demodulator and/or encoder/decoder may be provided for each sub-band of each stream.

ACM circuitry 126 is coupled to the modulator/demodulators and/or encoder/decoders, and multidimensional interference margin generator 136, to provide an MCS selection for use by those components as described herein. ACM circuitry 126 may include selection circuitry for each sub-band and/or each stream and/or each user.

Multidimensional interference margin generator 136 may in some examples observe interference (e.g., channel interference) present in one or more channel metrics, including but not limited to an uplink reference symbol signal to interference plus noise power ratio metric, an uplink pilot-based signal to interference plus noise power ratio metric, an uplink transport block error metric, or combinations thereof. Multidimensional interference margin generator 136 may, based at least on the observed and/or determined interference, may generate per-sub-band per-user margin and transmit (e.g., send, relay, etc.) the per-sub-band per-user margin to ACM circuitry 126. While ACM circuitry 126 is depicted as being in a base node, similar ACM circuitry may be present in a remote node, as described herein. In some examples, a remote node comprising ACM circuitry may also generate and/or determine a per-sub-band per-user margin. As used herein, a per-sub-band per-user margin per-user and subMar are used interchangeably throughout. As should be appreciated, a DL subMar is interchangeable with a downlink per-sub-band per-user margin, and an UL subMar is interchangeable with an uplink per-sub-band per-user margin. As should further be appreciated, and as described herein, in some examples, on a base node (e.g., BN), there may be many users, each one having a separate subMar. In some examples, and from the remote node (e.g., RN) perspective, there may be a single user, e.g., itself.

The modulator/demodulators and/or encoders/decoders may be coupled to a packet processor 118. The packet processor 118 may be coupled to a switch 120 for receipt of and/or provision of Ethernet or other data. A scheduler/allocator 116 may be coupled to the packet processor 118 and the ACM circuitry 126. A demand estimator 122 may be coupled to the switch 120 and the scheduler/allocator 116. A spatial database 124 may be coupled to the scheduler/allocator 116 and the ACM circuitry 126. ACM circuitry 126 may include and/or be in communication with stored metrics such as look up table (LUT) 130, hysteresis 132, and/or margin 134. As should be appreciated, at least both an adaptive margin and a subMar are discussed throughout. At least both the adaptive margin and the subMar, in some examples, may be stored as metrics, such as the margin 134 metric.

The components shown in FIGS. 1A and 1B are examples. It is to be understood that additional, fewer, and/or different components may be used in other examples. Generally, components shown and described with reference to FIGS. 1A and 1B, which perform processing, calculating, or other data manipulations, may be understood to be implemented in hardware, software, or combinations thereof. For example, the weight processors, modulators/demodulators, encoders/decoders, ACM circuitry, may be implemented using one or more processors and memory encoded with executable instructions for performing their functions (e.g., software). In some examples, one or more application specific integrated circuits (ASICs), field programmable gate arrays (FPGAs), systems on a chip (SOCs), or other logic may be used. Any electronic storage may be used to store metrics or other parameters described herein (e.g., weights, look-up tables, hysteresis, margin), such as any kind of memory.

It is to be understood that the communications node of FIGS. 1A and 1B may be used to both transmit and receive signals. In some instances throughout, particular components may be described with reference to their receive operation or their transmit operation, however it should be understood that the components have dual roles and function in both the receive and the transmit paths.

Examples of systems described herein, such as system 100 of FIGS. 1A and 1B, may be incorporated into and/or otherwise used to implement one or more wireless communication nodes. Examples of wireless communication nodes include base stations, routers, access points, cells, computers (e.g., servers) as well as remote nodes of a wireless network and/or mobile devices such as tablets, handsets (e.g., cellular phones), and laptops. Wireless communication nodes may be used to provide data service (e.g., Ethernet, etc.) to other devices having incorporated communication technology such as televisions, set-top boxes, gaming devices, home automation devices, appliances, and automobiles or other vehicles. Multiple systems described herein, including multiple instances of system 100 of FIGS. 1A and 1B, may be deployed in a communication environment. For example, the system 100 may be used to implement one or more base nodes and/or residential nodes (e.g., routers) which may communicate with one or more electronic devices to provide Ethernet service to the electronic device. Depending on the node type, some of the system blocks in system 100 may be different. For example, the ACM circuitry (e.g., ACM circuitry 126 of FIGS. 1A and 1B) of a base node may select the MCS while the ACM circuitry of a residential node may receive and apply the selected MCS. Although it may be applicable to any node, including but not limited to a remote node, FIGS. 1A and 1B generally focus on a base node perspective.

Accordingly, examples of communication nodes described herein may include transceivers, such as the transceivers 104*a-c* shown in FIGS. 1A and 1B. Each transceiver may include a dual digital converter unit including an analog to digital converter and/or a digital to analog converter. For example, transceiver 104*a* may include dual digital converter unit 104*d*. Transceiver 104*b* may include dual digital converter unit 104*e*. Transceiver 104*c* may include dual digital converter unit 104*f*. Transceivers may generally include both transmitter and receiver components and/or share circuitry used to perform transmitting and receiving. In some examples, a transceiver may include separate transmitter and receiver components. In some examples, transceivers described herein may include and/or be coupled to two digital-to-analog converters in a dual digital converter unit, such as dual digital converter units 104*d*-104*f*. In some examples, converter units described herein convert a signal incident on one or more antennas of system 100 from analog to digital. Additionally and/or alternatively, in some examples, converter units described herein may convert a signal to be transmitted by the one or more antennas of system 100 from digital to analog.

Examples of systems described herein include transceivers (e.g., wireless communication transceivers), such as transceiver 104*a*, transceiver 104*b*, and transceiver 104*c* of FIGS. 1A and 1B. While three transceivers are provided with reference numbers in FIGS. 1A and 1B, any number of transceivers may be included in the system (as indicated by the multiple dots in FIGS. 1A and 1B). For example, 1, 2, 3, 4, 5, 6, 7, 8, 9, 10, 16, 32, 64, 128, and/or other numbers of transceivers may be used in other examples. The transceivers, at their right-hand side in FIGS. 1A and 1B may each provide and/or receive a data stream corresponding to RF signals incident on and/or transmitted by the antenna(s) to which they are connected. The data stream may be, for example, a discretized version of the RF signals incident on one or more antenna(s). One or more data streams may include data, such as training data, which may be used (e.g., by a weight processor) to generate weights.

Examples of transceivers described herein may be coupled to antennas. For example, transceiver 104a is depicted coupled to antenna 102a and antenna 102b. Transceiver 104b of FIGS. 1A and 1B is depicted coupled to antenna 102c and antenna 102d. Transceiver 104c of FIGS. 1A and 1B is depicted coupled to antenna 102e and antenna 102f. Generally, multiple antennas coupled to a single transceiver may each be used to (e.g., tuned to) receive a particular polarization (e.g., indicated by 'Antenna V' and 'Antenna H' in FIGS. 1A and 1B. In some examples, one or more transceivers may be coupled to only a single antenna. Radio frequency (RF) signals may be incident on and/or transmitted by antennas as described herein. Generally, the RF signals may be received in a frequency band (e.g., a sub-band) that may include multiple subcarrier frequencies.

System 100 may include one antenna and/or may include multiple antennas—e.g., system 100 may be a multiple antenna system, otherwise referred to as a multiple-input multiple output (MIMO) system. In this manner, any number of antennas may be provided in systems described herein, such as 1, 2, 3, 4, 5, 6, 7, 8, 9, 10, 16, 32, 64, 128, 256, or other number of antennas. Multiple antennas provided in a system (e.g., in a mobile communication device) may be referred to as an antenna array. The antenna array may be local to one device (e.g., the antennas may be provided in a same device), or the antenna array may be distributed in some examples. For example, the antennas shown in FIGS. 1A and 1B may be included in separate devices distributed about an environment in some examples. Transceivers in communication with the distributed antennas may be in communication with one another and/or with a beamforming network to facilitate techniques described herein (e.g., TDD RDB). In some examples, the signals incident on the one or more antennas may be time varying signals received by the one or more antennas in the time domain. In some examples, the signals to be transmitted by the one or more antennas need to be transformed from a frequency domain to the time domain.

Examples of system described herein may include transforms, such as Fast Fourier Transform (FFT) and/or Inverse Fast Fourier Transform (IFFT) blocks 106a-f. FFT and/or IFFT blocks 106a-f may be implemented in hardware, software, or combinations thereof. Circuitry may be used to implement FFTs and/or IFFTs. Transforms may be coupled (communicatively or otherwise) to one or more transceivers. For example, FFTs and IFFTs 106a and 106b are depicted coupled to transceiver 104a. FFTs and IFFTs 106c and 106d are depicted coupled to transceiver 104b. FFTs and IFFTs 106e and 106f are depicted coupled to transceiver 104c.

In some examples, the transforms may convert (or transform) an output of the connected transceiver, e.g., a signal incident on one or more antennas of a wireless access system, such as antennas 102a-102f of FIGS. 1A and 1B, from the time domain to the frequency domain. In some examples, the transforms, may convert (or transform) the signal incident on the one or more antennas using a Fast Fourier Transformation (FFT). Additionally and/or alternatively, in some examples, the transforms may be configured to convert (or transform) a signal to be transmitted by one or more antennas, such as antennas 102a-102f of FIGS. 1A and 1B, from the frequency domain to the time domain. In some examples, an Inverse Fourier transform may convert (or transform) the signal to be transmitted by one or more antennas using an Inverse Fourier Transformation (IFFT). A size of the transform may correspond to a number of subcarriers used in the communications sent to and from the communications node of FIGS. 1A and 1B. Any number of subcarriers may be used, 4096 subcarriers over a 40 MHz carrier, in one example, although any number may be used.

During operation, signals at the right-hand side of the transform blocks 106a-f in FIGS. 1A and 1B are depicted as sets 110. Each set corresponds to signals provided to and/or from a particular antenna (e.g., a particular transceiver). The sets 110 include signals arranged in frequency and time—with the frequencies spanning multiple sub-bands. Each sub-band may include a number of sub-carriers, 52 sub-carriers in one example, although any number may be used. Generally, a sub-band spans a portion of the frequency (e.g., portion of sub-carriers) over which channel characteristics may be approximated as flat (e.g., equal). The sub-bands are labeled SB-1 through SB-M in FIGS. 1A and 1B.

Examples of systems described herein may include a beamforming network (e.g., one or more beamformers), such as beamforming network 128 of FIGS. 1A and 1B. Beamforming network 128, in some examples, may include one or more weight processors, such as weight processor 108. The beamforming network may provide the signal to be transmitted by each of the multiple transceivers and/or antennas of the system (e.g., system 100 of FIGS. 1A and 1B). The beamforming network may be used to additionally and/or alternatively combine signals received at multiple antennas to form a received signal (e.g., a stream, a data stream, etc.). The beamforming network 128 may include a weight processor 108, which may be used to calculate weights for each of the transceivers and/or antennas in the system. Generally, beamforming networks may be implemented using one or more processors (e.g., central processing unit(s) (CPUs), microprocessors etc.), which may execute instructions stored in one or more computer readable media, and/or circuitry for performing computations (e.g., field programmable gate array (FPGA) circuitry, and/or software on chip (SOC), and/or advanced reduced instruction set machine (ARM) computing architectures, and/or application specific integrated circuits (ASICs)). In some examples, beamforming network 128 may be a bi-directional beamforming network. In some examples, beamforming network 128 may be a time-division-duplex (TDD) retro-directive beamforming (RDB) network.

Beamforming networks described herein and utilized in devices and/or systems herein may include one or more weight processors, such as weight processor 108 of FIGS. 1A and 1B Weight processor 108 may be used to calculate and/or apply weights to be used by beamforming network 128 to generate signals for transmission by multiple (or one or more) antennas in system 100 and/or to combine signals received by multiple antennas in system 100. Accordingly, such beamforming network 128, may receive data streams from one or more transceivers and may calculate and/or use, for each subcarrier of a frequency band, a respective plurality of weights used to generate signals for transmission by or combine the signals received at respective ones of the plurality of antennas. In the example of FIGS. 1A and 1B, the weights are depicted as W having three indices—where the indices correspond to sub-band, stream, and antenna. For example $W_{1,2,4}$ would refer to the weight used for sub-band 1 (SB-1), stream 2, and antenna 4. In this manner, the weight processors may utilize the weights to combine certain sub-bands from certain antennas into streams. A particular weight processor, may for example, be particular to a sub-band and a stream—for example the "SB1, STRM 1 weight processor" of FIGS. 1A and 1B may create one sub-band of signals for one stream. The weight processor may create the sub-band of signals for the stream by combining signals from the multiple antennas in that sub-band in accordance with the weights. In this manner, different weightings of antennas may be used to for different sub-bands and different streams.

Accordingly, the signals at the right-hand side of weight processors in FIGS. 1A and 1B are depicted as streams $S_1$-$S_M$, with data in each stream arranged in multiple sub-bands, each having frequency and time dimensions.

Examples of systems described herein may include one or more encoders, decoders, modulators, and/or demodulators, depicted herein as modulation/demodulation encode/decoders 114 of FIGS. 1A and 1B. In some examples, modulation/demodulation encode/decoders 114 may be configured to modulate and encode data intended for transmission by the system and/or de-modulate and decode data intended for reception by the system. While a select number of encoders, decoders, modulators, and demodulators are depicted as modulation/demodulation encode/decoders 114 in system 100 of FIGS. 1A and 1B, it should be appreciated, any number of encoders, decoders, modulators, and demodulators may be used in system 100, including additional, fewer, and/or different encoders, decoders, modulators, and demodulators. As shown in FIGS. 1A and 1B, there may generally be one modulator/demodulator and/or encoder/decoder for each sub-band of each stream. The encoders, decoders, modulator, and demodulators of FIGS. 1A and 1B may operate in accordance with an MCS selection received from ACM circuitry 126. The MCS selection may be particular to a certain sub-band and/or certain stream and/or a certain user (e.g., per-user).

Accordingly, the MCS selection used to modulate/demodulate and/or encode/decode a particular sub-band of a particular stream (e.g., SB-M of $S_1$) may be different than the MCS selection used to modulate/demodulate and/or encode/decode a different sub-band of that stream or a different stream (e.g., SB-2 of $S_2$). In some examples, the MCS for the same sub-band may be different per-stream. For example, the MCS of SB-M of $S_1$ may be different from SB-M of $S_2$. In this manner, an MCS selection may be made with regard to metrics appropriate for a particular sub-band and/or stream. In some examples, and as described herein, the MCS selection used to modulate/demodulate and/or encode/decode a particular sub-band of a particular stream for a particular user may be may be based on per-sub-band margin generated based at least on observed interference.

In some examples, modulation/demodulation encode/decoders 114 may be configured to modulate a data stream intended for transmission by the one or more antennas of system 100 to, for example, other communications nodes (e.g., remote notes, residential notes, etc.) within a wireless communications system. In some examples, modulation/demodulation encode/decoders 114 may modulate the data stream in accordance with a modulation and coding scheme selected by modulation and coding scheme circuitry, such as ACM circuitry 126 of FIGS. 1A and 1B, as described herein. In some examples, modulation/demodulation encode/decoders 114 may demodulate a data stream derived from a signal incident on the one more antennas of system 100 and received by, for example, other communications nodes (e.g., remote notes, residential notes, etc.) within a wireless communications system. In some examples, modulation/demodulation encode/decoders 114 may demodulate the data stream in accordance with a modulation and coding scheme selected by modulation and coding scheme circuitry, such as ACM circuitry 126 of FIGS. 1A and 1B, as described herein.

In some examples, modulation/demodulation encode/decoders 114 may configured to encode a data stream intended for transmission by the one or more antennas of system 100 to, for example, other communications nodes (e.g., remote notes, residential notes, etc.) within a wireless communications system. In some examples, modulation/demodulation encode/decoders 114 may encode the data stream in accordance with a modulation and coding scheme selected by modulation and coding scheme circuitry, such as ACM circuitry 126 of FIGS. 1A and 1B, as described herein. In some examples, modulation/demodulation encode/decoders 114 may configured to decode a data stream derived from a signal incident on the one more antennas of system 100 and received by, for example, other communications nodes (e.g., remote notes, residential notes, etc.) within a wireless communications system. In some examples, modulation/demodulation encode/decoders 114 may decode the data stream in accordance with a modulation and coding scheme selected by modulation and coding scheme circuitry, such as ACM circuitry 126 of FIGS. 1A and 1B, as described herein. In some examples, a decoded stream may comprise decoded data bits. In some examples, an encoded RF signal may comprise encoded data bits.

In some examples, beamforming network 128 may operate between the transceivers of system 100 and other components of system 100, such as, for example, modulation/demodulation encode/decoders 114, scheduler 116, packet processor 118, demand estimator 122, spatial database 124, ACM circuitry 126, and switch 120 (or hub) which may be used to route data traffic. In some examples, beamforming network 128 may be bi-directional, meaning that it may function as an adaptive (receive) beamformer during the receive cycle, and as a transmit beamformer during the transmit cycle.

Examples of systems described herein may include a hub or switch, such as switch 120 of FIGS. 1A and 1B that may provide demodulated data to and/or from the encoders. In this manner RF signals incident on the antennas may generally be converted into received data and/or data provided to the system 100 may be converted into RF signals transmitted by the antennas.

Examples of systems described herein may include one or more schedulers, such as scheduler 116 of FIGS. 1A and 1B. In some examples, scheduler 116 may provide scheduling information to a packet processor, such as packet processor 118 of FIGS. 1A and 1B. In some examples, the scheduling information provided to packet processor 118 may include information regarding sub-band and/or stream allocations for particular users. In some examples, the scheduling information may include spatial information, compatibility information, or combinations thereof. In some examples, scheduler 116 may additionally and/or alternatively provide scheduling information to other components of system 100 described herein. In some examples, scheduler 116 may determine an allocation (e.g., an allocation for a user), where the allocation comprises an uplink allocation, downlink allocation, or combinations thereof. In some examples, the uplink allocation and/or the downlink allocation may be based at least on a determined uplink per-sub-band per-stream margin, as described herein. In some examples, systems described herein may make matching UL and DL allocation (e.g., to make retro-directive beamforming work). In some examples, an allocator, such as allocators described herein, may base an allocation based, in part, on the UL and DL per-sub-band, per-stream, and per-user margin subMar.

As described herein, a wireless communications system may include various communications nodes, including base nodes, remote nodes, residential nodes, and the like. In some examples, the distance information transmitted by scheduler 116 to packet processor 118 may include the distance between a particular remote (e.g., residential) node of the wireless communications system and the base node. In some examples, the spatial information transmitted by scheduler 116 to packet processor 118 may include the location information between various remote (e.g., residential) nodes of the wireless communications system. In some examples, the compatibility information transmitted by scheduler 116 to packet processor 118 may include information regarding the compatibility between the base node and a remote (e.g., residential node). In some examples, scheduler 116 may provide information to packet processor 118 regarding which sub-band(s) and/or which stream(s) a user (e.g., a remote node) has allocated. In some examples, that formation may be based at least in part on spatial information (between remote nodes of the wireless communications system), compatibility information (between remote nodes of the wireless communications system), distance information, location information, and the like.

In some examples, scheduler 116 may provide allocation information to adaptive modulation and coding scheme circuitry, such as ACM circuitry 126 of FIGS. 1A and 1B. In some examples, the allocation information provided to ACM circuitry 126 may include current allocation information, upcoming allocation information, spatial information, or combinations thereof. In some examples, ACM circuitry 126 may base an initial MCS selection at least in part on the allocation information provided by scheduler 116. In some examples, ACM circuitry 126 of FIGS. 1A and 1B may base an initial MCS selection based exclusively on the allocation information provided by scheduler 116. In some examples, ACM circuitry 126 of FIGS. 1A and 1B may base an initial MCS selection based in part on the allocation information provided by scheduler 116 in addition of other information described herein. In some examples, the allocation information may be dynamic in time, frequency, space, or combinations thereof. In some examples, ACM circuitry 126 may share information with scheduler 116, such as, for example, margin 134, hysteresis 132, and LUT 130. In some examples, based at least on this information, scheduler 116 may determine (e.g., decide) an initial MCS selection.

In some examples, scheduler 116 may be configured to determine an allocation (e.g., determine allocation information to provide ACM circuitry 126) based at least on an expected throughput per-sub-band per-stream. In some examples, scheduler 116 may be configured to determine the expected throughput per-sub-band per-stream based at least on channel sounding feedback, transmit power, an uplink per-sub-band per-stream margin, a downlink per-sub-band per-stream subMar, or combinations thereof. In some examples, allocations may be based on both the UL and the DL subMar. In some examples, the allocation that is most important may depend on UL and/or DL demand. In some examples, scheduler 116 may be configured to determine the expected throughout per-sub-band per-stream based at least on UL and/or DL SINR, UL and/or DL BASE SINR, or combinations thereof. In some examples, SINR, UL and DL BASE SINR, or combinations thereof may be determined based at least on channel knowledge, transmit power, interference knowledge, spatial properties of co-channel users, or combinations thereof. In some examples, scheduler 116 is an interference aware scheduler.

In some examples, and as used herein, BASE SINR may comprise and/or include and/or be indicative of the predicted SINR if the allocator would make an allocation. In some examples, an SINR is computed based on channel sounding. The SINR may be modified by different margins of which the subMar (such as the subMar as described herein) is one. The SINR after those modifications may be the BASE SNR. In some examples, the calculation may be separate in the UL and DL since there are UL and DL margins. In some examples, there may be a DL BASE SINR and UL BASE SINR.

Examples of systems described herein may include one or more packet processors, such as packet processor 118 of FIGS. 1A and 1B. In some examples, packet processor 118 may receive various information packets and allocate them (e.g., break them up, fragment) into particular sub-bands and streams for a particular user (or remote node) of the wireless communications system described herein. In some examples, if system 100 is using ARQ and/or HARQ, such operations and/or functionality may be handled by packet processor 118.

In some examples, Packet processor 118 may receive other packets additionally and/or alternatively to the Ethernet packets, where the other packets are intended for transmission. Examples of other packets described herein may include information packets, input packets, output packets, modem packets, and the like. Packet processor 118 may, in some examples, break the other packets up (e.g., allocate them, fragment them) into particular sub-bands and streams for a particular user (or remote node) of the wireless communications system described herein. In some examples, packet processor 118 may break up the received Ethernet and/or other packets based on scheduling information (e.g., least distance information to a particular communication node of a wireless communications system, spatial information, compatibility information, or combinations thereof) received from scheduler 116. In some examples, packet processor 118 may break up (e.g., allocate, fragment) input packets into modem packets. In some examples, packet processor 118 may break up input packets statically, dynamically, or combinations thereof.

As one example, a particular Ethernet packet may need transmitting for to a particular user of the wireless communications system described herein. Scheduler 116 may determine, receive, etc. scheduling information for that particular user. For example, Scheduler 116 may determine the particular user may receive transmissions using a particular sub-band(s) on a particular stream(s), such as sub-band M on Stream 1, as well as sub-band 4 on Stream 2. Scheduler 116 may provide this (and/or other scheduling information) to packet processor 118. Based at least on the received scheduling information from scheduler 116, packet processor 118 may break up (e.g., allocate) the Ethernet packet for the particular user to sub-band M on Stream 1, and sub-band 4 on Stream 2.

Examples of systems described herein may include one or more spatial database, such as spatial database 124 of FIGS. 1A and 1B. Recall that the wireless communications system described herein may include various communications nodes, such as base nodes, residential nodes, remote nodes, and the like. In some examples, spatial database 124 may include spatial information regarding various communications nodes within the wireless communications system, to which the communication node of FIGS. 1A and 1B may be in communication. In some examples, the spatial information included in spatial database 124 may be used to determine allocations (e.g., sub-band allocations, stream allocations, user allocations, and/or combinations thereof, and the like) by scheduler 116 of FIGS. 1A and 1B. For example, users (e.g., remote nodes, residential nodes, etc.) within a threshold distance of one another within the wireless communications system (or based on various spatial channel characteristics or geographical location(s)) may not, in some examples, be allocated a same sub-band, as it may cause interference (e.g., transmission interference, receive interference, etc.).

In some examples, spatial database 124 of FIGS. 1A and 1B may provide spatial information to adaptive modulation and coding scheme circuitry, such as ACM circuitry 126 of FIGS. 1A and 1B. In some examples, ACM circuitry 126 may base an initial MCS selection at least in part on the spatial information provided by spatial database 124. In some examples, ACM circuitry 126 of FIGS. 1A and 1B may base an initial MCS selection based exclusively on the spatial information provided by spatial database 124. In some examples, ACM circuitry 126 of FIGS. 1A and 1B may base an initial MCS selection based in part on the spatial information provided by spatial database 124 in addition of other information described herein.

Examples of systems described herein may include one or more demand estimators, such as demand estimator 122 of FIGS. 1A and 1B. In some examples, demand estimator 122 may review (e.g., analyze) and/or monitor various information packets (e.g., packets, other packets, output packets, input packets, modem packets, etc.) queued by a switch, such as switch 120 of FIGS. 1A and 1B, for various users (e.g., remote nodes, residential nodes, etc.) and/or a packet processor, such as packet processor 118 (which in some examples may also maintain a queue) of the wireless communications system described herein. In some examples, if a user has a higher number of queued packets, demand estimator 122 may cause a scheduler, such as scheduler 116 of FIGS. 1A and 1B to allocate more sub-bands and/or streams to that user to flush out the queue.

Examples of systems described herein may include multidimensional interference margin generator 136. The multidimensional interference margin generator 136 may be a multidimensional interference margin generator in some examples. In some examples, multidimensional interference margin generator 136 may be communicatively coupled to ACM circuitry 126. In some examples, multidimensional interference margin generator 136 may be configured to determine a margin (e.g., an uplink margin and/or a downlink margin) per-sub-band, per-user, and/or per-stream. In some examples, multidimensional interference margin generator 136 may be configured to determine an uplink per-sub-band, per-user, and/or per-stream margin based at least on a channel condition metric indicative of interference in the channel. In some examples, and as described herein, both a UL subMar and a DL subMar may be calculated. In some examples, the channel condition metric indicative of interference in the channel may comprise an uplink reference symbol signal to interference plus noise power ratio metric, an uplink pilot-based signal to interference plus noise power ratio metric, an uplink transport block error metric, or combinations thereof. In some examples, margin generator 136 may be configured to determine an uplink per-sub-band, per-user, and/or per-stream margin based at least on per-sub-band error information. In some examples, the per-sub-band error information may include codec quality metrics, error-detection codes, or combinations thereof. In some examples, the error-detection codes may include cyclic redundancy check codes available per-sub-band and/or per-stream and/or per-user.

In some examples, margin generator 136 may receive channel condition metrics indicative of interference from one or more remote (e.g., residential) nodes of a wireless communications system. In some examples, margin generator 136 may receive channel condition metrics indicative of interference from one or more base nodes of the wireless communications system. In some examples, margin generator 136 may receive channel condition metrics indicative of interference from an administrator or owner or the wireless communications system. In some examples, margin generator 136 may receive channel condition metrics indicative of interference from the modulators, demodulators, encoders, and/or decoders, such as modulation/demodulation encode/decoders 114, as described herein. For example, error rates may be provide by encoders and/or decoders. As should be appreciated, while other remote (e.g., residential) nodes, base nodes, and administrators are discussed from where to receive channel condition metrics indicative of interference, margin generator 136 may receive channel condition metrics from various other components shown and not shown within system 100 and/or within a wireless communications system, which are each within the scope of the present disclosure.

In some examples, margin generator 136 may determine the uplink per-sub-band per-stream margin based at least on a rate of decay based on sub-band stream allocation. In some examples, margin generator 136 may adapt the uplink per-sub-band per-stream margin to meet a performance criterion. In some examples, the performance criterion may be implemented using a specific error rate, a re-transmission rate, decoder quality performance metrics, or combinations thereof. In some examples, the uplink per-sub-band per-stream margin may decay over a plurality of frames and increase based at least on a performance criterion. In some examples, the performance criterion may be implemented using a specific error rate, a re-transmission rate, decoder quality performance metrics, or combinations thereof. In some examples, a rate of decay for the uplink per-sub-band per-stream margin may be determined (e.g., by ACM circuitry 126, margin generator 136, or one or more other components described herein) based at least on prior decrease decisions, increase decisions, or combinations thereof.

Examples of systems described herein may include one or more adaptive modulation and coding circuitry, such as ACM circuitry 126 of FIGS. 1A and 1B. ACM circuitry 126 may select a modulation and coding scheme (MCS) for encoding/decoding and/or modulating/demodulating each stream of the plurality of streams incident on antennas of system 100, and/or signals for transmission by antennas of system 100. In some examples, ACM circuitry 126 selects the MCS based on channel condition metrics (e.g., fine-grained metrics) regarding wireless communication conditions. In some examples, ACM circuitry 126 selects the MCS based on channel condition metrics, such as, for example, channel condition metrics indicative of interference in the channel and/or other interference (e.g., observed interference by multidimensional interference margin generator 136 as described herein). In some examples, channel condition metrics may include a signal-to-interference-and-noise-ratio (SINR), codec conditions, or combinations thereof. In some examples, codec conditions may include error counts, transport block error rates, decoder iterations, or combinations thereof. The channel condition metrics may be particular to individual sub-bands or streams, or groups of sub-bands and streams.

In some examples, the channel condition metrics indicative of interference may include an uplink reference symbol signal to interference plus noise power ratio metric, an uplink pilot-based signal to interference plus noise power ratio metric, an uplink transport block error metric, or combinations thereof. In some examples, ACM circuitry 126 selects the UL MCS per-sub-band and per-stream based at least on the uplink per-sub-band per-stream margin determined by multidimensional interference margin generator 136, the determined uplink allocation, the determined downlink allocation, or combinations thereof. In some examples, ACM circuitry 126 selects the UL MCS per-sub-band and per-stream based at least on the determined uplink per-sub-band per-stream margin, a per-user margin for all sub-bands and streams in the selection, or combinations thereof.

In this manner, ACM circuitry 126 may utilize a determined uplink per-sub-band per-stream margin based at least on sub-band and/or stream-specific and/or user-specific (e.g., per-user) channel condition metrics indicative of interference to select a UL MCS for individual sub-bands and/or streams per-user, which may be different than selections made for other sub-bands and/or streams per-user. Generally, and as described herein, components shown and described with reference to FIGS. 1A and 1B, which perform processing, calculating, or other data manipulations, may be understood to be implemented in hardware, software, or combinations thereof. For example, ACM circuitry 126 may be implemented using one or more processors and memory encoded with executable instructions for performing their functions (e.g., software). In some examples, one or more application specific integrated circuits (ASICs), field programmable gate arrays (FPGAs), systems on a chip (SOCs), or other logic may be used.

As should be appreciated, while UL MSC selection is discussed throughout, additionally and/or alternatively, systems and methods described herein may implement downlink (DL) MCS per-sub-band and per-stream. In some examples, systems and methods described herein may select a downlink (DL) MCS per-sub-band and per-stream based at least on a downlink per-sub-band per-stream margin (DL subMar) determined, in some examples, at a remote node (e.g., RN) and provided by the RN to multidimensional margin generator 136 of FIG. 1B. As should be appreciated, and in some examples, ACM circuitry 126 may utilize a determined downlink per-sub-band per-stream margin based at least on sub-band and/or stream-specific and/or user-specific (e.g., per-user) channel condition metrics indicative of interference to select a DL MCS for individual sub-bands and/or streams per-user.

In some examples, ACM circuitry 126 may receive channel condition metrics (in some examples channel condition metrics indicative of interference) from one or more remote (e.g., residential) nodes of a wireless communications system. In some examples ACM circuitry 126 may receive channel condition metrics from one or more base nodes of the wireless communications system. In some examples ACM circuitry 126 may receive channel condition metrics from an administrator or owner or the wireless communications system. In some examples, ACM circuitry 126 may receive channel condition metrics from the modulators, demodulators, encoders, and/or decoders, such as modulation/demodulation encode/decoders 114, as described herein. For example, error rates may be provide by encoders and/or decoders.

Figure 7:
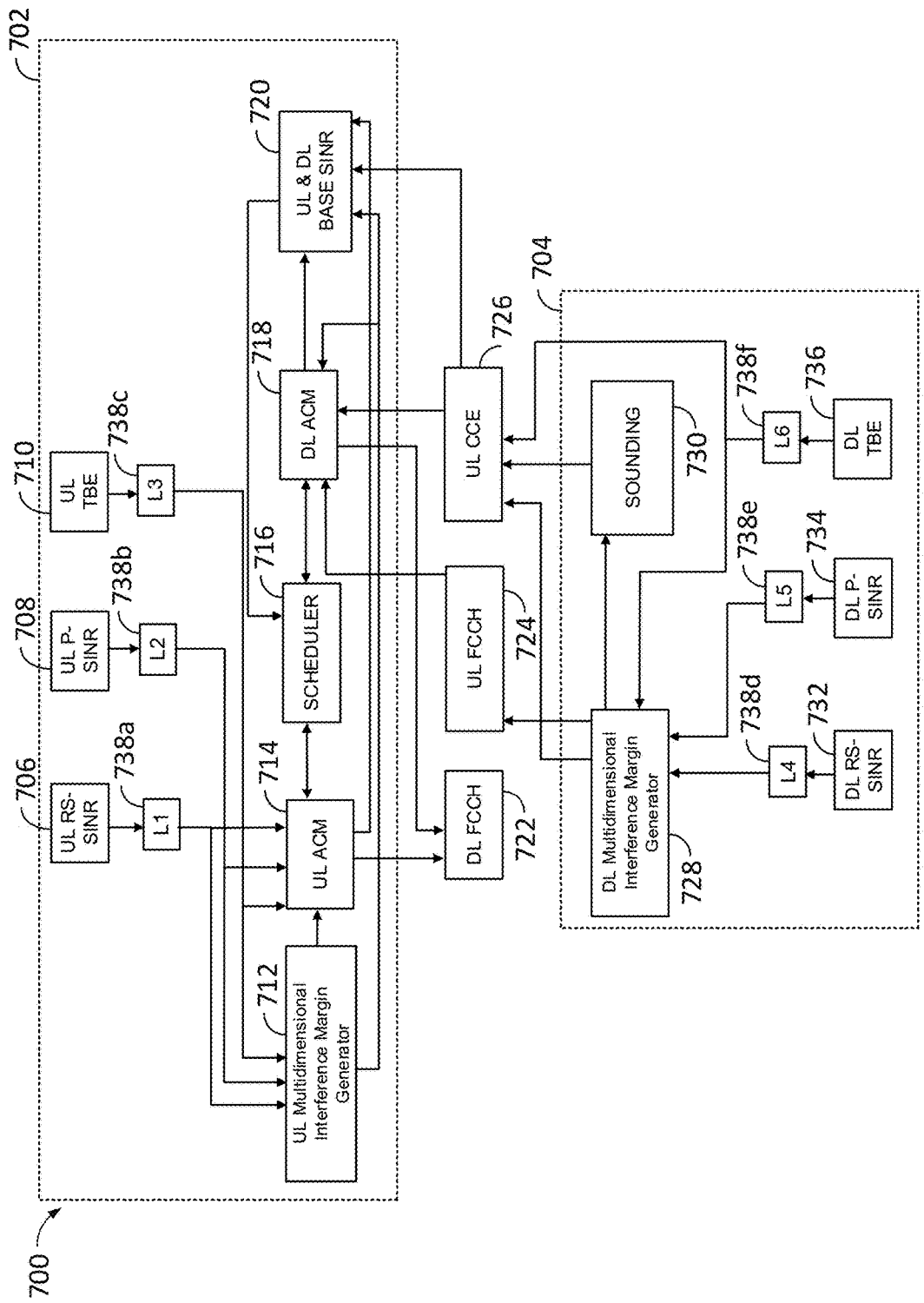
FIG. 7 is a schematic illustration of a system for interference aware adaptive selection of modulation and coding schemes, including user scheduling, arranged in accordance with examples described herein.

In one non-limiting example, a margin generator, such as multidimensional interference margin generator 136 of FIG. 1 (and/or UL multidimensional interference margin generator (MIMG) 712 of FIG. 7) may be located at a base node. Multidimensional interference margin generator 136 may receive various inputs indicative of channel conditions (e.g., channel metrics). Such inputs may include but are not limited to UL RS-SINR 706, UL P-SINR 708, and/or UL TBE 710. In some examples, these inputs may be generated at the base node based on observation of the channel(s). Margin generator may utilize these, and in some cases additional and/or alternative metrics to generate subMar (e.g., an UL subMar). This UL subMar may be, in some examples, transmitted to the UL ACM 714 of FIG. 7, as well as to UL BASE SINR 720 of FIG. 7, for use in for use in MCS selection and user scheduling.

As should be appreciated, while other remote (e.g., residential) nodes, base nodes, and administrators are discussed from where to receive channel condition metrics, ACM circuitry 126 may receive channel condition metrics from various other components shown and not shown within system 100 and/or within a wireless communications system, which are each within the scope of the present disclosure.

In some examples, the generated subMar may be used in the MCS selection in the pseudo code, e.g., in Algorithm (1). In that pseudo code, there may be an SINR and a margin. In some examples, the margin may now be the sum of the user margin and subMar, or the SINR is a derated SINR which is the per-sub-band-per-stream SINR reduced with the subMar. In some examples, this may have the same impact on the inequality in the Algorithm (1), but may also have impact on the implementation as discussed herein.

As should be appreciated, and in some examples, there may be a separate UL and DL version of all of quantities discussed herein.

Further, and as should be appreciated, at least both an adaptive margin and a subMar as discussed throughout, and while various metrics are discussed throughout, in some examples, the adaptive margin and the subMar may be stored as metrics, such as the margin 134 metric of FIG. 1.

Similarly, and as should be appreciated, ACM circuitry 126 may receive the determined uplink per-sub-band per-stream margin from one or more remote (e.g., residential) nodes of a wireless communications system. In some examples, ACM circuitry 126 may the determined uplink per-sub-band per-stream margin from one or more base nodes of the wireless communications system. In some examples ACM circuitry 126 may receive the determined uplink per-sub-band per-stream margin from an administrator or owner or the wireless communications system.

In some examples, during operation, ACM circuitry 126 may not have access to or may not have yet received channel condition metrics. In such examples (and/or other examples), ACM circuitry 126 may make an initial MCS selection based at least in part on allocation information, such as current allocation information, upcoming allocation information, spatial information, or combinations thereof, provided to it by scheduler 116 as described herein. Similarly, in such examples (and/or other examples), ACM circuitry 126 may make an initial MCS selection at least on spatial information regarding various communications nodes within the wireless communications system to which the communication node of FIGS. 1A and 1B may be in communication, provided to it by spatial database 124 as described herein.

In some examples, ACM circuitry 126, may have access to channel condition metrics. In such examples (and/or other examples), ACM circuitry 126 may select an MCS using channel condition metrics. In such examples (and/or other examples), ACM circuitry 126 may select an MCS using channel condition metrics, and the allocation information. In such examples (and/or other examples), ACM circuitry 126 may select an MCS using channel condition metrics, and/or the spatial information and/or the determined uplink per-sub-band per stream margin. In such examples (and/or other examples), ACM circuitry 126 may select an MCS using channel condition metrics, the allocation information, the spatial information, and/or the determined uplink per-sub-band per stream margin.

In some examples, ACM circuitry 126 may additionally and/or alternatively select an MCS based at least on a capacity utilization of the wireless communications system. In some examples, ACM circuitry 126 may additionally and/or alternatively select an MCS based at least on a look up table (LUT). The LUT may store an association between MCS selection and channel condition metrics, for example. In some examples, ACM circuitry 126 may additionally and/or alternatively select an MCS based at least on various selection parameters. In some examples, selection parameters may include a margin, a hysteresis, or combinations thereof. In some examples, the margin value may adapt during operation, which may be designed to achieve a performance criterion. In some examples, the performance criterion may be predetermined. In some examples, the performance criterion may be determined by an administrator of the wireless communications system. In some examples, the performance criterion may be determined by other components of the wireless communications system. In some examples, the performance criterion may include at least one of a specific error rate, a re-transmission rate, a decoder quality performance metric, or combinations thereof. In some examples, the margin may be configured to adapt based at least on a granularity of a sub-banned spanned by the selected MCS.

In some examples, ACM circuitry 126 may additionally and/or alternatively select an MCS based at least on a preferred MCS switching rate. In some examples, ACM circuitry 126 may additionally and/or alternatively select an MCS based at least on scheduling information. In some examples, ACM circuitry 126 may additionally and/or alternatively select an MCS based at least on adaptive modulation and coding scheme techniques as described herein. In some examples, ACM circuitry 126 may additionally and/or alternatively select an MCS based at least on a padding used to encode blocks to lower error rates, where in some examples, the padding comprises the difference between a capacity and a demand. As should be appreciated, ACM circuitry 126 may additionally and/or alternatively select an MCS based at least on any combinations of the above-recited metrics, parameters, look up tables, and/or information.

As described herein, ACM circuitry 126 may select an MCS per-sub-band and/or per-stream and/or per-user based at least on a determined uplink per-sub-band per-stream margin. In some examples, ACM circuitry 126 may select (and/or determine) the UL MCS based at least on the UL per-sub-band-per-stream margin. In some examples, ACM circuitry 126 may adapt a rate of increase for the uplink per-sub-band per-stream margin based at least on one or more prior decrease decisions, increase decisions, or combinations thereof. In some examples, a signaling channel for transmitting the uplink per-sub-band per-stream margin may be beamformed using, for example, one or more of a plurality of antennas, wherein the signaling channel may comprise a control channel element (CCE) channel, a fast control channel (FCCH), or combinations thereof. In some examples, ACM circuitry 126 may separate the uplink per-sub-band per-stream margin for transmission into a slower signaling channel and a faster signaling channel, wherein the slower signaling channel may comprise a CCE and a faster signally channel may comprise an FCCH.

As described herein, ACM circuitry 126 may select an MCS per-sub-band and/or per-stream and/or per-user based at least on a determined uplink per-sub-band per-stream margin. In some examples, the selection of an MCS for a certain sub-band (e.g., per-user and/or per-stream) by ACM circuitry 126 may result in transmitting encoded data bits, decoded data bits, or combinations thereof. In some examples, the selection of an MCS for a certain sub-band (e.g., per-user and/or per-stream) by ACM circuitry 126 may result in transmitting bits other than encoded data bits, decoded data bits, or combinations thereof. In some examples, the bits other than the encoded data bits, the decoded data bits, or combinations thereof, may comprise padding bits.

As described herein, ACM circuitry 126 may select an MCS per-sub-band and/or per-stream and/or per-user. In some examples, an MCS selected for a particular sub-band and/or stream and/or user by ACM circuitry 126, may be different than an MCS selected for a different sub-band and/or stream and/or user by ACM circuitry 126. For example, ACM circuitry 126 may select different MCS for different sub-bands and/or different streams and/or different users. In some examples, ACM circuitry 126 may select similar and/or the same MCS for different sub-bands and/or streams and/or users.

In some examples, ACM circuitry 126 may additionally and/or alternatively select an MCS based at least on filtering an SINR difference, where the filtering comprises a filter with coefficients corresponding to a fast response, a filter with coefficients corresponding to a slow response, or combinations thereof. In some examples, ACM circuitry 126 may additionally and/or alternatively select an MCS based at least on filtering an SINR difference, where the filtering comprises using a filter with coefficients corresponding to the fast response when a present value is higher than a filtered value. In some examples, ACM circuitry 126 may additionally and/or alternatively select an MCS based at least on filtering an SINR difference, where the filtering comprises using a filter with coefficients corresponding to the slow response when a present value is lower than a filtered value.

In some examples, residential (e.g., remote) nodes as described herein may comprise a baseband analog filter including noise or interference suppression different from the communications node filters. In some examples, the remote node may select a baseband analog filter based at least on interference impact as described herein. In some examples, the baseband analog filter selection may comprise a margin (e.g., in some examples a subMar as described herein; in some examples a margin other than the uplink per-sub-band per-stream margin, a BASE SINR, or combinations thereof.). As should be appreciated, and as described herein, in some examples, there may be both a UL and DL BASE SINR. In some examples, the UL subMar may affect the UL BASE SINR. In some examples, the DL subMar the DL BASE SINR.

In some examples, ACM circuitry 126 may additionally and/or alternatively select an MCS for a new allocation based at least on channel information, wherein the channel information comprises channel feedback, transmit power, or combinations thereof. In some examples, the opposite direction also apply. For example, the subMar and allocation could influence transmit power. In some examples, ACM circuitry 126 may additionally and/or alternatively select an MCS based at least on based at least on a post-processed SINR, wherein the post-processed SINR comprises SINR averaging. In some examples, ACM circuitry 126 may comprise multidimensional interference aware adaptive modulation and coding scheme circuitry. In some examples, the multidimensional interference aware adaptive modulation and coding scheme circuitry may perform the functions of multidimensional interference margin generator 136 described herein.

In some examples, ACM circuitry 126 may transmit a selected MCS (e.g., per-sub-band, per-stream) to a modulator/demodulator and/or an encoder/decoder, such as modulation/demodulation encode/decoders 114 of FIGS. 1A and 1B. As described herein, modulation/demodulation encode/decoders 114 modulate and/or encode a data stream intended for transmission by the one or more antennas of system 100 to, for example, other communications nodes (e.g., remote notes, residential notes, etc.) within a wireless communications system in accordance with an MCS selected by and transmitted from modulation and coding scheme circuitry, such as ACM circuitry 126 of FIGS. 1A and 1B. Additionally, and as described herein, modulation/demodulation encode/decoders 114 may demodulate and/or decode a data stream derived from a signal incident on the one more antennas of system 100 and received by, for example, other communications nodes (e.g., remote notes, residential notes, etc.) within a wireless communications system in accordance with an MCS selected by and transmitted from modulation and coding scheme circuitry, such as ACM circuitry 126 of FIGS. 1A and 1B.

As should be appreciated, ACM circuitry 126 may be implemented in hardware, software, firmware, or combinations thereof. ACM circuitry 126 may, for example, including one or more processors, controllers, and/or circuitry. ACM circuitry 126 may include one or more computer readable media encoded with instructions (e.g., code) which, when executed, cause ACM circuitry 126 to perform operations described herein.

Figure 3:
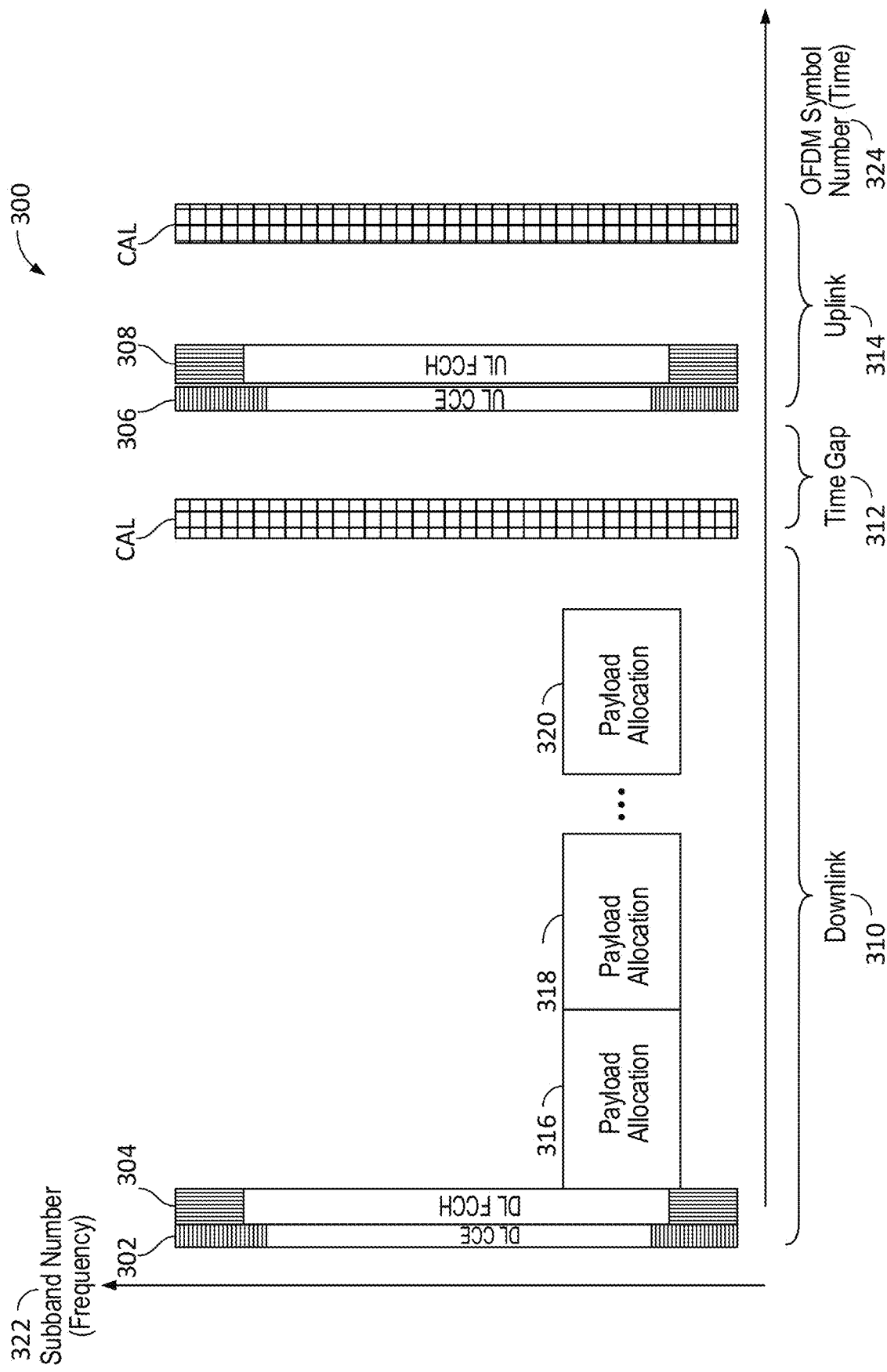
FIG. 3 is a schematic illustration of a radio frame structure, arranged in accordance with examples described herein.

Now turning to FIG. 3, FIG. 3 is a schematic illustration of a radio frame structure 300 (e.g., frame 300), in accordance with examples described herein. Many modern wireless communications systems (e.g., LTE, WiMax, etc.) have adopted OFDM and/or OFDM multiple-access (OFDMA) as a communication standard, as described herein. Under OFDM the frequency domain is divided into a set of equally spaced subcarriers, and the time domain is divided into equally spaced symbols as shown in FIG. 3. In some examples, other transforms that create frequency bands are compatible with the ACM techniques described herein.

Systems and methods described herein may transmit allocation information over a first channel type and the identification of selected modulation and coding scheme(s) over a second channel type. In this manner, the allocation information may be transmitted separately from the MCS selection information. The MCS selection information, recall, may be transmitted on a per-sub-band and/or per-stream basis.

FIG. 3 illustrates subcarriers and symbols in accordance with examples described herein. The vertical-axis 322 represents frequency, while the vertical-axis 324 represents time. The frequency domain (e.g., vertical-axis) is divided into sub-bands, with an undisclosed number of sub-bands being shown in FIG. 3, although any number may be used. Each sub-band contains a specified number of subcarriers, not shown, corresponding to the bins of an OFDM Fast Fourier Transform (FFT) residing within that sub-band. The time domain (e.g., horizontal-axis) is divided into FFT blocks, referred to herein as OFDM symbols. An undisclosed number of OFDM symbols are shown in FIG. 3, although any number may be used within the same or a different amount of time by resizing the FFT as needed. The frame structure shown in FIG. 3 may be used to transmit data to and/or from the system shown in FIGS. 1A and 1B.

Under OFDM, payload data may be transmitted on each subcarrier in each symbol, in some examples as quadrature amplitude modulated (QAM) constellation samples (e.g., payload blocks 316, 318, and 320). In addition, a subset of subcarriers may be designated as non-payload pilot symbols, which may be used to provide amplitude and/or phase reference.

In some examples, a base station (BS) or base node (BN) is transmitting to a user equipment (UE) or residential node (RN) of a wireless communications system, during the first part of the frame 300. This part is often called the down-link (DL) part of the frame, e.g., downlink 310. After a time gap, e.g., time gap 312, the RN is transmitting to the BS or BN for the remainder of the frame. That part is often called the up-link (UL) portion of the frame, e.g., uplink 314. In some examples, user allocations are scheduled in units of a sub-band that spans a number of OFDM subcarriers, e.g. downlink allocation information 302. This may be a first channel type—one that sends allocation information (and/or timing information, power control information, system information, and the like). The channel type containing allocation information may also be referred to as a control channel element (CCE) herein. The CCE refers to a portion of symbols and/or time in a frame used to transmit allocation information (e.g., which users are associated with which sub-bands and/or streams or other transmission segments). In some examples, a user (e.g., remote node) may in some cases have a CCE which spans two sub-bands and one OFDM symbol. As should be appreciated, while the size may be different, in some examples, the CCE may always be present. In some examples, the FCCH may be present for allocated sub-bands and streams.

In some examples, for TDD RDB systems, UL and DL allocations may span the same sub-bands to exploit channel reciprocity. In some examples, selected MCSs are scheduled in units of a sub-band that spans a number of OFDM subcarriers, e.g., downlink per-sub-band MCS information 304. This may be a second channel type—one that sends MCS information. The channel type containing MCS information may also be referred to as a fast control channel (FCCH). The FCCH refers to a portion of symbols and/or time in a frame used to transmit MCS information (e.g., which MCS is associated with a particular sub-band and/or stream). In some examples, the remaining symbols may be used for control channels, beamformer training, and channel sounding.

In some examples, an MCS selection and the feedback channels (CCE/FCCH) may be different in UL and DL. In some example systems, the BN may select both the UL and DL MCS, but in some examples, the selected MCS for the UL may be different than the MCS selected for the DL.

In some examples, and as described herein, various packets, such as input packets, may be converted into modem packets (e.g., by packet processor 118 of FIGS. 1A AND 1B) that in turn are sent over the link in one or many transport blocks (TB) (e.g., payload 316, 318, and 320) depending, in some examples, on packet size and TB MCS across the allocated sub-bands and symbols. The mapping of modem packets into transport blocks can be done in many ways. A simple mapping is the natural order while more complicated mappings such as various forms of pseudo-random mappings that spreads a modem packet across the transport blocks are possible. Furthermore, the transport blocks can be mapped or striped into sub-bands in many different ways as well. In some examples, a transport block may be encoded and transmitted in a one or more frames (e.g., radio frames) in accordance with an MCS selection. In some examples, a transport block as described herein may be derived from a packet, such as an Ethernet packet, an input packet, and/or a modem packet. In some examples, a modem packet may be derived from an input packet or Ethernet packet. For example, an Ethernet and/or an input packet may be broken down into modem packets that in some examples may be broken into transport blocks which in some examples are what the MCS is selected for (e.g., what the MCS is applied to). As should be appreciated, there are various packet to transport block schemes which are contemplated to be within the scope of this disclosure. As should be further appreciated, the ACM applies to the various packet to transport block schemes, and the discussion of Ethernet and/or input packets to modem packs, and modem packets to transport blocks is in no way limiting. In some examples, the MCS is selected to be applied to transport blocks prior to transmission from, for example, a base node, and/or after being received, for example, at a base node.

In some examples, uplink allocation information 306 and per-sub-band MCS information 304 may be sent back to the BS or the BN, by the RN. In some examples, uplink allocation information 306 and per-sub-band MCS information 304 sent back by the RN may be used by, for example, scheduler 116 or switch 120, or packet processor 118 of FIGS. 1A and 1B for subsequent allocation of sub-bands and subsequent transmission of packets over links of various wireless communications (e.g., access) systems described herein. In some examples, a base node may determine a UL and/or a DL allocation (they are matched for RDB) so an RN does not send information about which sub-bands/streams are allocated, but does send information, e.g., channel quality information for the allocated sub-bands.

In some examples, the information and/or content of a CCE and FCCH channel may be different in the UL and DL. For example, the DL FCCH may in some examples contain the MCS and power control information, and the UL FCCH may contain the SINR and error information per-sub-band. Similarly, in some examples, the DL CCE may contain allocation information while the UL CCE may contain channel information from a node (e.g., a remote node), such as for example, overall errors, power control information, and/or many other metrics.

Figure 2:
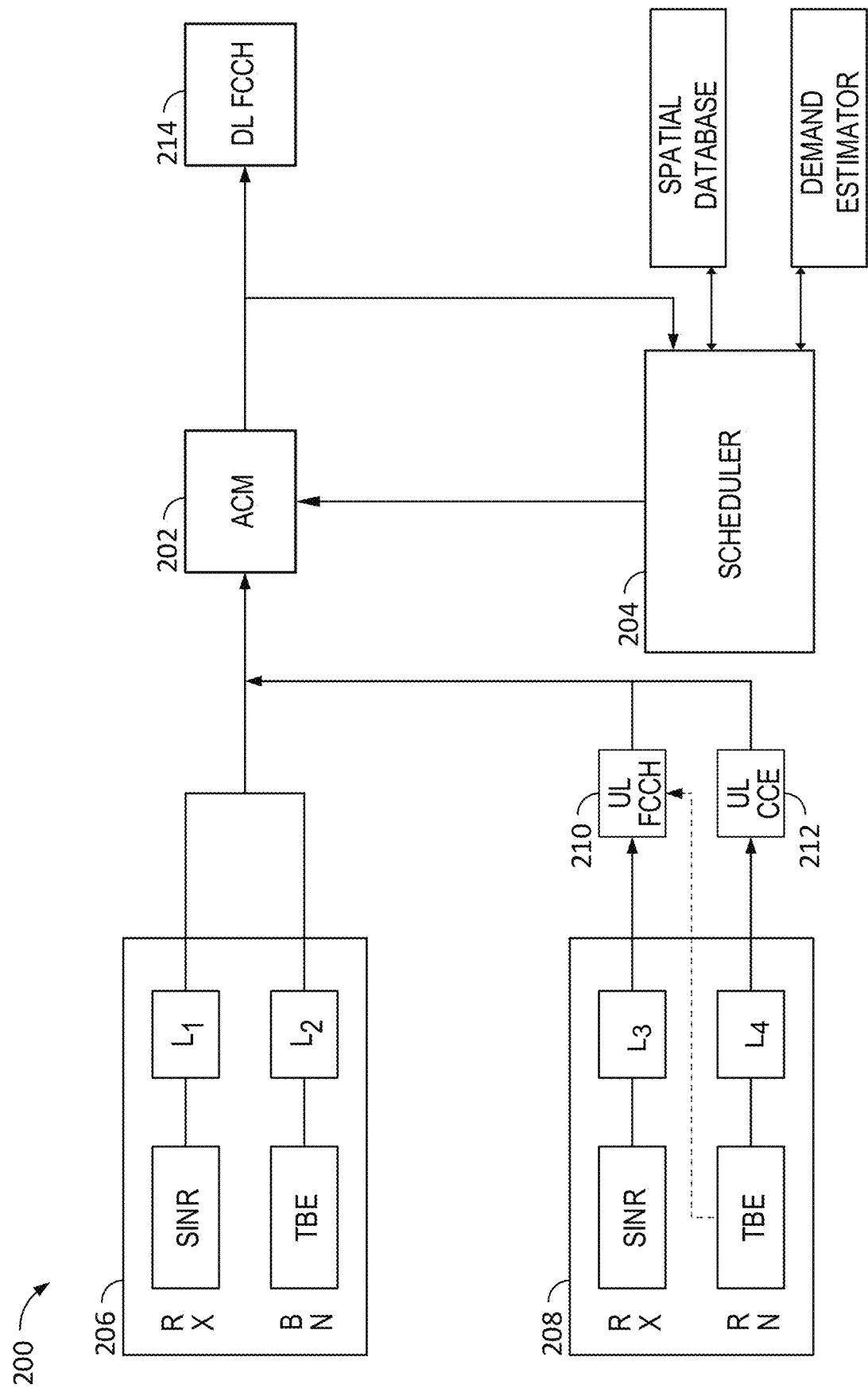
FIG. 2 is a schematic illustration of channel condition metrics, allocation information, and scheduling information used in some examples by ACM circuitry to select modulation and coding schemes, arranged in accordance with examples described herein.

Now turning to FIG. 2, FIG. 2 is a schematic illustration of channel condition metrics, allocation information, and scheduling information used in some examples by ACM circuitry 202 to select modulation and coding schemes, in accordance with examples described herein. As depicted, FIG. 2 includes both components as well as various information inputs of wireless communications systems described herein. As depicted, FIG. 2 includes ACM circuitry 202, scheduler 204, base node 206, and remote node 208. Scheduler 204 may include allocation information (not shown). Scheduler 204 may be coupled to (e.g., communicatively and/or otherwise) one or more spatial databases (as described in FIGS. 1A and 1B) and/or one or more demand estimators (as described in FIGS. 1A and 1B). Scheduler 204 may further include input from the spatial database and/or the demand estimator. In some examples, Scheduler 204 may make allocation decisions based at least on the spatial database, the ACM input, the demand estimator, or combinations thereof. The ACM circuitry 202 may be implemented using and/or may be used to implement the ACM circuitry 126 of FIGS. 1A and 1B, in some examples.

As depicted, and in some examples, ACM circuitry 202 may receive SINR information (e.g., uplink (UL) SINR information) at a communications node (e.g., a base node). In some examples, the SINR information may be a channel condition metric used as an input to ACM circuitry 202. Another input to ACM circuitry 202 is UL channel code error count, which as depicted in FIG. 2, is labeled transport block error (TBE). In some examples, channel code error counts (e.g., TBEs) may generally be defined as the number of blocks of information bits that are received in error. In some examples, the TBE information may be a channel condition metric used as an input to ACM circuitry 202. As depicted, and at remote node 208 (e.g., RN), the SINR and the TBE are fed back to ACM circuitry 202. Recall, in some examples, ACM circuitry 202 may be located in, coupled to, or otherwise in communication with a base node (or other nodes), such as base node 206.

In some examples, and as described herein, the SINR and the TBE (which in some examples are examples of channel condition metrics) are fed back to ACM circuitry 202 using the UL fast control channel (FCCH) and the UL control channel element (CCE). In some examples, a per-sub-band per-spatial-stream SINR and a highly compressed version of the TBE are sent in the UL FCCH channel (e.g., UL FCCH 210). In some examples, a richer version of the TBE but that is still compressed (or in some examples, that may be compressed) is sent back using the UL CCE channel (e.g., UL CCE 212). These different metrics arrive at ACM circuitry 202 with different delays. For example, the BN metrics are available at the BN faster than the RN metrics. This is depicted in FIG. 2 as latency $L_1$-$L_4$ for the different metrics.

Recall that another source of input to ACM circuitry 202 may be scheduler 204. In some examples, scheduler 204 includes or provides (e.g., stores, receives, determines, etc.) information about current allocations, upcoming allocations, and spatial information about all (or some) users within the wireless communications system. Scheduler 204 may provide such allocation information to ACM circuitry 202. In some examples, ACM circuitry 202 may process this information (in some examples, along with other information) and select a corresponding UL and DL MCS per-sub-band per-spatial-stream. ACM circuitry 202 may signal the selected UL and DL MCS per-sub-band per-spatial-stream in the DL FCCH channel to the RN. In some examples, ACM circuitry 202 may also inform scheduler 204 of the chosen (e.g., selected) MCS in order for scheduler 204 to better decide on how many sub-bands are required to meet the throughput demand for a given user of the wireless communications system described herein.

As described herein, scheduler 204 may include allocation information (in some examples, using which, it may partially base an allocation decision on). In some examples, scheduler 204 may be coupled to a spatial database (e.g., a channel database, a spatial channel database, etc.), as depicted in FIG. 2. In some examples, the channel database may contain information about one user, one or more users, and/or all users of a wireless communications system, such as wireless communications systems described herein. In some examples, the channel database may include information regarding whether two users are spatially compatible; in such example, the channel database may be considered a per-user data base. As should be appreciated, in some examples, channel database may contain information regarding how a user relates to other users.

In some examples, another reason for informing scheduler 204 is to enable evaluation of the accuracy of scheduler 204's expected throughput versus the achieved throughput. For example, if an allocation is performing below expectation, it can be removed or shifted to other sub-bands in order to ensure a high system throughput. In some examples, once ACM circuitry 202 selects the DL MCS, it may also inform the BN's channel encoder which MCS to use (referring back to FIGS. 1A and 1B, this may include modulation/demodulation encode/decoders 114). Similarly, once the RN has decoded the DL FCCH (e.g., DL FCCH 214), it informs the channel decoder (e.g., modulation/demodulation encode/decoders 114 of FIGS. 1A and 1B) of the chosen DL MCS in order to decode the message with the correct MCS.

In some examples, the channel encoder at the transmitter and the decoder at the receiver can be implemented in either software or hardware or combinations thereof. Similarly, in some examples, for the UL, the RN (e.g., remote node 208) uses the decoded DL FCCH message to determine the UL MCS and informs the channel encoder. The initial UL MCS for a new allocation may use a different scheme since there may be no DL FCCH message if the allocations starts with an UL allocation. In such examples, either a rule based on known parameters on both base node 206 and remote node 208, or explicit signaling can be used to determine the initial UL MCS (although in some examples other information may be used to make such determination). In this example, the base node 206 decides both the UL and DL MCS in order to utilize the knowledge from scheduler 204 that resides at the base node 206. As should be appreciated, additional and/or alternative implementations are possible and are contemplated to be within the scope of this disclosure, where the MCS decision can be distributed to remote node 208 and/or different combinations of ACM circuitry coupled to other base nodes and/or remote nodes.

MCS Selection Scheme

Recall that, in some examples, ACM circuitry, such as ACM circuitry 202 of FIG. 2 may select an MCS based at least on using a look up table (LUT), such as LUT 130 of FIGS. 1A and 1B. In some examples, an effective SINR for a specific MCS to achieve a specific transport block error rate (TBER) is stored in a look-up-table (LUT) (e.g., MCS_LUT). As stated throughout, in some examples, the MCS decision is performed for each sub-band (e.g., sb) and spatial stream or dimension (e.g., sd). Below is an example pseudo-code description of one example of the MCS selection algorithm described herein (e.g., Algorithm (1), below) where the SINR, margin (MAR), hysteresis (HYST) are all defined per-sub-band per-spatial-stream (e.g., per-stream), but to simplify notation, the sub-band and spatial dimension indices are suppressed.

---
Algorithm (1)
---

```
If SINR_eff(n) > MCS_LUT(MCS(n)+1) + MAR(n) + HYST(n)
    MCS(n + 1) = MCS(n)+1
    for loop = 2: STEP_UP_SIZE
        if SINR_eff(n) > MCS_LUT(MCS(n)+loop) + MAR(n) + HYST(n)
            MCS(n + 1) = MCS(n)+loop
        end
    end
elseif SINR_eff(n) < MCS_LUT(MCS(n)) + MAR(n)
```

---
-continued

Algorithm (1)
---

```
    MCS(n + 1) = MCS(n)-1
    for loop = 2: STEP_DOWN_SIZE
        if SINR_eff(n) < MCS_LUT(MCS(n) - loop + 1) + MAR(n)
            MCS(n + 1) = MCS(n)-loop
        end
    end
else
    MCS(n + 1) = MCS(n)
end
MCS(n + 1) = min[MCS(n + 1), MCS_max, MCS_rem + MAX_diff]
MCS(n + 1) = max[MCS(n + 1), MCS_min]
```

As depicted above in Algorithm (1), the index n refers to the current frame and n+1 refers to the next frame. In some examples, if the effective SINR exceeds the LUT value for the next MCS plus the margin and hysteresis, the MCS is increased. In some examples, the MCS is increased all the way up to a current MCS plus the maximum step up size if the SINR is large enough. On the other hand, in some examples, if the SINR is lower than the LUT for the current MCS plus the margin without the hysteresis, the MCS is decreased. In some examples, the MCS is decreased all the way down to the current MCS minus the maximum step down size if the SINR is small enough.

In some examples, additional steps may be used (not shown) to handle edge conditions such as if the index exceeds the length of the LUT. In some examples, checks may be performed (e.g., by one or more components of the wireless access system described herein) to ensure that a maximum or minimum MCS is not exceeded. In some examples, given that the BN selects both the UL and DL MCS, difference between UL and DL MCS is restricted to not exceed a certain limit using the other link direction MCS (labeled MCS_REM in the Algorithm (1)).

Effective SINR Calculation

In some examples, an effective SINR is a metric (e.g., a channel condition metric) used for MCS selection by, for example, ACM circuitry 202 of FIG. 2. Many implementations of the fine-grained SINR information are possible. In some examples, the effective SINR may be the reported reference symbol (RS) SINR for the current sub-band and spatial dimension. However, there may be reasons to change the granularity by combining multiple sub-bands or spatial dimensions into one MCS decision despite that feedback channels such as FCCH are capable of finer granularity.

In some examples, in practical wireless systems there are also several reasons why the effective SINR might change during a frame. For example, the RN might be mobile so the SINR estimate in the beginning of the frame from the RS-SINR might be quite different from the effective SINR at the end of the frame. Another reason that the SINR might change during the frame is phase noise that may reduce the SINR across the frame. Yet another reason is burst interference on portions of the frame. Referring briefly to FIG. 3, this may be one reason why the frame structure in FIG. 3 also has pilots inserted across the frame to estimate the SINR across the frame to detect these possible SINR changes. In some examples, as the carrier frequency error increases, its corresponding effect on effect on the payload achieved SINR becomes more important. This SINR is called the pilot based SINR or P-SINR and is typically equal or less than the RS-SINR.

An example of an effective SINR would be to simply select the RS-SINR as:

$$SINR_{Reff}(n) = RS\text{-}SINR(n-L_{11})\qquad\text{Equation (1)}$$

where the delay $L_{11}$ denotes the delay of the RS-SINR computation. In some examples, a better performing effective SINR than just the RS-SINR in some examples may be a combination of the RS-SINR and the P-SINR. One scheme would be to select the minimum out of the two as:

$$SINR_{eff}(n) = \min[RS\text{-}SINR(n-L_{11}), P\text{-}SINR(n-L_{12})]\qquad\text{Equation (2)}$$

where the delay $L_{12}$ denotes the delay of the P-SINR.

In some examples, in order to maximize payload throughput, there may be a desire to minimize the number of subcarriers used to transmit the pilots from which the P-SINR is estimated. Accordingly, in some examples, the P-SINR estimate may have a higher variance and standard deviation due to a limited number of pilots.

A high standard deviation in the P-SINR while using Equation (2) may lead to a high standard deviation in the $SINR_{eff}$ and thus also the selected MCS which may be undesirable. In some examples, a better choice may be to post-process the P-SINR to reduce the variance at the cost of less fine-grained P-SINR. This may be accomplished by computing (e.g., using one or more components of system 100 described herein) the minimum of P-SINR across multiple symbols, which also reduces the number of P-SINRs used by ACM circuitry (such as ACM circuitry 202 of FIG. 2) to one per-sub-band per-spatial-stream. The minimum captures P-SINR reductions due to external interference or phase noise in a fine-grained manner.

In some examples, one drawback of that computation may be that the minimum can be lower than the RS-SINR due to the variance alone. In some examples, a slightly more advanced scheme is to compute the $i^{th}$ order statistic across multiple symbols, which limits the variance while trading for less fine-grained P-SINR. In some examples, a yet more advanced option is to combine the $i^{th}$ order statistic with a threshold that only activates the P-SINR if it is more than a pre-defined amount smaller than the RS-SINR. These schemes can be combined with processing across sub-bands. Note that in some examples, the P-SINR may not be independently signaled between the RN and BN so it is not part of standards definitions and can have low latency.

For highly dynamic systems in where a sub-band only may be allocated a single or a few frames, the amount of available averaging or statistics collection may be limited. A method offering substantial variance reduction and low computational cost is to average across all sub-bands, all spatial dimension, as well as over a number of frames. One example of that is to compute a long-term offset from the RS-SINR as:

$$SINR_{offset}(n) = \frac{1}{N_n N_{sb} N_{sd}} \sum_{k=n-N_n+1}^{n} \sum_{sb \in SB} \sum_{sd \in SD}\qquad\text{Equation (3)}$$

$$RS\text{-}SINR(k, sb, sd) - P\text{-}SINR(k, sb, sd)$$

where $N_n$ denotes the number of frames that are averaged, SB denotes the set of allocated sub-bands, SD denotes the allocated spatial dimensions, and $N_{sb}$ and $N_{sd}$ denotes the cardinality of the sets SB and SD. If the allocated sub-bands and spatial dimensions vary across frames, the average needs to be updated appropriately with recursive averaging techniques. The effective SINR may then be calculated (using various components of system 100 described herein), such as ACM circuitry 202, as:

$$SINR_{eff}(n) = RS\text{-}SINR(n-L_1) - SINR_{offset}(n)\qquad\text{Equation (4)}$$

where the offset may be based on the average distance between the RS-SINR and P-SINR as defined above. As should be appreciated, additional and/or alternative versions of this may be possible with different sub-band and spatial dimension granularity. As should further be appreciated, this may be computed by ACM circuitry 202 across all sub-bands and streams, as well as some time duration (e.g., frames). In some examples, additional and/or alternative components of system 100 may perform such calculations.

Hysteresis Selection

Recall that in some examples, ACM circuitry 202 of FIG. 2 may select an MCS based at least on a hysteresis (such as Hysteresis 132 of FIGS. 1A and 1B). Selecting the hysteresis in the ACM technique may generally control various aspects of the system performance. In some examples, the purpose of the hysteresis is to reduce (e.g., prevent) the MCS to jitter between two adjacent MCSs, which may be detrimental in several ways. The jitter in the SINR estimate may increase the error rate by occasionally reporting too high of an SNR that results in a higher MCS than can be supported. Another aspect of hysteresis is that it may increase the variation in the supported bit rate that interacts in a complicated manner with various traffic protocols such as TCP. In some examples, ACM circuitry, such as ACM circuitry 202 of FIG. 2 may perform hysteresis selection as described herein. In some examples, additional and/or alternative components of system 100 may perform such calculations.

In some examples, the hysteresis can be selected by studying its impact on throughput and error rates (either during operation of a system and/or operation of other systems prior to configuration of a particular system) and tune to the best overall hysteresis across all traffic and channel conditions. In some examples, another option is to determine the optimal switching rate and then compute the required hysteresis based on the variance of the effective SINR.

Below is a derivation of the switching rate as a function of the distance between neighboring MCS levels in the LUT 8, the hysteresis h, the standard deviation a of the effective SINR, and x, the mean effective SNR minus the lookup table at the lower MCS minus the margin. The below analysis reveals that the maximum switching rate may occur at x=h/2. Since error rates may be dominated by the outliers, one option for selecting the hysteresis is to operate a hypothetical channel at x=h/2 and compute the required hysteresis to achieve a specific switching rate. Many different techniques to numerically solve for h may be formulated including non-linear search techniques. A benefit of this derivation may be that the switching rate can be kept below a specified maximum by adapting the hysteresis depending on a that is known to the system or can be estimated.

In some examples, a hysteresis may be tuned based at least on observed behavior of the system (e.g., communication system 100) in real radio channels. For example, too small hysteresis may lead to too much jitter which may lead to low throughput but too large hysteresis may lead to lower MCS and thus also lower throughput. The derivation may reveal the behavior of the jitter such that it is maximized at h/2 and the relationship with the standard deviation.

Figure 15:
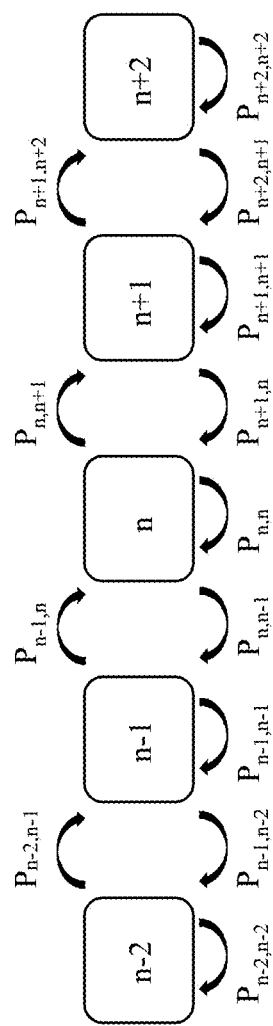
FIG. 15. is a schematic illustration of a state diagram of MCS selection with state transition probabilities, in accordance with examples described herein.

In some examples, it is possible to analyze the MCS hysteresis by treating each MCS as a state and the system of MCSs as a Markov chain. Define the current MCS level as n and consider two MCS levels up and down as shown in the below. Further define state transition probabilities based on the SINR thresholds for each MCS Tn, the hysteresis h, the mean and standard deviation σ of the SINR. The state transition probabilities are also indicated in FIG. 15, which is a state diagram of MCS selection with state transition probabilities. In some examples, a Gaussian distribution is assumed with a relatively small standard deviation, then only two MCSs away from the target MCS are considered. In some examples, only the maximum MCS change of one is considered since for steady state operation and with a relatively small standard deviation, it is uncommon to change more than one MCS at a time.

As depicted in FIG. 15, five states are considered (e.g., n−2, n−1, n, n+1, and n+2). Considering the five states, the transition to the P matrix becomes:

$$P = \begin{bmatrix} P_{0,0} & P_{0,1} & 0 & 0 & 0 \\ P_{1,0} & P_{1,1} & P_{1,2} & 0 & 0 \\ 0 & P_{2,1} & P_{2,2} & P_{2,3} & 0 \\ 0 & 0 & P_{3,2} & P_{3,3} & P_{3,4} \\ 0 & 0 & 0 & P_{4,3} & P_{4,4} \end{bmatrix}$$

Figure 8:
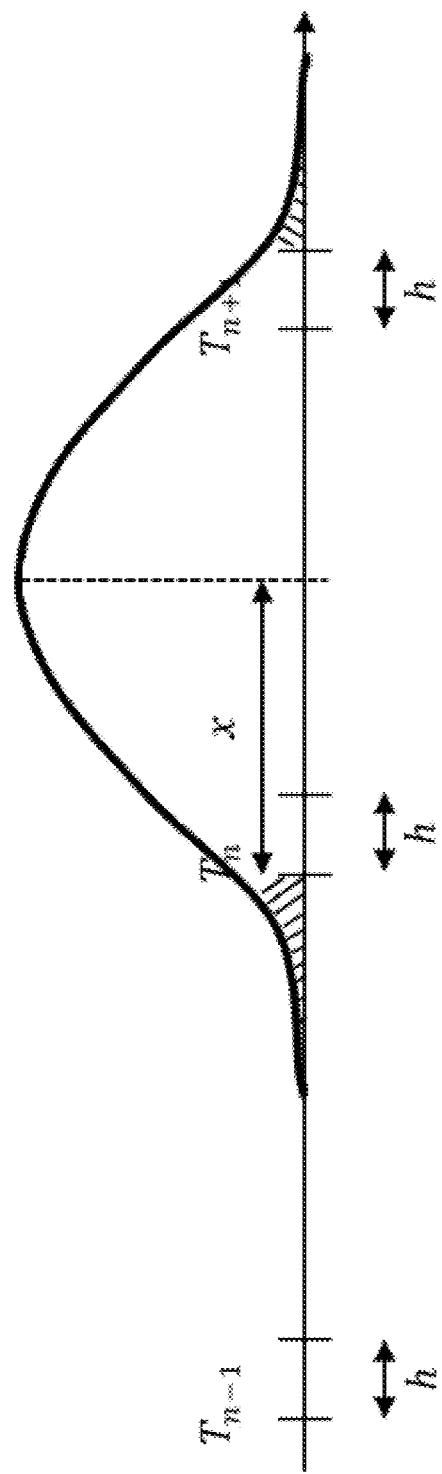
FIG. 8 is an example schematic illustration of a Gaussian-distributed SINR for calculating transition rates, arranged in accordance with examples described herein.

With the transition matrix defined, the steady state probability of all the states can be computed as $$P_\infty = \lim_{n \to \infty} P^n$$

where in most cases the result converges relatively quickly. The average transition rate can then be calculated for state n=2 as:

$$Tr_{ave} = P_\infty(3,:) \, \text{diag}(1-P)$$

where $P_\infty(3,:)$ denotes the third row of the matrix $P_\infty$. To calculate the transition rate, the transition probabilities are required. For tractability, assume that the SINRs are Gaussian distributed with a mean of $T_n + x$ where $T_n$ denotes the SINR threshold including any margin and x denotes the offset from the switching point as illustrated in FIG. 8. The threshold difference between the MCSs is defined as $\delta = T_{n+1} - T_n$ and is the same between all the states in the following analysis.

Consider a current MCS n=2, then using FIG. 8 it is clear that the transition probability marked by diagonal lines on the right-hand side of the curve becomes:

$$P_{2,3} = \frac{1}{\sqrt{2\pi}\sigma} \int_{\delta+h-x}^{\infty} e^{-\frac{x^2}{2\sigma^2}} dx = Q\left(\frac{\delta+h-x}{\sigma}\right) = 1/2 \, \text{erfc}\left(\frac{\delta+h-x}{\sqrt{2}\sigma}\right)$$

where Q( ) denotes the q-function and erfc( ) the matlab definition of the error function. Similarly, the probability of stepping down from n=2 to n=1 marked by diagonal lines on the left-hand side of the curve in FIG. 8 can be expressed as:

$$P_{2,1} = \frac{1}{\sqrt{2\pi}\sigma} \int_{-\infty}^{-x} e^{-\frac{x^2}{2\sigma^2}} dx = 1 - Q\left(\frac{-x}{\sigma}\right) = 1 - 1/2 \, \text{erfc}\left(\frac{-x}{\sqrt{2}\sigma}\right)$$

The probability of staying at n=2 can then easily be expressed as a SINR error distribution with transitional levels of hysteresis, h, seen in FIG. 8.

The remaining transition probabilities are listed below:

$$P_{0,0} = 1 - P_{0,1}$$

$$P_{0,1} = 1 - Q\left(\frac{-x-\delta+h}{\sigma}\right) = \frac{1}{2}\text{erfc}\left(\frac{-x-\delta+h}{\sqrt{2}\sigma}\right)$$

$$P_{1,0} = 1 - Q\left(\frac{-x-\delta}{\sigma}\right) = 1 - \frac{1}{2}\text{erfc}\left(\frac{-x-\delta}{\sqrt{2}\sigma}\right)$$

$$P_{1,1} = 1 - P_{1,0} - P_{1,2}$$

$$P_{1,2} = 1 - Q\left(\frac{-x+h}{\sigma}\right) = \frac{1}{2}\text{erfc}\left(\frac{-x+h}{\sqrt{2}\sigma}\right)$$

$$P_{2,1} = 1 - Q\left(\frac{-x}{\sigma}\right) = 1 - \frac{1}{2}\text{erfc}\left(\frac{-x}{\sqrt{2}\sigma}\right)$$

$$P_{2,2} = 1 - P_{2,1} - P_{2,3}$$

$$P_{2,3} = 1 - Q\left(\frac{\delta-x+h}{\sigma}\right) = \frac{1}{2}\text{erfc}\left(\frac{\delta-x+h}{\sqrt{2}\sigma}\right)$$

$$P_{3,2} = 1 - Q\left(\frac{\delta-x}{\sigma}\right) = 1 - \frac{1}{2}\text{erfc}\left(\frac{\delta-x}{\sqrt{2}\sigma}\right)$$

$$P_{3,3} = 1 - P_{3,2} - P_{3,4}$$

$$P_{3,4} = 1 - Q\left(\frac{2\delta-x+h}{\sigma}\right) = \frac{1}{2}\text{erfc}\left(\frac{2\delta-x+h}{\sqrt{2}\sigma}\right)$$

$$P_{4,3} = 1 - Q\left(\frac{2\delta-x}{\sigma}\right) = 1 - \frac{1}{2}\text{erfc}\left(\frac{2\delta-x}{\sqrt{2}\sigma}\right)$$

$$P_{4,4} = 1 - P_{4,3}$$

Figure 9:
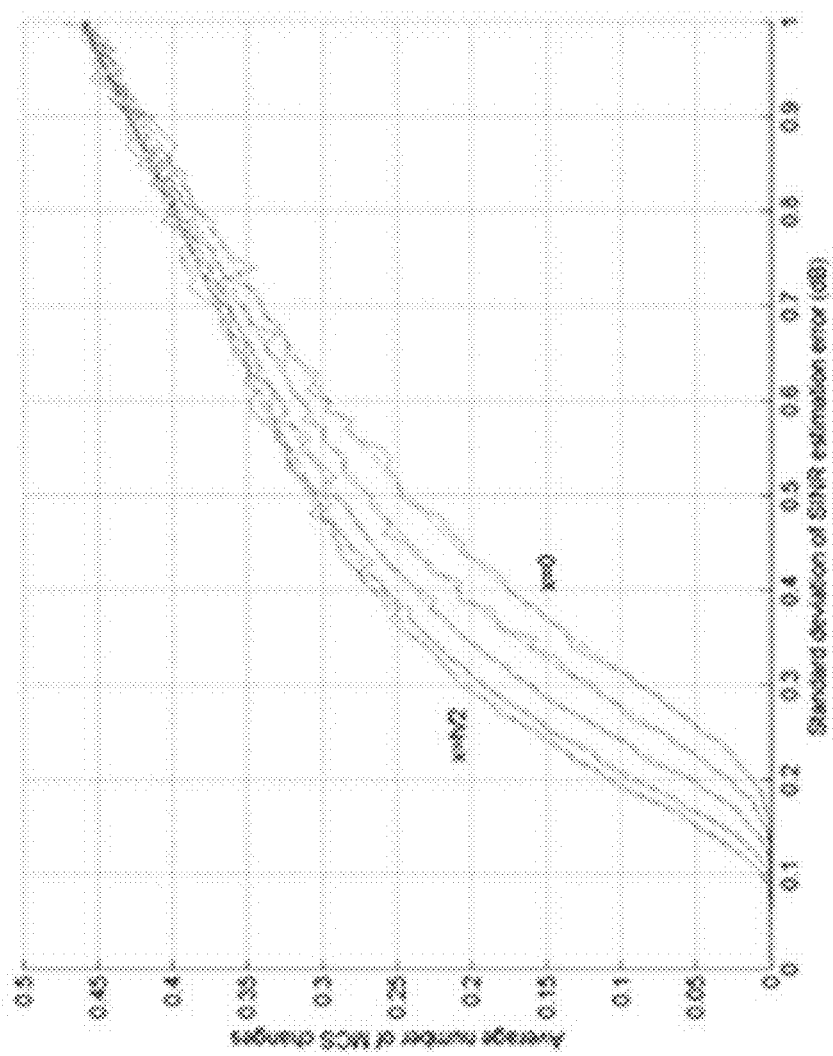
FIG. 9 is an example schematic illustration of simulation results using transition probabilities, arranged in accordance with examples described herein.

Simulation results using the above equations are shown in FIG. 9 for the case of δ=1.5 dB and h=0.5 dB. FIG. 9 depicts the average number of MCS changes versus standard deviation of SINR estimation error, in decibels. The dashed curves show the theoretical result while the solid curves are simply the average over 10000 random realizations and applying the ACM technique described herein. It is clear that the theoretical results match the simulated results well. Several scenarios where the mean of the Gaussian distribution was varied are included FIG. 9. The number of transitions increases as x grows from 0 to h/2, as shown in FIG. 9. After h/2, the number of transitions decrease again.

Figure 10:
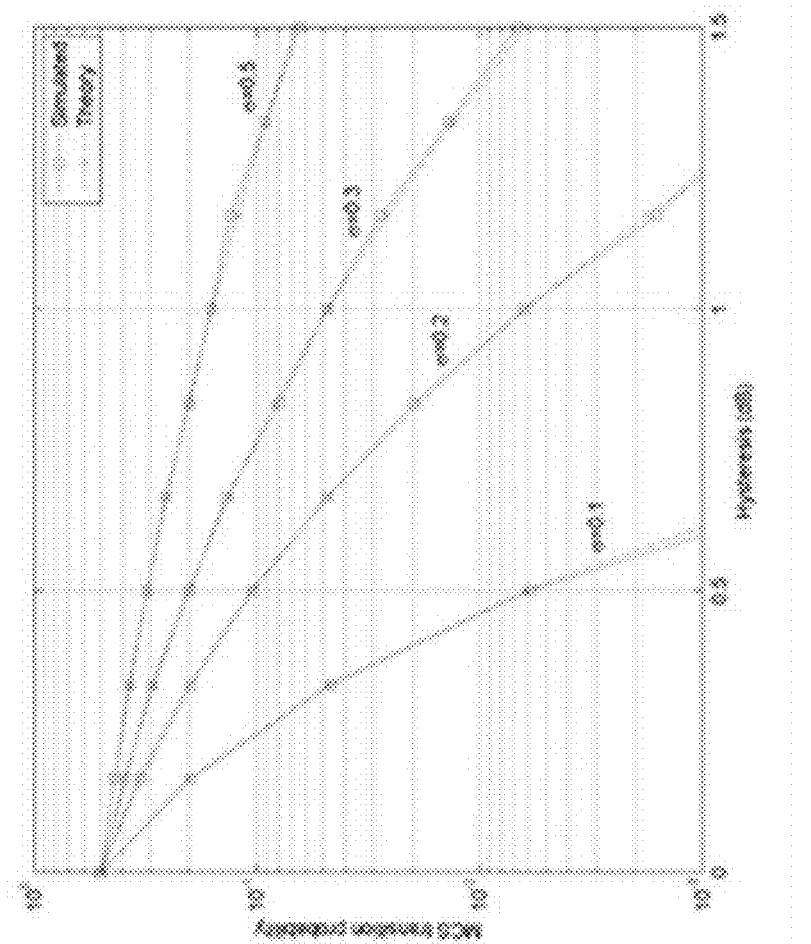
FIG. 10 is an example schematic illustration of MCS transition probabilities for different hysteresis and standard deviations, arranged in accordance with examples described herein.

The MCS transition probabilities for different hysteresis and standard deviations are shown in FIG. 10 where both the simulated and theoretical values are shown. For an SINR estimation error standard deviation of 0.2 dB, selecting a hysteresis of 0.5 dB gives about a 10% MCS change or about once every 20 frames assuming a frame rate of 200 frames per second. In some examples, FIG. 10 and corresponding analysis may be useful as a design tool when deciding the amount of hysteresis to use.

Margin Selection

Recall that in some examples, ACM circuitry 202 of FIG. 2 may select an MCS based at least on a margin, e.g., margin 134 of FIGS. 1A and 1B. Similar to hysteresis, the margin in the ACM technique may generally impact various aspects of the system performance In some examples, the overall error rate can be controlled by selecting the margin, e.g., margin 134 of FIGS. 1A and 1B, appropriately. By selecting a larger margin the overall error rates may decrease and correspondingly for a smaller margin. In some examples, a drawback of selecting a larger margin for a low error rate is that the selected MCS (e.g., selected by ACM circuitry 202) may be lower, which may lower the capacity of the system. Accordingly, in some examples, the selected margin may represent a trade-off between capacity and error rate. In some examples, systems described herein may tune the margin based on simulations and measurements to select a margin that yields good performance on average. The margin may be calculated and selected during operation and/or may be preconfigured in a system. In some examples, the margin may be adapted during operation to current conditions. As should be understood, and as discussed herein, hysteresis may also impact the same or similar error versus capacity trade-off, and in some examples, a large hysteresis may allow for lower margin. In some examples, for optimal performance, both the margin and hysteresis can be optimized in terms of error rate and capacity but also different types of data traffic.

Adaptive Margin

As discussed above, in some examples, margin may be adapted to the current conditions. In some examples, the performance of a selected MCS based on a LUT (e.g., LUT 130 of FIGS. 1A and 1B) with fixed margin and hysteresis may depend on the LUT parameters to accurately reflecting the current channel conditions. Basing the table on SINR alone may ignore other sources of errors that might contribute a higher TBER. Better performance may be achieved in some examples by adjusting (e.g., adapting) the margin and/or hysteresis based on other channel condition metrics such as for example observed error rates. The granularity of an adaptive margin may depend on the allocation structure.

In examples described herein, a single margin (e.g., margin 134 of FIGS. 1A and 1B.) may be computed for all sub-bands and spatial dimensions allocated to a user. This may enable statistics collection for rapid error feedback even in very dynamic allocation environments with relatively few sub-bands allocated. The following description focuses on this example, but the technique is also applicable to systems where a separate margin is used for groups of sub-bands or even a separate margin per-sub-band per-spatial-stream. This is straightforward at the BN where the UL errors may be local to the ACM technique but the DL errors need to be conveyed from RN to the BN. Different feedback strategies are discussed later but first different techniques for adapting the margin to achieve a target error rate are presented.

In some examples, achieving a target TBER metric is desirable for adaptive margin selection. The basic idea behind a TBER based adaptive margin is to monitor the TBEs and transport blocks (TBs) and increase the margin if the errors exceed a threshold and correspondingly decrease the margin if the errors are below a lower threshold. Aside from the feedback aspect the same discussion applies to both the UL and DL adaptive margin.

As should be appreciated, while target TBER metrics are discussed with respect to determining an adaptive margin selection, other target metrics may be used with a similar adaptation scheme. In some examples, depending on the system codec, other metrics may be available. For low-density parity-check (LDPC) codes, the number of corrected bits and iterations can provide information about the operating point before actually taking errors, which is a powerful tool to achieve low error rates. Similar metrics are often available for other codecs. However, in some examples, a benefit of operating on the transport block errors (TBE) in some examples is that the TBE is not directly related to traffic and packet sizes making a low complexity implementation possible.

Below is example pseudo-code (e.g., Algorithm (2)) that illustrates an example implementation of adaptive margin selection discussed herein, and more particularly, pseudo-code for adaptive margin based on transport block error rate counters. In some examples, a TBE counter of modulation/demodulation encode/decoders 114 may provide the error count input to the adaptive margin algorithm (e.g. Algorithm (2)) pseudo-code which is implemented in the ACM circuitry in 126.

| Algorithm (2) |
|---|
| TBLOCK = TBLOCK + TBLOCK_DELTA<br>TBLOCK_ERR = TBLOCK_ERR + TBLOCK_ERR_DELTA<br>If TBLOCK_ERR > N_ERR_INC<br>    MAR = min [MAR + MAR_STEP_UP, MAR_MAX]<br>  TBLOCK_ERR = 0<br>  TBLOCK = 0<br>elseif TBLOCK_ERR < N_ERR_DEC& TBLOCK > N_TBLOCK<br>    MAR = max [MAR- MAR_STEP_DWN, MAR_MIN]<br>  TBLOCK_ERR = 0<br>  TBLOCK = 0<br>elseif TBLOCK > N_TBLOCK<br>  TBLOCK_ERR = 0<br>  TBLOCK = 0<br>end |

As depicted above in Algorithm (2), TBLOCK denotes the TB counter, TBLOCK_DELTA denotes the number of transport blocks since last update. The error counter and the corresponding update are denoted as TBLOCK_ERR and TBLOCK_ERR_DELTA. Although Algorithm (2) may be compatible with any update rate, in some examples, the preferred update is every frame. In some examples, if the error counter exceeds the increase margin threshold N_ERR_INC, the counters may be reset and the margin may be increased by MAR_STEP_UP but not beyond the maximum margin MAR_MAX. Correspondingly, if the number of TBs exceed the adaptive margin block size N_TBLOCK and the errors are below the decrease margin threshold N_ERR_DEC, the counters may be reset and the margin may be decreased by MAR_STEP_DWN but not below the minimum margin MAR_MIN. Finally, if the number of TBs exceed the adaptive margin block size N_TBLOCK but the errors are in between the increase and decrease thresholds, the counters may be reset and the error collection may start over. The fact that, in some examples, the margin may be increased as soon as the error target is exceeded may result in a rapid increase in margin when there are errors since action is taken before the block size N_TBLOCK is met. In some examples, this avoids taking errors for long periods of time before increasing the margin when the channel conditions deteriorate.

In some examples, Algorithm (2) may be applicable to both UL and DL margins. Note that, in some examples, the BN may generally not have access to the number of DL TBEs and a feedback mechanism may be used in order for the BN to update the DL margin. As mentioned herein, the adaptive margin concept may be applicable to any granularity but the description focuses on the case of a per-user margin. For that case, the RN feeds back the total number of TBE for a user to the BN using the UL CCE channel. In some examples, for broadband access systems, large number of TBs may be sent per frame. Using a direct encoding of the TBE may require a large number of bits that may exceed the capacity of the UL CCE control channel.

In order to reduce the feedback while maintaining accurate information of the number of TBEs, a compression technique may be employed in some examples. A compression

```
Encode
x= TBLOCK_ERR_DELTA /N;
y=(1/log(1+c))*log(1+c*abs(x));
TBE_QUANT=round(y/(2^-b));
Decode
yq=TBE_QUANT *2^-b;
xq=(exp(abs(yq)*log(1+c))-1)/c;
TBE_REC=min(round(N*xq),N);
``` technique is outlined below in Algorithm (3) using pseudo-code for transport block error counter compression encoding and decoding. Algorithm (3) may be used with wireless communications system described herein, such system 100 of FIGS. 1A and 1B.

Algorithm (3)

At the RN, the TBE counter update TBLOCK_ERR_DELTA may be encoded by first dividing by N to reduce the overall range and then logarithmically compressed based on parameter c. The final output may be then quantized to b bits. Once the TBE_QUANT bits are received at the BN, the count may be expanded based on the number of bits b and exponentially mapped using the same parameter c. Finally, the received TBE count may be computed by scaling up by the same parameter N and then rounded to an integer. Different parameter choices results in different amounts of compression and accuracy. In some examples, selecting N=2304, c=512, and b=7 may result in lossless coding of the number of TBEs up to 21 TBEs while keeping the relative error below 5%.

In some examples, using both computer simulation and TDD retro-directive beamforming (RDB) systems with dynamic allocations in time, frequency, and/or space radio-frequency links shows that the above algorithms maintain the desired TBER that can be approximated as TBER=(N_ERR_INC+N_ERR_DEC)/(2*N_TBLOCK). In some examples, selecting the three thresholds helps provide control of not only the TBER but also the system behavior in terms of convergence and switching rates. The maximum and minimum margins further provides control of system behavior.

In some examples, an unfortunate characteristic of radio channels is that there can be bursts of errors due to channel behaviors such as objects moving and changing the radio channel but also external interference. In such cases, the adaptive margin will rapidly increase and after the error burst is gone, the margin will decrease but at a slower rate since each down step requires N_TBLOCK TBs to be accumulated. Given that the rate that TBs are accumulated depends on the allocation size, smaller allocations might be slow to return the adaptive margin to its nominal value. A characteristic of recovering from error events is that the margin is decreased many times in a row. Hence, a technique can be designed that adjusts the margin more rapidly if multiple reductions in margin has occurred. There are many different implementations of this that are possible such as increasing the down step size with the number of consecutive down adjustments, e.g., an adaptive step size.

Another implementation is to reduce the block size with the number of consecutive down adjustments, e.g., an adaptive block size. An updated version the pseudo-code for adaptive margin based on transport block error counters and adaptive block size is shown below in Algorithm (4).

Algorithm (4)

```
TBLOCK = TBLOCK + TBLOCK_DELTA
TBLOCK_ERR = TBLOCK_ERR + TBLOCK_ERR_DELTA
N_BLOCK_RED = LUT (RED_CNTR)
If TBLOCK_ERR > round(N_ERR_INC/N_BLOCK_RED)
        MAR = min [MAR+ MAR_STEP_UP, MAR_MAX]
    TBLOCK_ERR = 0
        TBLOCK = 0
    RED_CNTR = 1
elseif TBLOCK_ERR < ceil(N_ERR_DEC/N_BLOCK_RED) ...
        & TBLOCK > ceil(N_TBLOCK/N_BLOCK RED)
        MAR = max [MAR- MAR_STEP_DWN, MAR_MIN]
    TBLOCK_ERR = 0
        TBLOCK = 0
    RED_CNTR = RED_CNTR + 1
elseif TBLOCK > ceil(N_TBLOCK/N_BLOCK_RED)
    TBLOCK_ERR = 0
        TBLOCK = 0
    RED_CNTR = 1
end
```

In some examples, if the margin is adjusted (e.g., adapted) down, the block size may be reduced by increasing a reduction counter RED_CNTR that then maps into a look-up-table. For example, for the first down adjustment the block size v reduced by a factor of two and after five down adjustments the block size may be reduced by a factor of 12. Note that, in some examples, the increase and decrease thresholds may be adjusted correspondingly to maintain the target TBER unless large reductions are used where the number of errors thresholds are severely quantized. In some examples, it is important to have a ceil operation on the reduce error threshold rather than a round in order to avoid a comparison with zero when "N_BLOCK_RED" is large. If there is a margin increase or the errors are in between the thresholds, the reduction counter may be reset. Other similar implementations are possible where the LUT (e.g., LUT 130 of FIGS. 1A and 1B) is replaced with a list of counter thresholds and a corresponding reduction list if the respective thresholds are exceeded. The proposed techniques (e.g., algorithms) discussed herein are applicable to many other scenarios where it is desired to decrease the recovery time after an error event or other cases where a margin needs to be substantially reduced. In some examples, the improvement in recovery may be directly proportional to the reduction factor used in the LUT (e.g., LUT 130 of FIGS. 1A and 1B) and the rate of modifying the reduction factor.

For the adaptive margin described above, a default starting margin is selected and for users with long periods of inactivity, the margin is reset to the default.

Granularity Optimization

Recall that MCS selection by, for example, ACM circuitry 202 of FIG. 2, may be closely related to the chosen codec since the selected MCS may determine the modulation and the amount of coding that is applied, which may affect the number of bits and sub-bands the encoded bits are transmitted on. For wireless systems with one MCS for the whole allocation such as LTE, the encoding spreads the bits from a single code block across all the sub-bands despite different channel conditions at the different sub-bands. For fine-grained MCS selection schemes, it is possible to separate a large allocation into many smaller blocks of which each one is encoded separately. Each one of this smaller frequency blocks, has a separate MCS and spans a set of contiguous sub-bands that are considered grouped together. The blocks of encoded bits using a specific MCS, e.g. transport blocks (TBs), are then mapped across those sub-bands.

Figure 5:
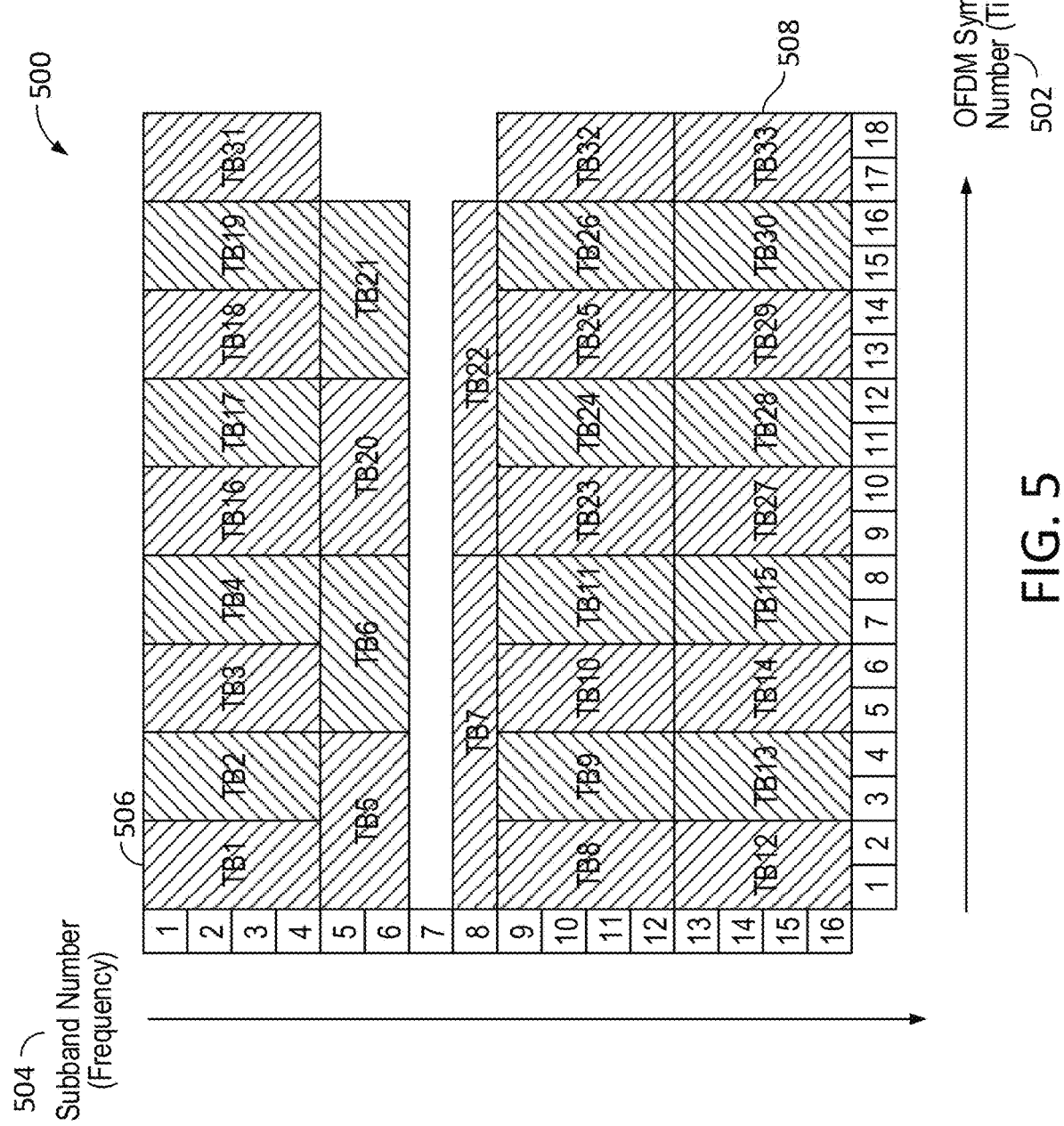
FIG. 5 illustrates transport block mapping sub-bands and reference symbols, arranged in accordance with examples described herein.

Referring briefly to FIG. 5, FIG. 5 is an example of such a mapping or striping. A modem packet may be mapped into potentially many transport blocks. This mapping scheme may be optimized based on channel conditions and hardware capability. Hence, one transport block may span one or many contiguous sub-bands and a different number of OFDM symbols. Thus, there may be a need to find an MCS that yields the desired error rate when the coded bits are sent over multiple sub-bands with potentially different channel conditions. Many metrics may be used to quantify channel conditions of which the one used in the example system is the effective SINR computed from the RS-SINR and P-SINR. To determine a single MCS (e.g., by ACM circuitry 202 of FIG. 2) for multiple sub-bands, many techniques can be used.

For broadband wireless access systems such as LTE and WiMAX, different non-linear mappings such as mutual information (MI) or exponential effective SINR mapping (EESM) based schemes are typically used. The optimal mapping clearly depends on the chosen codec and its implementation. For the LDPC code used in the example system it was found that a reciprocal average technique closely matched the codec performance for all MCSs:

$$SINR_{eff} = 10\log_{10}\left[\frac{1}{\frac{1}{N_{sb}}\sum_{b=1}^{N_{sb}} 10^{-\frac{SINR(b)}{10}}}\right] \quad \text{Equation (5)}$$

where $N_{sb}$ denotes the number of sub-bands that are grouped together, SINR(b) is the SINR for sub-band b in the units of dB, $SINR_{eff}$ is the corresponding effective SINR in units of dB that then is used for MCS selection. This metric has the benefit of being simpler to compute in some examples than most MI or EESM techniques. Another possible scheme that is more conservative is to select the ith order statistic of the RS-SINR.

One benefit of grouping several sub-bands together for transmitting a transport block in some examples is that the variance of the SINR estimator is reduced. Another benefit in some examples of grouping several sub-bands in the example system is that the same bits are sent from multiple FCCH sub-bands that effectively lowers the code rate and improves the robustness of the FCCH codec through code diversity. From Equation (5) note that the more sub-bands are reciprocal averaged, the lower the variance. A lower SINR variance allows for lower margins and thus also higher capacity. On the other hand, grouping too many sub-bands makes the solution less fine-grained and less capable to adapt to different channel conditions per-sub-band per-spatial-stream. However, just like in wireless broadband access system such as LTE and WiMAX, coding across different channel conditions allows for extracting frequency diversity that partially offsets this loss of granularity.

Dynamic MCS based on Spatial Information and Allocation Information

Recall that, in some examples, ACM circuitry 202 may select an initial MCS based on allocation information and spatial information. In some examples, a typical implementation of a TDD RDB system may initiate a new allocation by an UL transmission in a first frame followed by both an UL and DL transmission in subsequent frames. Given that in some examples, the first few frames may not have feedback due to the latencies (e.g., $L_1$-$L_4$) a different mechanism, as described throughout (e.g., use of spatial information and/or allocation information), may be used until feedback (e.g., channel condition metrics) is available at ACM circuitry 202.

A powerful feature of a fine-grained MCS (such as an MCS selected by ACM circuitry 202 of FIG. 2 using methods described herein) is the ability to connect the MCS selection with a scheduler (e.g., scheduler 204 of FIG. 2) and channel state information. In some examples, several performance improvements are possible in some examples in a dynamic allocation environment with spatial multiplexing between users as well as multiple spatial dimensions per-user. Many of these benefits are tied to a knowledge of the channel state information (CSI) at the RN and BN in the form of a spatial channel database (e.g., spatial database 124 of FIGS. 1A and 1B).

In some examples, there may be various ways of obtaining this database. In one example, it may be to transmit a known DL sounding signal from the BN. In another example, it may be to use the spatial structure of the received broadcast channel. Regardless of the method of obtaining the CSI, all RNs estimate their channels and send those back to the BN to form a database at the BN. In some examples, if the BN also announces the DL transmit power in a broadcast channel, the RN can estimate the pathloss or power-loss and feed that back to the BN. For the system 100 describe herein, the DL sounding signal is sent on the last DL symbols. An UL sounding signal can also be employed to complement or replace the feedback. In some examples, using the information stored on the spatial channel database, several important features can be implemented.

As one example, when scheduling a new allocation on a set of sub-bands (e.g., using scheduler 116 of FIGS. 1A and 1B and/or scheduler 204 of FIG. 2), the scheduler may load the per-user spatial channel from a data-base. If it is the first spatial dimension on a sub-band, a base SINR may be computed from the database based on the pathloss and used to select the MCS for the initial frames until the BN receives SINR feedback. For allocations that only stay up for a short time, the ability to start at the desired MCS provides a large performance improvement.

As another example, when scheduling a new allocation on sub-bands that already have allocations either from different users or other spatial dimensions from the same user (e.g., using scheduler 116 of FIGS. 1A and 1B and/or scheduler 204 of FIG. 2), the initial MCS computation may need to be different. With knowledge of the spatial properties of the other spatial channels that are spatially multiplexed, a predicted SINR can be computed. In some examples, there are various ways of computing this SINR using the spatial database. One possible method that is of relatively low complexity is to compute the similarity or correlation between users. For example, the correlation between dominant eigenvectors of the different user's channels can be used to compute the SINR impact. Other methods, of varying complexity, based on the azimuth difference or GPS location of users can also be used to predict the SINR impact of the allocation change. This predicted SINR can also be combined with the base SINR to arrive at the initial MCS. For a dynamic system with many users and spatial dimensions that are different per-sub-band per-spatial-stream or group of sub-bands, this feature can considerably improve the performance. Many mappings of correlation into an SINR prediction can be considered such as pair-wise correlations, multi-dimensional correlations or non-linear mappings to compute the predicted SINR based on the channel database. A feature of this in some examples is that not only can the initial SINR be predicted for a new user or spatial dimension, the SINR impact of a new user or spatial dimension on the existing allocations can also be predicted. Hence, if adding a new allocation reduces the SINR of the existing users, it can be predicted in advance and the MCS is adjusted accordingly for those users without incurring TBEs. That is a very important ACM component in a dynamic high throughput system.

In another example, after a few frames, the SINR feedback for a new allocation becomes available to the BN's ACM technique and the MCS is adjusted away from the initial MCS value. When no predicted SINR is available or inaccurate, it can take several frames of MCS step-ups to arrive at the appropriate MCS. For example, if the initial MCS is selected as 0 but the SINR feedback indicates that MCS 12 can be supported, it would take twelve frames to arrive at MCS 12 if STEP_UP_SIZE=1. For short allocations this can negatively impact throughput. One way of making the ACM more responsive is to increase the step size at the first frame when the SINR feedback is available. In the example above, assuming that it takes two frames to receive the SINR feedback and a step size on this particular frame of 12, the average MCS for the first 14 frames would be 10.3 using this feature compared to 5.6 using a fixed step size of one. That corresponds to doubling the throughput. For allocations of even shorter duration, the gain can be even higher. For six frames, the improvement is a factor of five.

In another example, in a TDD RDB based system the initial transmit beamforming weights may be selected based on the spatial channel database. In some examples, doing so may improve the convergence rate of the retro-directive beamforming which ultimately impacts the convergence of the SINR and thus also the MCS and throughput. Still the convergence rate will depend on the existence of other spatial users at the same sub-band. This convergence rate can be predicted using the current weights and the spatial database. Other systems parameters and control systems can also impact the convergence rate. With a predicted convergence rate, the MCS can be adjusted pre-emptively compared to waiting for SINR feedback before adjusting the MCS. Doing so may further improve the throughput.

In another example, the performance improvement with a predicted SINR may depends on the accuracy of the MCS prediction. Correlation based approaches may yield accurate predictions but many other approaches such as mutual information (MI), exponential effective SINR mapping (EESM) can also be used. Concepts from machine learning, artificial intelligence, and neural networks can also be applied. Even a simple scheme such as asking the scheduler to report the average prediction error, average it, and then applying it to the prediction to reduce the average error. In some example, this scheme may be effective in removing bias in the prediction scheme. This scheme may also easily be extended by applying control theory concepts.

Allocation Based Adaptive Margin Block Size

In some examples, one drawback of examples of adaptive margin techniques described herein may be that the number of frames it takes to reach the block size N_TBLOCK depends on the size of the allocation. For example, an allocation spanning one sub-band may be 64 times slower in adjusting the margin compared to an allocation spanning 64 sub-bands due to the number of TB per frame dependency on allocation size. While various adaptive block size schemes are possible, once simple scheme of low implementation complexity is to simply compute a per-frame block size as:

$$N\_TBLOCK(n) = N\_TBLOC\_FULL \frac{N_{sb}}{N_{sbMax}} \quad \text{Equation (6)}$$

where N_TBLOCK_FULL denotes the full block size that is used for a full allocation of all sub-bands $N_{sbMax}$. For smaller allocations, the block size is scaled based on the number of allocated sub-bands as shown in Equation (6). In order to maintain the same overall error rate the increase and decrease thresholds also needs to be modified as:

$$N\_ERR\_INC(n) = \text{round}\left[N\_ER\_INC\_FULL \frac{N_{sb}}{N_{sbMax}}\right] \quad \text{Equation (7)}$$

$$N\_ERR\_DEC(n) = \text{ceil}\left[N\_ERR\_DEC\_FULL \frac{N_{sb}}{N_{sbMax}}\right]$$

Using the block size in Equation (6) and thresholds in Equation (7), the adaptation speed or convergence rate may be significantly less dependent on the allocation size. In some examples, this scheme may also be combined with the adaptive block size based on number of down adjustments described herein. It should be appreciated that additional and/or alternative implementation options may be devised that achieve the same or similar behavior. Another example is to define a few allocation size levels such as 8, 16, 32, 64 sub-bands and corresponding block size and then characterize each allocation to the closest allocation size level. For allocations that are dynamic in time, the above equations may be adjusted to use a time averaged number of allocated sub-bands instead.

Margin Adjustment based on Granularity

In some examples, manually offsetting the margin until performance is optimized where the margin for each sub-band is selected as MAR(SB)=MAR_AVG+MAR_SB_ADJ (N_GSB) where MAR_AVG denotes the average margin across all sub-band grouping options and MAR_SB_ADJ is a look-up table (e.g., LUT 130 of FIGS. 1A and 1B) with the adjustment as a function of the number of grouped sub-bands. The different adaptive margin methods described herein may then be applied to the average margin MAR_AVG. In some examples, ACM circuitry, such as ACM circuitry 126 of FIGS. 1A and 1B and/or ACM circuitry 202 of FIG. 2 may perform the offsetting and/or other margin adjustment described herein. As should be appreciated, in some examples, additional and/or alternative components of system 100 may also perform such offsetting and/or other margin adjustment.

In some examples, another option is to separate the TBEs per-sub-band per-spatial-stream into groups based on the sub-band grouping for each sub-band. Then the adaptive margin can be computed independently for each grouping number. A drawback of this scheme in some examples may be a higher computation and slower convergence due to fewer TBs in each group.

In some examples, a separate margin for each group size can be obtained by still separating the TBEs into groups based on the number of grouped sub-bands. However, instead of computing a separate adaptive margin, a common adaptive margin is computed and then offset by a vector with a zero mean adjustments for each of the groups. For example systems described herein, the possible groupings are 1, 2, 4, or 8 so the length of the vector is four. Each time the adaptive margin is adjusted as described by Algorithm (2), the TBEs and TBs may be sorted into groups based on the sub-band grouping. In some examples, compute the TBER for each group and find the grouping ii with the highest TBER. Then define an adjustment update vector MAR_SB_ADJ_DELTA as having elements -D except for element ii that has the value 3D resulting in a zero mean adjustment update vector MAR_SB_ADJ_DELTA. The adjustment vector based on grouping is then computed as MAR_SB_ADJ=MAR_SB_ADJ+MAR_SB_ADJ_DELTA. The final margin may then be calculated MAR (SB)=MAR_AVG+MAR_SB_ADJ (N_GSB). For example, assume that the margin is starting out at 3.00 for all sub-groups. At the first update, the grouping of a single sub-band has the highest TBER so the adjustment update vector MAR_SBADJ_DELTA=[0.03, −0.01, −0.01, −0.01] for D=0.01. Hence, the adjustment vector becomes MAR_SB_ADJ=[0.03, −0.01, −0.01, −0.01] since no previous adjustment was available. At the next update, grouping of two sub-bands has the highest TBER so the MAR_SB_ADJ_DELTA=[−0.01, 0.03, −0.01, −0.01] and MAR_SB_ADJ=[0.02, 0.02, −0.02, −0.02]. To avoid dynamic interaction with the overall margin, D should be selected small so the per sub-group size adjustment is very slowly varying. Enhancements such as maximum adjustment and weighting based on allocated sub-bands may further improve performance.

Error Burst Mode

In some examples, ACM technique(s) described herein primarily react to observed metrics, such as SINR and TBEs. In many cases, there can be intermittent interference that goes on and off and each time the SNR may drop and the MCS is lowered. Unfortunately, due to the latency in the SINR feedback, errors accumulate during this time that cause a lower throughput. If the type of error source is not reflected in the SINR, errors may accumulate until the adaptive margin reacts. Although the two sources are different, in both cases it results in errors during each error cycle or burst.

In some examples, one way to avoid or reduce the effects of an error burst may be to monitor the current and past behavior and change the state of the link to an error burst mode where the margin is increased pre-emptively to avoid frequent error cycles. In some examples, one drawback of this approach may be that the eliminated or lower error rate comes at the cost of a lower MCS until the link is declared to be out of the error burst mode. While various different implementations are possible, one is to monitor TBEs bursts and SINR drops and set the link in the error burst mode for a time and then evaluate if it can return to normal mode. Different levels of margin increase can be applied within this mode. For example, if the error burst mode is active but errors still accumulate, the margin may be further increased. An error burst mode may be efficient when there are strong interference sources or highly dynamic channel conditions that come and go relatively frequently but slower than the standard adaptive margin decay times. Another benefit of an error burst mode in some examples is that it can be implemented with a much finer granularity than an adaptive margin.

In some examples, error burst ACM handling is applicable in both UL and DL link directions. To reduce the latency and the impact on the general ACM technique, the local node (e.g., remote node, base node, residential node, etc.) can pre-emptively reduce the reported SINR. By having the local node reduce the SINR, no extra feedback may be required. The RN may also have access to more channel condition parameters that can be used to make the local decision of activating the error burst mode rather than feeding burst metrics back to the BN.

In some examples, another option of implementing an error burst mode is to use a memory of the lowest SINR across a window of time that is used for the effective SINR instead of the current SINR. If the number of TBE over the current memory length is higher than a threshold, then increase the window size over which the minimum SINR is calculated. Conversely, in some examples, if the transport block error is below the threshold, then decrease the window size.

An example of possible window lengths are 0, 2, 4, 8, 16, 32, and 64 frames. If the bursts are very infrequent, retransmissions are effective so there is no need for very long memory lengths. A short memory should not change the SINR much while the window size is going back to zero. The response time to go from no memory to full memory in the example is only sum (2, 4, 8, 16, 32, 64)=126 frames. Conversely, it is only 126 frames to go back to no memory.

No Data MCS Indicator

In some examples, one limitation of the ACM schemes discussed herein may be that if a sub-band or group of sub-bands are exposed to an error source such as external interference, even the lowest MCS (or SNR) could generate errors. Consider an allocation that spans many sub-bands of which one is exposed to very strong interference and even the lowest MCS cannot be received correctly. If that sub-band consistently is in error, larger packets that require many transport blocks would consistently be in error, triggering ARQ re-transmissions that would also consistently be in error. Furthermore, the errors would accumulate resulting in a larger margin for the whole allocation and a dramatically lower throughput on the "good" sub-bands.

To avoid this scenario, the ACM scheme may report the MCS back to the scheduler (e.g., scheduler 204, and as indicated in FIG. 2) which may enable the scheduler (e.g., scheduler 204) to remove the allocation at the error prone sub-band. A problem with this approach in some examples may be that the scheduler is not aware the difference between the lowest MCS with no errors or the lowest MCS with many errors. One way of avoiding this scenario is to change the PHY to not send any of the information bits on this sub-band since that would avoid a repeated retransmissions. Hence, there is a desire to have a special MCS that indicates no data transmission is possible. Defining a no data MCS would signal to the scheduler that this sub-band is not capable of sustaining any payload data and need to be removed. Similarly, a no data MCS used inside the PHY to not map any information bits onto sub-bands avoid packets consistently being in errors and repeated retransmissions. This would also avoid running up the adaptive margin due to the errors on the sub-bands not capable of supporting the lowest MCS.

Simulations and tests show large gains with this approach for the case of one or a group of poor sub-bands which can often be a common case in practical broadband wireless access system operating in un-licensed bands.

MCS Selection Incorporating Allocation Granularity and Packet Size

Broadband wireless access systems are capable of transmitting at very high data rates such as Gbits/s but some applications such as voice-over-internet-protocol (VOIP) have their data rate requirements measured in kbits/s. In many systems, the minimum allocation size can exceed the typical VOIP packet leading to possible inefficient allocations. Another aspect is that there are latency requirements making re-transmissions are undesirable. Other types of applications that have a large portion of small packets with latency constraints is online gaming applications. A unique aspect of TDD RDB systems is that the UL and DL are matched to enable channel reciprocity. However, the UL and DL traffic requirements can be quite different. For instance, a large packet with an updated graphical picture of the game situation is sent in the DL while a very short packet such as walk forward is sent in the UL. Since the allocations span the same number of sub-bands, only a portion of the UL capacity may be required.

In the example system, an allocation where the encoded information bits does not fill up the allocation, additional bits are added or padded to fill out the allocation. This may be inefficient but sometimes advantageous as described above. To avoid costly re-transmissions of possibly latency sensitive small packets, a lower MCS can be used to better protect the information bits without losing any throughput. In this manner, the padded bits may be reduced, which are not used anyways, and replaced with additional bits created by choosing a lower MCS. This can make a large difference both for the UL/DL example as well as the small packet example where the allocation granularity is larger than the packet size.

MCS based padding minimization may be implemented in many different ways. One PHY oriented technique is to monitor the padding per group of sub-bands and lower the MCS until the padding is minimized. A MAC centric approach is to monitor the queue and match the MCS with the allocation granularity. This works well for single small packets but less well for gaps in allocation granularity. Another technique is to monitor the traffic and separate it into different queues where a lower MCS is used for queues designated as small packet queues. Possible discrepancies between UL and DL may be monitored well by just looking at the overall queue depth without monitoring padding of individual sub-bands and queues.

Dynamic TBER Target based on the Selected MCS and Packet Distribution

The adaptive margin described herein is based at least in part on counting TBEs and achieving a specific TBER which is one of several PHY parameters. However, the TBER is only partly related to the user experience, which is more directly impacted by throughput and packet errors of different traffic protocol. A different adaptive margin approach is to target the packet error (PER) instead of the TBER. A challenge with this approach is that the PER is not directly a PHY parameter. It can be observed by measuring the packet performance at the switch or higher layers. However, with padding and UL and DL traffic imbalances there might be cases where transport blocks are sent without any corresponding traffic leaving no relevant PER to base the margin on.

Another challenge is that the adaptive margin controls the TBER that then maps into a PER. That mapping depends on the size of packets as well as the MCS level. For example, assuming uncorrelated errors may be expressed as:

$$PER = 1 - (1 - TBER)^{N_{tb}} \quad \text{Equation (8)}$$

where $N_{tb}$ denotes the number of transport blocks that are required to transmit one packet. Using the binomial approximation, the PER can be expressed as:

$$PER \approx N_{tb} TBER \quad \text{Equation (9)}$$

Note that in practice, errors may be correlated which changes the TBER PER relationship significantly and that HARQ or ARQ will lower the final error rate at the cost of increased latency. It is clear that the mapping depends strongly on $N_{tb}$. A typical large Ethernet packet is 1500 bytes while a small packet may be just 64 bytes. Further assuming a minimum TB size of 48 bytes and a maximum TB size of 354 bytes, it is clear that the range of $N_{tb}$ in this example would be $N_{tb} \in [1, 32]$. For example, selecting an operating point of TBER=0.001 could yield PER=0.001 all the way up to PER=3.2% depending on MCS and packet size before retransmissions. Most traffic control protocols work best at a PER below a certain level such as 0.001% or 1 e-5. Selecting a TBER target of 0.001 but sending a 1500 byte packet using the lowest MCS would result in a 3.2% PER before retransmissions which may be too large for most traffic control protocols. Retransmissions will reduce the PER but add latency that interact with most traffic control protocols in negative way due the extra latency (particularly for TDD).

Based on the above observations, better performance can be obtained by having a dynamic TBER target based on the MCS and packet distribution with the goal of achieving a target PER. For example, in the above example where one packet spanned 32 transport blocks, a TBER target of 3e-5 would approximate a PER of 0.001. Fortunately, for most codecs, the TBER versus SNR is relatively steep so the SINR increase is not as significant as the difference in operating point may suggest.

There are many different techniques that can be designed to calculate the TBER target in order to achieve a target PER. In some examples, a low complexity technique would be to assume large 1500 byte packets, compute the predicted average MCS based on a pathloss which is fairly static, compute $N_{tb}$, and then use Equation (9) to compute the TBER target. In some examples, a slightly more involved technique is to compute a time averaged MCS level and use that to compute $N_{tb}$, and then use Equation (9) to compute the TBER target. This would be more accurate but would still not reflect the distribution of packets. In some examples, the previous technique can be extended to compute both average MCS and average packet sizes by monitoring the queues and switch metrics. In some examples, an even better performing technique is to separate traffic into different queues based on packet size and use that to select a separate TBER target per queue type using a separate adaptive margin per queue. For example, the large packet queue would use a lower TBER target than the small packet queue. Yet, in some examples, another possible implementation is to use a margin that depends on the SINR such that a larger margin is used for lower SNRs where a lower MCS would lead to a larger $N_{tb}$.

Static and Dynamic Packet Fragmentation

Examples described herein have included a description of the relationship between TBER and PER and that the application performance is closely related to the PER but the ACM module is more closely related to the TBER. Several techniques to dynamically select the TBER target based on the PER and packet size are described herein. A different approach to the same issue may be to modify the modem packet size to make the TBER closer to the PER by using fewer transport blocks to send a modem packet. Modem packet size is defined here as the packet size that the transmit and receive modems uses which is different from the input packet size. One approach is to split a large input packet into several smaller modem packets, e.g. fragment the input packet. These smaller modem packets may exhibit a PER that is closer to the TBER than the original input packet and may result in better performance. The packet fragmentation can be static or dynamic. For example, all packets larger than 128 bytes may be split into smaller packets of maximum size of 128 bytes. It can also be dynamic where links with poor SINR and correspondingly low MCS requires many transport blocks per packet, the input packet may be split into smaller packets than a high MCS link. The static or dynamic packet fragmentation sizes may be based on operator input and/or link parameters such as SINR, path-loss, geographical location, etc. The packet fragmentation may be implemented either in software or hardware or a combination thereof.

ACM Integrated with Adaptive Transmit Power Control

There are many examples where there is a benefit of integrating ACM with adaptive transmit power control (ATPC). For example, the DL may have four allocated users and one user is closer to the next higher MCS level while the others are not. In this scenario, ACM can inform ATPC that a small power increase to that user at the expense of slightly lower power for the other users would enable that user to select the next higher MCS with higher system throughput as a result. Variations of this scheme is power sharing between different spatial dimensions used by a single user often referred to as water-filling. Yet another example is that close users with a high SNR can share some of their power with cell-edge users with a low SINR and thus low MCS.

Adaptive Margin with Sector Edge Input

A common problem is that users located on the edge between different cell sectors suffer from interference from neighboring sectors. Although a RDB system is uniquely equipped to handle this interference by spatial beamforming, it still has the potential to impact the SINR. For example, if a neighboring sector of the same cell schedules a new allocation on a sub-band that already has a user with similar spatial structure in a neighboring sector, both will experience a lower SINR than expected. With a fine-grained MCS selection, only the sub-bands affected will suffer from a lower MCS but the initial MCS before feedback is received might be too high and generate errors. One way of avoiding this scenario is to designate some RNs as sector edge RNs based on their estimated SINR of the broadcast channel of neighboring sectors. For RNs designated as sector edge users, the initial MCS is selected with an additional offset. Of course, more advanced solutions that avoids poor allocations is to avoid scheduling sector edge users from different sectors on the same sub-band. For example, sector edge users may only be allocated to a portion of the band that is different for each sector. This increases the scheduler complexity but may improve the MCS and the resulting throughput.

Adaptive Margin based on Capacity Utilization

Deployed broadband wireless access systems described herein often operate at only a fraction of the total capacity. In such cases, the network interference level can be reduced by only allocating the sub-bands needed to support the requested traffic. Alternatively, an technique monitoring the capacity utilization may be employed that increases the margin when the capacity utilization is low. This may reduce the errors and improves the user experience considerably assuming that the network level interference is effectively managed. One method of managing the interference is to only employ the extra margin for non-sector-edge users. The classification of sector-edge users is also described herein.

As should be appreciated, and as described herein, ACM circuitry 202 may be implemented in hardware, software, firmware, or combinations thereof. ACM circuitry 202 may, for example, including one or more processors, controllers, and/or circuitry. ACM circuitry 202 may include one or more computer readable media encoded with instructions (e.g., code) which, when executed, cause ACM circuitry 202 to perform operations described herein.

Figure 4:
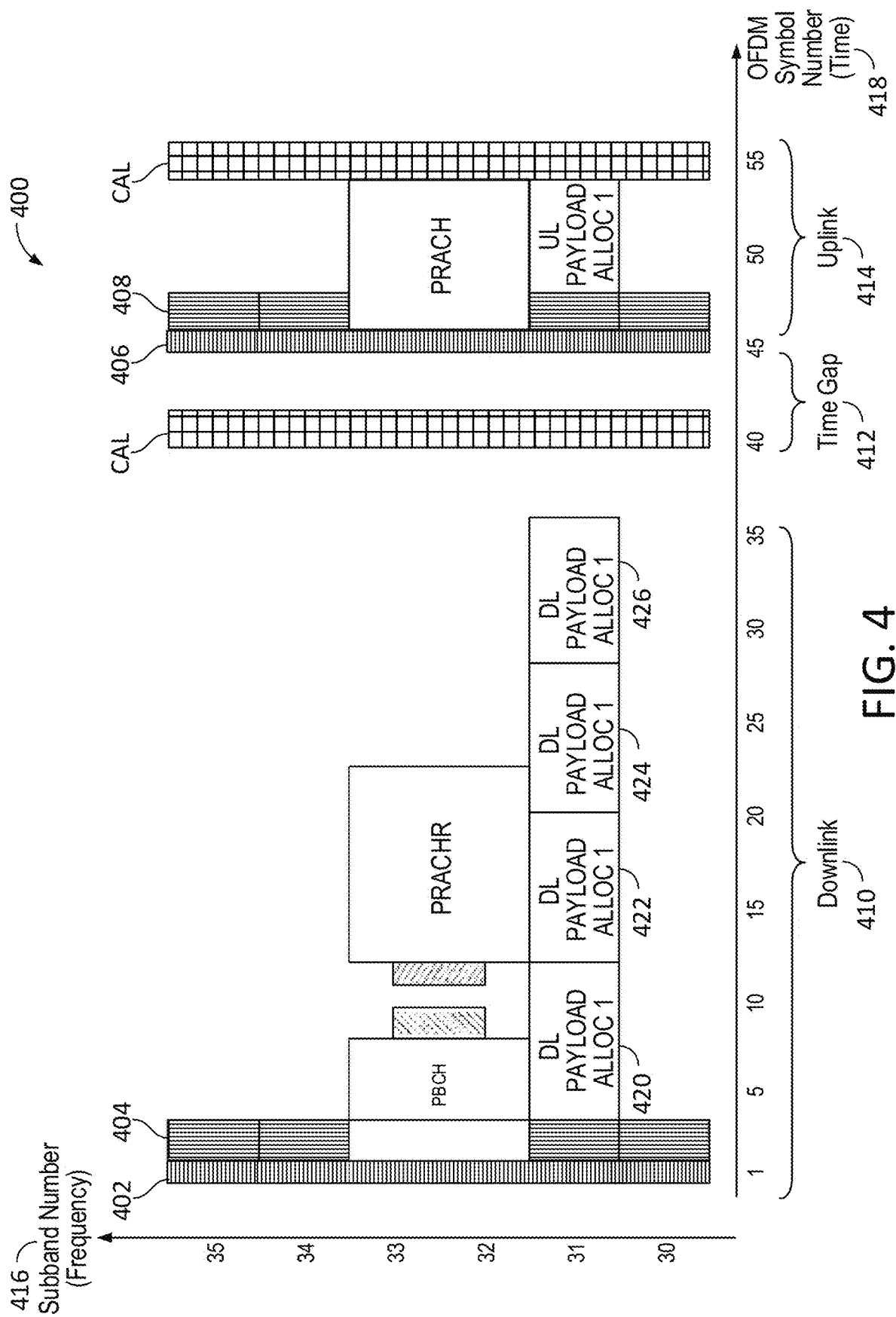
FIG. 4 is a schematic illustration of an example time-division-duplex (TDD) orthogonal frequency-division multiple access (OFDMA) radio frame-structure, arranged in accordance with examples described here.

Now turning to FIG. 4, FIG. 4 is a schematic illustration of a radio frame structure, in accordance with examples described herein. Although examples described herein are generally applicable to TDD retro-directive beamforming (RDB) systems with dynamic allocations in time, frequency, and/or spatial multiplexing of multiple users in general, an example implementation depicted in FIG. 4 is used to facilitate understanding. Examples described herein may generally focus on the physical (PHY) layer but some aspects from the medium-access (MAC) layer are described as well.

Many modern wireless communications systems (e.g., LTE, WiMax, etc.) have adopted OFDM and/or OFDM multiple-access (OFDMA) as a communication standard, as described herein. Under OFDM the frequency domain is divided into a set of equally spaced subcarriers, and the time domain is divided into equally spaced symbols as shown in FIG. 4.

FIG. 4 illustrates subcarriers and symbols in accordance with examples described herein. The vertical-axis 416 represents frequency, while the horizontal-axis 418 represents time. The frequency domain (e.g., vertical-axis) is divided into a number of sub-bands, with sub-bands 30-35 being shown in FIG. 4. Any number of sub-bands may be used where each sub-band contains a specified number of subcarriers, not shown, corresponding to the bins of an OFDM Fast Fourier Transform (FFT) residing within that sub-band. The time domain (e.g., horizontal-axis) is divided into FFT blocks, referred to herein as OFDM symbols. 55 OFDM symbols are shown in FIG. 4, although any number may be used within the same or a different amount of time by resizing the FFT as needed.

An example of a TDD orthogonal frequency-division multiple access (OFDMA) frame-structure in FIG. 4, where a base station (BS) or base node (BN) is transmitting to a user equipment (UE) or residential node (RN) during the first part of the frame (symbols 0-40). This part is often called the down-link (DL) part of the frame, e.g., downlink 410. After a time gap, e.g., time gap 412, the RN may transmit to the BS or BN for the remainder of the frame. That part is often called the up-link (UL) portion of the frame, e.g., uplink 414, and in this example covers symbols 44-55 in FIG. 4.

In some examples, user allocations are scheduled in units of a sub-band that spans a number of OFDM subcarriers. In the example implementation depicted in FIG. 4, an OFDM FFT size of 4096 subcarriers over a 40 MHz carrier covers 66 sub-bands with 52 subcarriers in each sub-band. For other bandwidths, the number of sub-bands may be different. For TDD RDB systems, UL and DL allocations may span the same sub-bands to exploit channel reciprocity. In the example show in FIG. 4, a user is allocated sub-band 31 resulting in 32 data OFDM symbols over 52 subcarriers in the DL and 8 data symbols over the same subcarriers in the UL. The remaining symbols are used for control channels, beamformer training, and channel sounding.

In some examples, and similarly described in FIG. 3, various packets such as input packets may be converted into modem packets (e.g., by packet processor 118 of FIGS. 1A and 1B) that in turn are sent over the link in one or many transport blocks (TB) (e.g., payload 420, 422, 424, and 426) depending on packet size and TB MCS across the allocated sub-bands and symbols. The mapping of modem packets into transport blocks can be done in many ways. A simple mapping is the natural order while more complicated mappings such as various forms of pseudo-random mappings that spreads a modem packet across the transport blocks are possible. Furthermore, the transport blocks can be mapped or striped into sub-bands in many different ways as well.

In some examples, uplink allocation information 406 and per-sub-band MCS information 408 may be sent back to the BS or the BN, by the RN. In some examples, uplink allocation information 406 and per-sub-band MCS information 408 sent back by the RN may be used by, for example, scheduler 116 or switch 120, or packet processor 118 of FIGS. 1A and 1B for subsequent allocation of sub-bands and subsequent transmission of packets over links of various wireless communications (e.g., access) systems described herein. In some examples, a base node may determine a UL and/or a DL allocation (they are matched for RDB) so an RN does not send information about which sub-bands/streams are allocated, but does send information, e.g., channel quality information for the allocated sub-bands.

In some examples, the information and/or content of a CCE and FCCH channel may be different in the UL and DL. For example, the DL FCCH may in some examples contain the MCS and power control information, and the UL FCCH may contain the SINR and error information per-sub-band. Similarly, in some examples, the DL CCE may contain allocation information while the UL CCE may contain channel information from a node (e.g., a remote node), such as for example, overall errors, power control information, and/or many other metrics.

Now turning to FIG. 5, FIG. 5 illustrates transport block mapping sub-bands and reference symbols, in accordance with examples described herein. As depicted herein, FIG. 5 is one example for a frame structure 500 (e.g., frame 500). Frame structure 500 includes 18 data symbols (shown on x-axis 502) with an allocation spanning sub-bands 1-6 and 8-16 (skipping sub-band 7) (shown on y-axis 504). In some examples, a TB (e.g., TB 506 and/or TB 508) needs to span eight resource elements where a resource element is one sub-band and symbol. The first transport block (TB) in frame 500 (e.g., TB 506) is striped across sub-bands 1-4 and symbols one and two. Alternatively, this can be viewed as grouping sub-bands 1-4 together in terms of MCS since each TB has a single MCS. In some examples, grouping sub-bands together impacts not only the payload data performance but also the MCS signaling and feedback. As depicted herein, various TB blocks are labeled as TB1 through TB33.

As depicted, the next three TBs are sent over the next six symbols while the fifth TB is sent over sub-bands 5-6 over symbols one through four. Transport block striping may be optimized for performance both in terms of payload performance and feedback channel performance. In many examples, the receiver needs to be aware how the transmitter striped the TBs either through dedicated signaling or through rules known by both transmitter and receiver. Further enhancements are possible, where certain packets are prioritized to be sent on sub-bands with better performance in terms of performance metrics such as SINR and/or TBER.

Each link's allocation and MCS selection operations are managed over a combination of two bidirectional (UL and DL) control channel types, one type termed the link control channel element (CCE), of which there is one per link, and the other type termed the fast control channel (FCCH), of which there is one per-sub-band per-spatial stream allocated to that link. The allocation information, such as which sub-bands and spatial dimension a user is allocated to, is conveyed in the first symbol in the CCE. Each user has a dedicated beamformed CCE channel spanning a small number of sub-bands. Hence, the CCE channel is not a broadcast channel since that would limit the possibilities of beamforming that enables high throughput and robust interference performance.

A difference from LTE and WiMAX is that the control channel (CCE) does not contain the MCS selection, which is instead contained in a separate channel labeled DL FCCH, which is integrated into the reference symbols (RS). For high performance, the beamformer may be trained independently on each sub-band and each frame using the RS. In addition, a separate DL FCCH channel is maintained per-sub-band per spatial stream which enables a distinct MCS per-sub-band per spatial stream. Hence, the MCS information is separate from the allocation information that is sent on the CCE in a sub-band or sub-bands unrelated to the allocation. Furthermore, the matching UL allocations provide a fine-grained feedback channel from the RN to the BN of channel condition metrics within the UL FCCH. Examples of metrics include, but are not limited to, signal-to-interference-and-noise-ratio (SINR) and different types of codec conditions (errors, decoder iterations, etc.). Furthermore, if sub-bands are grouped together, for example as shown here in FIG. 5, various forms of coding of the feedback may be used to improve the reliability of decoding the FCCH channel. A simple example of coding that improves the reliability is to repeat the same information in the FCCH channel across the grouped sub-bands.

Figure 6:
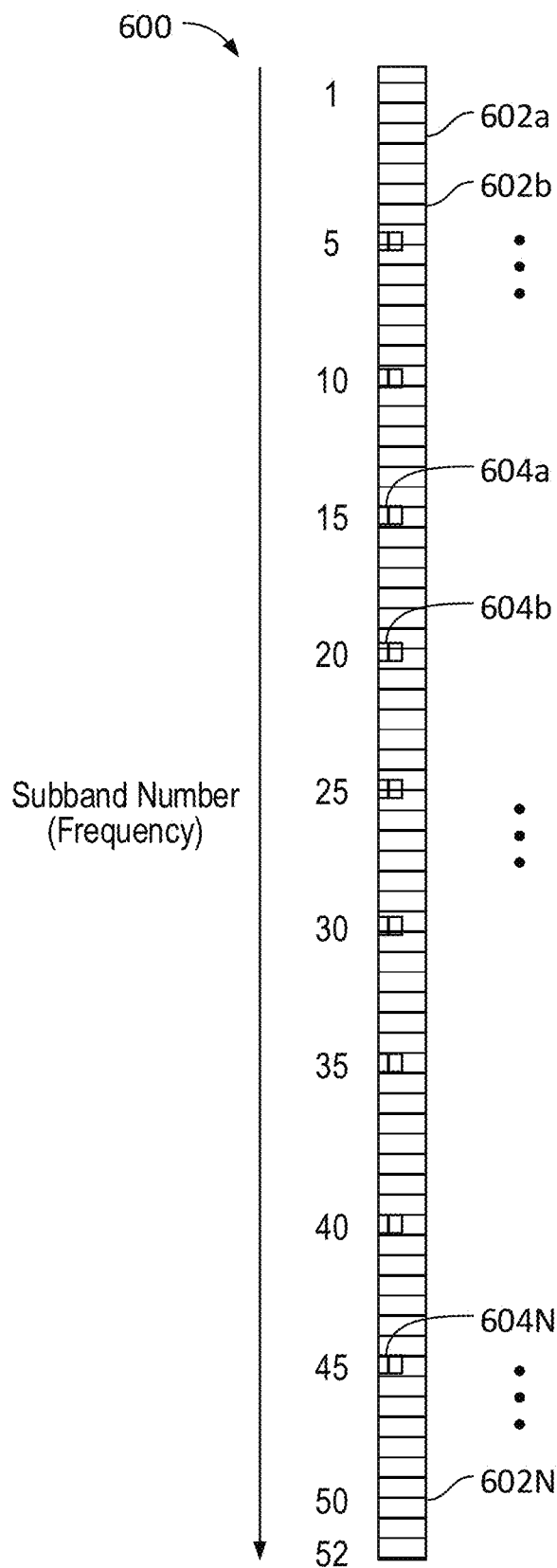
FIG. 6 illustrates a reference symbol punctuated with fast control channel for one sub channel, arranged in accordance with examples described herein.

Now turning to FIG. 6, FIG. 6 illustrates a reference symbol (RS) punctuated with fast control channel (FCCH) for one sub channel, in accordance with examples described herein.

Recall that, in examples described herein, a control channel (CCE) may not contain an MCS selection. In some examples, instead, an MCS selection may be contained in a separate channel, such as a DL FCCH. As depicted in FIG. 6, FCCHs, such as FCCH 604a-604n may be integrated into the reference symbols (RS), such as reference symbols 602a-602n. In some examples, for high performance, the beamformer is trained independently on each sub-band and each frame using the RS. In addition, a separate DL FCCH channel is maintained per-sub-band per spatial stream, which in some examples enables a distinct MCS per-sub-band per spatial stream. Hence, the MCS information may be separate from the allocation information that is sent on the CCE in a sub-band or sub-bands unrelated to the allocation.

Recall that the feedback of channel conditions (e.g., per-sub-band per-spatial-stream) from a remote node (e.g., residential node, remote node 208 of FIG. 2, etc.) to a base node (e.g., base node 206 of FIG. 2) may, in some examples, enable ACM circuitry (e.g., ACM circuitry 202 of FIG. 2) coupled to the base node to select UL MCS and/or DL MCS. In some examples, selecting both UL and DL MCS at the base node (e.g., base node 206 of FIG. 2) may make it possible to include knowledge of the presence of other users (e.g., other remote nodes of wireless communications systems described herein) that may share the same sub-band and their spatial compatibility. In some examples, it may also enable the incorporation of dynamic beamforming effects of new users (e.g., new remote nodes) entering or users leaving the sub-band into the MCS selection. In some examples, if the RN (e.g., remote node 208 of FIG. 2) selects the UL MCS, that type of information would not be available since, in some examples, only the BN (e.g., base node 206 of FIG. 2) has access to the allocation of other users (via a scheduler and/or a spatial database, such as scheduler 116 and/or spatial database 124 of FIGS. 1A and 1B). In some examples, it may also enable a BN (such as base node 206 of FIGS. 1A and 1B) to share scheduling information between itself and nearby BNs to further improve performance by coordinating the per-sub-band per-spatial-stream user scheduling and MCS selection across sectors. In some examples, that information may contain metrics such as distance to BN but also spatial information and compatibility with other users.

Now turning to FIG. 7, FIG. 7 is a schematic illustration of a system 700 for interference aware adaptive selection of modulation and coding schemes, which may include user scheduling, arranged in accordance with examples described herein. Examples of system 700 described herein may include base node 702 and remote node 704. Base node 702 may be similar in architecture, functionality, operation to the one or more base nodes described herein, such as FIGS. 1A and 1B, and/or one or more components of the one or more base nodes described herein, such as components of FIGS. 1A and 1B. For example, base node 702 may be intended to communicate wirelessly to one or more other communications nodes (e.g., residential nodes, remote nodes, remote node 704, and the like). A base node, such as base node 702 may, for example, be positioned on a tower or other centralized location. Remote node 704 may be similar in architecture, functionality, operation to the one or more remote and/or residential nodes described herein, such as FIGS. 1A and 1B, and/or one or more components of the one or more base nodes described herein, such as components of FIGS. 1A and 1B. For example, remote node 704 may be particular to a building, home, office, or other location. Remote node 704 may in turn be in communication with one or more electronic devices and may facilitate communication between the electronic devices and the base node, such as base node 702. Any number or type of electronic device may be serviced using communication techniques described herein including, but not limited to, computing systems, servers, desktops, laptops, tablets, cellular phones, appliances, vehicles, etc.

Base node 702 may include uplink (UL) multidimensional interference margin generator 712, UL ACM 714, scheduler 716, downlink (DL) ACM 718, UL and DL base signal to noise ratio (SINR). In some examples, base node 702 may include uplink reference symbol signal to interference plus noise power ratio metric 706 (UL RS-SINR 706), uplink pilot-based signal to interference plus noise power ratio metric 708 (UL P-SINR 708), and uplink transport block error metric 710 (UL TBE 710). In some examples, UL RS-SINR 706, UL P-SINR 708, and/or UL TBE 710 may be transmitted to various components within base node 702 with varying latencies, such as latency 738a, latency 738b, and latency 738c, respectively. As should be appreciated, UL margin generator 712 may be similar in functionality and/or operation to multidimensional interference margin generator 136 of FIG. 1B. In some examples, the functionalities and/or operations performed by UL margin generator 712 may be implemented using multidimensional interference margin generator 136.

Remote node 704 may include DL margin generator 728 and sounding 730. In some examples, remote node 704 may include downlink reference symbol signal to interference plus noise power ratio metric 732 (DL RS-SINR 732), downlink pilot-based signal to interference plus noise power ratio metric 734 (DL P-SINR 734), and downlink transport block error metric 736 (DL TBE 736). In some examples, DL RS-SINR 732, DL P-SINR 734, and/or DL TBE 738 may be transmitted to various components within remote node 704 with varying latencies, such as latency 738d, latency 738e, and latency 738f, respectively. As should be appreciated, DL margin generator 728 may be similar in functionality and/or operation to multidimensional interference margin generator 136 of FIG. 1B. In some examples, the functionalities and/or operations performed by DL margin generator 728 may be implemented using multidimensional interference margin generator 136.

In some examples, base node 702 and remote node 704 may communicate information (e.g., encoded data bits, decoded data bits, RF signals, margins, uplink per-sub-band per-stream margins, and the like), utilizing various channels, such as DL fast control channel 722 (DL FCCH 722), UL fast control channel 724 (UL FCCH 724), and/or UL control channel 726 (UL CCE 726). As should be appreciated, additional and/or alternative and/or fewer implementations and/or components may be used to perform the functions of system 700. Operationally, and as one example, base node 702 and remote node 704 may communicate information utilizing packet processor 118 and switch 120 of FIG. 1B.

Recall that one common problem in wireless access is interference which may be caused by one or more external (or internal) sources, such as for example, other wireless transmitters nearby. In some examples, this may particularly be a problem in unlicensed parts of the radio frequency band but can be a problem in any band. Fine-grained MCS selection schemes are well suited to handle interference in general but in particular to interference that covers parts of the band but not the whole band which is a common scenario. Interference aware ACM techniques for fine-grained MCS selection in the presence of interference can substantially improve performance. Further improvements may be possible by including interference awareness also into the user scheduling. For example, avoiding scheduling users on frequency bands with interference may improve user experience as well as network performance.

Accordingly, system 700 described herein may be configured for interference aware adaptive selection of modulation and coding schemes, including user scheduling, arranged in accordance with examples described herein. As should be appreciated, components of system 700 are described in further detail herein, but an overview of the interaction of certain components of system 700, including the channel metrics (e.g., channel metrics indicative of interference) that may be exchanged between them follows below.

In some examples, UL multidimensional interference margin generator (MIMG) 712 (e.g., similar to multidimensional interference margin generator 136 of FIG. 1B) may be configured to compute an uplink per-sub-band per-stream margin (e.g., a UL subMar) based at least on various metrics, for example, UL RS-SINR 706, UL P-SINR 708, and/or UL TBE 710. In some examples, UL RS-SINK 706, UL P-SINR 708, and/or UL TBE 710 may be computed locally in base node hardware and software, such as locally in base node 702. In some examples, the uplink per-sub-band per-stream margin may be sent (e.g., transmitted) to UL ACM 714 and/or UL & DL BASE SINR 720. As should be appreciated, while shown in FIG. 7 as separate components, UL ACM 714 (and DL ACM 718 discussed herein) and UL & DL BASE SINR 720 may be coupled in the same circuitry. Additionally and/or alternatively, the functions and operations performed by UL ACM 714 (and DL ACM 718 discussed herein) and UL & DL BASE SINR 720 may be performed by ACM circuitry 126 of FIG. 1B.

In some examples, UL ACM 714 may select an UL MCS and, in some examples, compute an UL user margin based at least on several channel metrics including UL RS-SINR 706, UL P-SINR 708, and/or UL TBE 710. Each channel metric may include and/or comprise a separate latency, such as latency 738a, 738b, and/or 738c, respectively, that compensate for inside UL ACM 714. In some examples, UL ACM 714 may further base the MCS selection on the uplink per-sub-band per-stream margin determined by multidimensional interference margin generator 712, a UL BASE SINR from the UL & DL BASE SINR 720 (e.g., ACM circuitry 126 of FIG. 1B), and a UL allocation from scheduler 716 (e.g., scheduler 116 of FIG. 1B). The selected UL MCS, in some examples, is signaled in DL FCCH 722 and in some examples the UL per-user margin (e.g., the determined UL per-sub-band per-stream margin) is sent to UL & DL BASE SINR 720. As should be appreciated, scheduler 116 of FIG. 1B may perform the same functionalities and/or operations as scheduler 716 of FIG. 7, and in some examples, the functionalities and operations of scheduler 716 may be performed on and/or implemented using scheduler 116.

In some examples, scheduler 716 may base UL allocations, DL allocations, or combinations thereof, on information about the demand from different users as received from a switch (e.g., such as switch 120 of FIG. 1) and other sources. In some examples, scheduler 716 may base the UL allocations, and DL allocations, or combinations thereof, on the UL and DL BASE SINR, such as UL and DL BASE SINR 720. As one example, if the demand is 100 Mb/s, then the number of sub-bands to allocate may depend on the resulting MCS selection, which in some examples may be a function of the BASE SINR that factors in path loss from sounding (e.g., such as sounding 730), interference patterns as observed from UL RS-SINR 706, UL P-SINR 708, and/or UL TBE 710, or combinations thereof.

In some examples UL and DL BASE SINR 720 may compute and/or determine a BASE SINR for the UL, the DL, or combinations thereof, based at least on the sounding information from a remote node, such as remote node 704, as well as the user and uplink per-sub-band per-stream margins.

In some examples, DL ACM 718 may select a DL MCS and compute and/or determine DL user margin based on one or more metrics including the DL SINR received in UL FCCH 724. In some examples, each metric may include a separate feedback latency in addition to the latency 738d, 738e, 738f (e.g., L4-L6) within the components of remote node 704. In some examples, DL ACM 718 may further base the MCS selection on the DL subMar received in UL CCE 726, UL FCCH 724, or combinations thereof. In some examples, the DL SINR sent in UL CCE 726 by the DL per-sub-band per-stream margin may be derated (e.g., directly derated). In some examples, the DL ACM 718 may use input from scheduler 716 about the allocations and the DL BASE SINR. In some examples, the selected DL MCS may be signaled in DL FCCH 722 and the DL user margin may be sent to UL and DL BASE SINR 720.

In some examples, DL multidimensional interference margin generator (MIMG) 728 (e.g., similar to multidimensional interference margin generator 136 of FIG. 1B) may compute a per-sub-band per-stream margin (e.g., a DL subMar, as used herein), based at least on DL RS-SINR 732, DL P-SINR 734, DL TBE 736, or combinations thereof that in some examples may be computed locally in the remote node hardware and software (e.g., remote node 704). In some examples, DL subMar is sent to UL FCCH 724, UL CCE 726, sounding 730, or combinations thereof. In some examples, and depending on the chosen method, the DL subMar may also be used to derate the DL SINR that is sent in UL FCCH 724.

As should be appreciated, the above was an overview of interactions between and amongst certain components of system 700, including the channel metrics (e.g., channel metrics indicative of interference) that may be exchanged between them. Various functionalities and/or operations of system 700 may entirely and/or in part be performed and/or implemented by various components of FIGS. 1A and 1B described herein. Below table, e.g., Table (1), is an example of metrics that may be exchanged amongst and between certain components of system 700.

TABLE (1)

| Component | Node | Inputs | | Outputs | |
|---|---|---|---|---|---|
| | | Name | Source | Name | Destination |
| UL Multidimensional Interference Margin Generator (MIMG) 712 | Base Node 702 | UL RS-SINR 706 UL P-SINR 708 UL TBE 710 | | UL subMar UL subMar | UL ACM 714 BASE SINR 720 |
| UL ACM 714 | Base Node 702 | UL RS-SINR 706 UL P-SINR 708 UL TBE 710 UL subMar UL BASE SINR UL allocations | UL MIMG 712 BASE SINR 720 Scheduler 716 | UL MCS UL USER margin | DL FCCH 722 BASE SINR 720 |
| Scheduler 716 | Base Node 702 | UL BASE SINR DL BASE SINR | BASE SINR 720 BASE SINR 720 | UL allocations DL allocations | UL ACM 714 DL ACM 718 |
| UL & DL BASE SINR 720 | Base Node 702 | Adjusted sounding UL subMar DL subMar UL user margin DL user margin | UL CCE 726 UL MIMG 712 UL FCCH/CCE 724/726 UL ACM 714 DL ACM 718 | UL BASE SINR DL BASE SINR | Scheduler 716 Scheduler 716 |
| DL ACM 718 | Base Node 702 | DL SINR DL TBE 736 DL subMar DL BASE SINR DL allocations | UL FCCH 724 UL FCCH/CCE 724/726 UL FCCH/CCE 724/726 BASE SINR 720 Scheduler 716 | DL MCS DL USER MAR | DL FCCH 722 BASE SINR 720 |

TABLE (1)-continued

| | | Inputs | | Outputs | |
|---|---|---|---|---|---|
| Component | Node | Name | Source | Name | Destination |
| DL Multidimensional Interference Margin Generator (MIMG) 728 | Remote Node 704 | DL RS-SINR 732 DL P-SINR 734 DL TBE 736 | | DL subMar DL subMar DL SINR | UL FCCH/CCE 724/726 Sounding 730 UL FCCH 724 |
| Sounding 730 | Remote Node 704 | DL subMar | DL MIMG 728 | Adjusted sounding | UL CCE 726 |

Example channel condition metrics that may be exchanged between UL MIMG- and DL MIMG-related components described herein Per-Sub-Band Per-Stream (and/or Per-User) Margin In some examples, systems (such as at least system 100 of FIGS. 1A and 1B, and system 700 of FIG. 7) described here may transmit reference symbols (RS) that are used to compute beamforming weights for the remainder of the sub-frame. In some examples, the reference symbols may be transmitted using packet processor 118 and switch 120 of FIG. 1, and/or utilizing DL FCCH 733, UL FCCH 724, and UL CCE 726 of FIG. 7. The impact of interference on the system may, in some examples, depend on the duration and timing of the interference relative to the RS, and how frequent it is. As described herein, beamforming weights may be computed by a weights processor, such as weights processor 108 of beamforming network 128 of FIG. 1A. In some examples, the beamforming weights may be calculated for one or more transceivers and/or one or more antennas in a system, such as antennas 102a-102f of system 100 of FIGS. 1A and 1B, and (while not shown) various antennas of system 700 of FIG. 7.

In some examples, if interference hits the RS, the beamforming weights may minimize the interference impact if the interference has a spatial signature different from the desired signal. In some examples, even if the beamformer largely can mitigate the interference, such mitigation may result in loss of signal strength to a desired user. In some examples, this may be referred to as beam-packing loss. Since the MCS selection by examples of ACM circuitry described herein, such as ACM circuitry 126 of FIG. 1, may include a time delay, intermittent interference hitting the RS may still result in errors. This may be due to the fact that the MCS may be selected based on a past frame without interference and therefore higher SNR.

If the interference has a short time duration and does not hit the reference symbols but other parts of the frame, the beamforming weights may not mitigate the interference, and/or may not mitigate the interference as well as desired. In this case, the actual SNR on payload symbols may be lower than the RS SNR from which the MCS is selected. Hence, the selected MCS may be too high for later symbols causing errors.

In some examples, if the interference is short in duration and infrequent, other parts of systems described herein, such as components of system 100 of FIGS. 1A and 1B and/or system 700 of FIG. 7, may recover the transmitted data through retransmissions strategies (ARQ/HARQ). However, if the interference is short in duration but very frequent it may negatively impact the system performance since many retransmissions may be necessary, resulting in larger delays and lower throughput. In some examples, this is true regardless of whether the interference hits the RS or not when the interference spatial signature is not fully spatially resolvable by the beamformers.

In some examples, if the interference affects all the sub-bands of the system, such as subbands included in the set of signals, sets 110, of FIGS. 1A and 1B, the per-user adaptive margin described in herein may quickly rise which may impact all sub-bands which may be the correct action for full band interference. However, if the interference is only impacting a portion of the band, the per-user margin may go up and impact not only the impacted sub-bands but other sub-bands, and in some examples all sub-bands. In some examples, this may potentially limit throughput since there may be a mismatch between the fine-grained MCS selection and the full band per-user adaptive margin. One advantage of having a full band user margin in some examples is that it may allow for quick response. As seen in Algorithm (4) above, in some examples, the condition for increasing the margin may be based on the accumulated errors exceeding a threshold.

In some examples, collecting errors over all (or some) allocated sub-bands and multiple streams may accumulate much faster than for a single sub-band when tracking wide band channel conditions. In some examples, if errors only impact a portion of the band, a separate per-sub-band per-stream margin (e.g., subMar), such as an UL subMar calculated by ACM circuitry 126 of FIG. 1B and/or margin generator 712 of FIG. 7, may perform better even when operating on a slower time scale.

Figure 11:
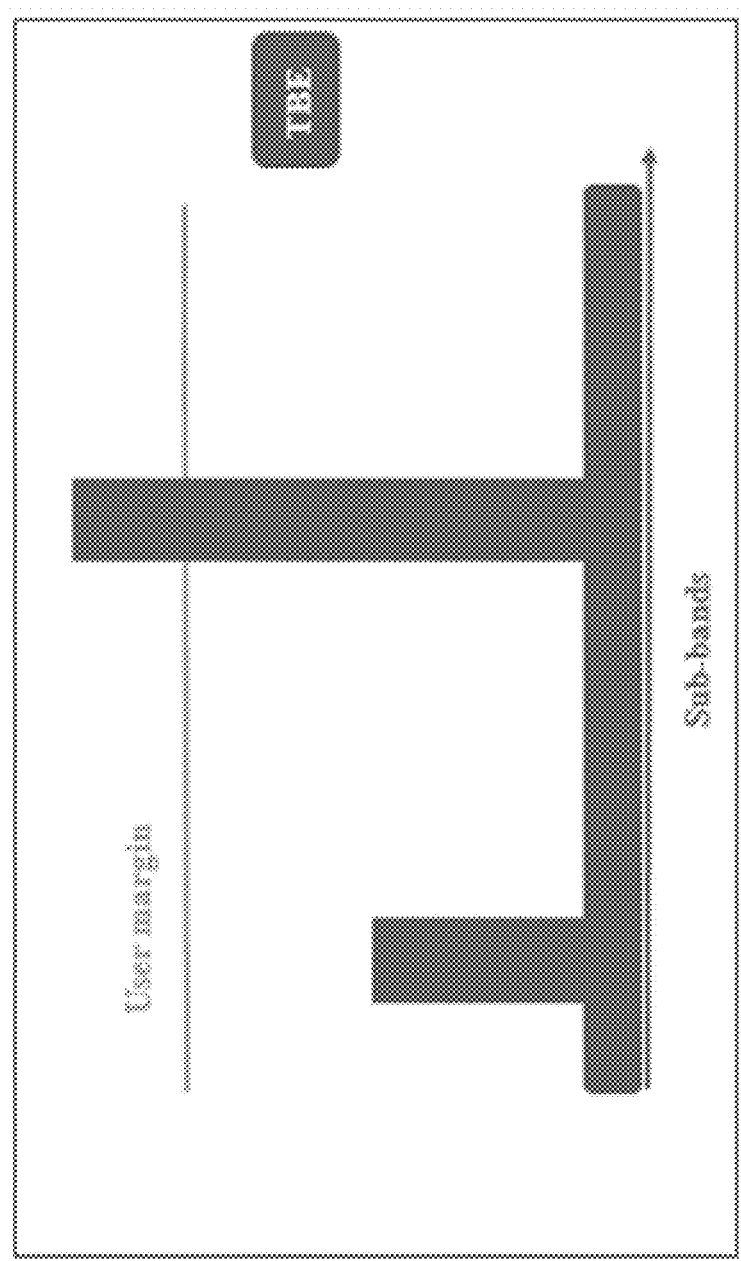
FIG. 11 is an example schematic illustration of user margin with two narrow band interferers, arranged in accordance with examples described herein.

In some examples, two narrow band interferers may cause transport block errors (TBEs) in a few sub-bands in addition to a normal error pattern covering all sub-bands, such as depicted in FIG. 11. In some examples, as the total number of TBEs rise, the user margin also rises which may impact all sub-bands not just the interfered ones. The same error scenario is shown in FIG. 12, but with a per-sub-band per-stream margin (subMar) as described herein, in addition to the user margin, also as described herein.

Figure 12:
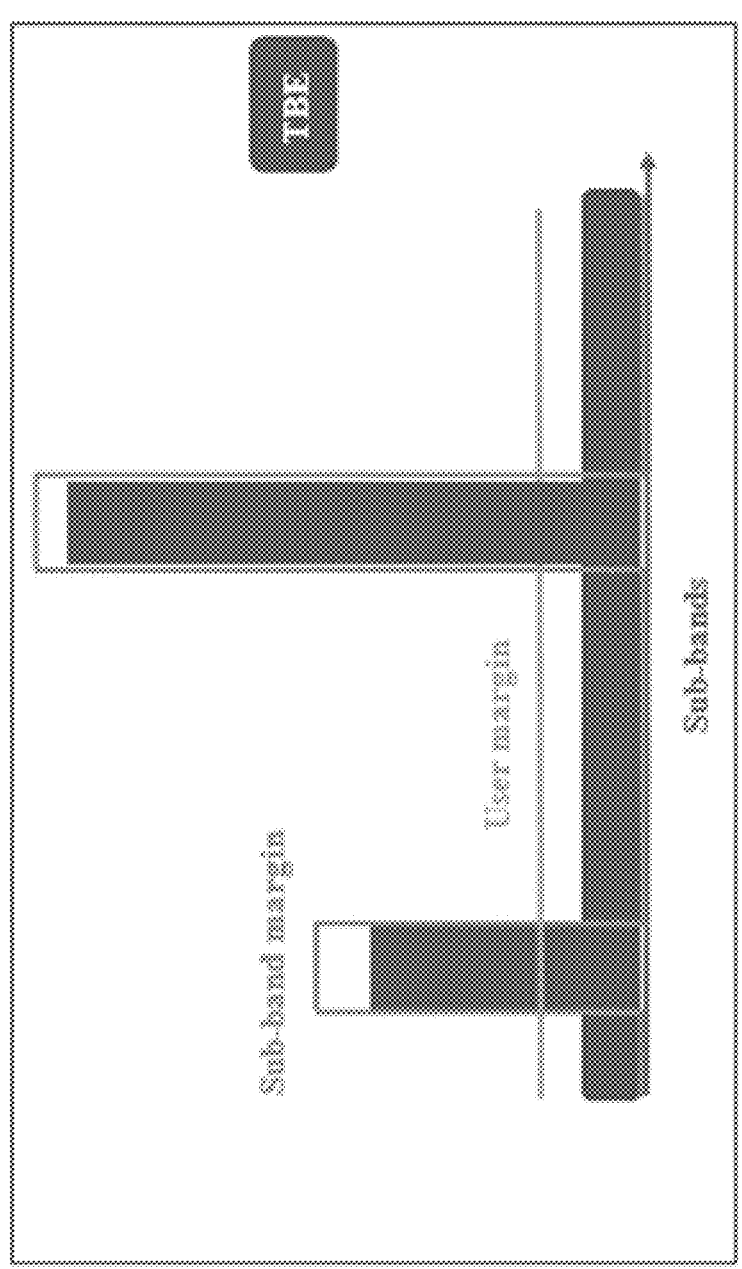
FIG. 12 is an example schematic illustration of user margin and determined per-sub-band per-stream margin, arranged in accordance with examples described herein.

In some examples, and as depicted in FIG. 12, the subMar reacts on a per-sub-band granularity similar to the fine-grained MCS selection. It may be set to a high value on the interfered sub-bands but remain at a low or zero value on non-interfered sub-bands that may be covered by the user margin. The MCS selection may then consider both margins, which in some examples, may result in a lower MCS on the interfered sub-bands, which may reduce and/or eliminate the errors on those sub-bands and thus may avoid an increase in the user margin as seen in FIG. 11. Since the user margin is lower in the subMar scenario depicted in FIG. 12 and as described herein, the overall throughput may higher since for most sub-bands a higher average MCS may be selected compared to the selection that is depicted in FIG. 11. Note that, in some examples, and just as for the user margin, a separate sub-band margin in each link direction (UL/DL) may be beneficial since the interference conditions may be different.

In some examples, one reason for maintaining the user margin for MCS selection may be that it may be much faster and responsive given that it collects errors across all (or some) of the allocated sub-bands. For consistent presence of short or intermittent interference, the sub-band margin may react and allow for a lower user margin longer term.

In some examples, the impact of interference also depends on the spatial structure of the interference compared to the desired user. If the spatial structure of the interferer is very similar to the desired user, the impact may be more severe, making a larger subMar desirable. Furthermore, it may also depend on the number of spatial streams, e.g., the amount of spatial multiplexing the desired user employs. For example, the user might be able to spatially cancel the interference when using one stream but not if using two spatial streams. Hence, the subMar may depend on the amount of spatial multiplexing and better performance may be achieved by calculating a separate subMar for a single stream, two streams, and so forth resulting in a subMar per-sub-band per-number-of-streams.

User Scheduling

As described herein, although the subMar (such as UL per-sub-band per-user margin and/or DL per-sub-band per-stream margin) may improve the overall throughput substantially by reducing errors on the per-sub-band level, it may be even better to avoid allocating sub-bands with known high error rates. Incorporating interference knowledge as described herein through the subMar into a scheduler (such as scheduler 716) may also and/or further enable better MAC efficiency in meeting user demands. For example, if the impact of interference is not known to a scheduler (such as scheduler 716), the scheduler may schedule too few sub-bands to meet a demand.

Incorporating interference knowledge into scheduling decisions as described herein may be beneficial for wireless systems generally but, especially for the example wireless communication systems described herein that employ retro-directive beamforming and/or spatial multiplexing (such as system 100 of FIG. 1 and/or system 700 of FIG. 7). For the example system, the unique aspects of retro-directive beamforming and channel sounding may provide one example of introducing interference knowledge into a scheduler (such as scheduler 716) through the use of a BASE SINR (such as UL & DL BASE SINR 720) as described herein.

User Scheduling and Retro-Directive Beamforming

In some examples, one principle of retro-directive beamforming (RDB) is to use the spatial structure of the received signal to decide the spatial structure of the transmitted signal. For example, if the received signal impinging on the receiving antenna array comes primarily from one direction, the transmitter may then transmit back in the same direction. Both analog and digital forms for RDB are possible, however, examples described herein focus on a digital implementation. As should be appreciated, while digital examples are described, analog examples are considered to be within the scope of this disclosure.

Since the characteristics of the radio channel typically may be frequency dependent, RDB is often implemented for TDD systems where both transmissions from the remote node to the base node (UL) or from the base node to the remote node (DL) use the same frequency so the receive beamforming weights may be used to derive the transmit beamforming weights. The beamforming weights described herein such as beamforming weights calculated by weights processor 108 of beamforming network 128 of FIG. 1A, may refer to, in some examples, how to weigh signals received from the multiple antennas. In this manner, beamforming, such as beamforming by beamforming network 128 using antennas 102a-102f of FIG. 1A, may generally correspond to forming a spatial signature that approximates and/or matches the channel and may optimize a performance metric, such as, for example, metrics described herein.

In order to base the transmit weights on the receive weights, a TDD RDB system (such as system 100 of FIG. 1 and system 700 of FIG. 7 herein) may often employ matching UL and DL allocations in the sense that they occupy the same sub-bands and span the full sub-frame. Hence, each allocation decision may need to factor in the UL demand, the DL demand, or combinations thereof. Although not shown in FIG. 7, scheduler 716 may start the allocation decision from the UL demand, which may be locally on base node 702 and the DL demand, which may be fed back to base node 702 from the remote node 704. Demands for example systems described herein may be provided by a demand estimator, such as demand estimator 122 of FIG. 1 through a switch, such as switch 120 of FIG. 1. The UL and DL throughput gains of scheduling a sub-band to a user may then be compared with the UL and DL demands. In example systems described herein, channel sounding (e.g., via sounding 730 of FIG. 7) may be used to predict the UL and DL throughput gains for the desired user and possible negative impact of other spatially multiplexed users on the same sub-band. This prediction may, in some examples, be extended to also include external interference knowledge through the subMar into an expected or BASE SINR, such as UL & DL BASE SINR 720.

In some examples, another use of interference awareness metrics such as UL RS-SINR 706, UL P-SINR 708, and/or UL TBE 710, as well as DL RS-SINR 732, DL P-SINR 734, and/or DL TBE 736, used to determine one or more subMars described herein (e.g., an UL subMar, a DL subMar, or combinations thereof), may include deciding the amount of spatial multiplexing. Recall that, in some examples, a scheduler, such as scheduler 116 of FIG. 1, may allocate one or more streams per-user for transmission. In some examples, it may be that a user can spatially separate the desired signal from interference if that user has a single spatial stream allocated but it may not be able to separate the interference when that user is allocated two spatial streams. In some examples, if the scheduler (such as scheduler 116 of FIG. 1, scheduler 204 of FIG. 2, and/or scheduler 716 of FIG. 7) is aware of this, it may be able to make allocation decisions that results in better user throughput as well as network efficiency. In some examples, one way of providing such information is to calculate a different subMar for different number of spatial streams as described herein.

As one non-limiting example, the scheduler (e.g., scheduler 116 of FIG. 1) may receive information that a user cannot be allocated more than a threshold number of streams. In some examples, this information may come from one or more sources, such as from past communications with the user, hard coded information from an administrator of the communications system, from interference awareness metrics as described herein, and/or other sources. In some examples, the threshold number of streams may be two streams, five streams, ten streams, and/or any other number of streams. Based on the information, the scheduler may allocate any number of streams for a given user. In some examples, the number of streams allocated to a first user may be different from the number of streams allocated to a second user. In some examples, the number of streams allocated to a user may change (e.g., update) over time to include fewer, additional, and/or alternative streams.

In some examples, a margin generator (e.g., multidimensional interference margin generator 136 of FIG. 1) may calculate one subMar value when a user is allocated a first number of streams. In some example, multidimensional interference margin generator 136 may calculate another subMar value when the user is allocated a second number of streams. In some examples, multidimensional interference margin generator 136 may calculate a subMar value for each stream of the number of streams allocated to a user. In some examples, the calculated subMar for each stream of the number of streams allocated to a user may be the same, may be different, or combinations thereof.

In some examples, the subMar(s) generated by a margin generator (e.g., multidimensional interference margin generator 136 of FIG. 1) may be sent to the scheduler. In some examples, based at least in part on the calculated subMar(s), the scheduler may make updates to the allocation for the user. In some examples, these updates may include adding new allocations, subtracting (unallocating) previous allocations, and/or keeping the allocation the same. In some examples, the scheduler may also make determinations about which sub-bands are sufficient to allocate, and which are not, based on in some examples observed channel interference (e.g., the calculated subMar(s) etc.). In some examples, the scheduler may determine if current or potential allocations are within an acceptable range. If not, the scheduler may update number of streams (or which streams) per user, and/or which streams to choose from for allocation.

In some examples, although an administrator may limit the number of streams, the presence of interference may not explicitly generate a threshold. For example, as the scheduler evaluates to go from one stream to two streams for a subband, it may be that the two stream subMar is high enough to either result in lower expected throughput than a single stream. In that example, the scheduler may not add one more stream. In some examples, this may not be an explicit threshold but an evaluation of the expected throughput that may result in lower throughput with more streams due to the interference metrics (e.g., subMar).

Accordingly, in some examples, and as just one non-limiting example, scheduler 116 of FIG. 1 (and/or scheduler 204 of FIG. 2 and/or scheduler 716 of FIG. 7) may make stream allocation decisions, based at least on one or more interference awareness metrics described herein. By basing allocation, in some examples, as least on one or more interference awareness metrics, better throughout per stream may result, as well as better network efficiency. In some examples, a subMar may be calculated using multidimensional interference margin generator 136 of FIG. 1B (and/or MIMG 712 and MIMG 728 of FIG. 7) based on various metrics described herein. In some examples, multidimensional interference margin generator 136 may generate subMars per-sub-band, per-stream, and/or per-user. In some examples, multidimensional interference margin generator 136 may generate subMars per-number-of-streams. As illustrated at least in Table (1), the calculated subMars may ultimately be distributed (and/or sent) to a scheduler (such as scheduler 730 of FIG. 7) and used for stream allocation purposes. The allocated streams may, in some examples, be transmitted using antennas 102a-102f of FIG. 1A.

Channel Sounding

In some examples, a scheduler (such as scheduler 716) has knowledge of the channel properties of some and/or all the users and possible external interference (for example through a calculated subMar(s), such as those discussed herein). Accordingly, the scheduler may predict the throughput result of an allocation decision. In some examples, the better prediction of the allocation outcome, the better user experience and network efficiency may be achieved. This channel knowledge may be acquired by sending a reference or sounding signal from a base node (such as base node 702) to one or more remote nodes (e.g., including remote node 704 and/or other remote nodes described herein but not shown) such that the one or more remote nodes receive and use the reference or sounding signal to compute an effective channel. In some examples, this calculation may involve knowing the transit power of the sounding signal from which the path loss of the radio channel can be calculated. The transmit power may be provided (e.g., signaled) through a broadcast channel from the base node (such as base node 702) to the remote node (such as remote node 704). In some examples, one unique aspect of the TDD RDB systems described herein is the additional dependency on the spatial properties of the channel between users that the scheduler (such as scheduler 716) may benefit from. Hence, in example systems described herein, the remote nodes may feed back the estimated channel to the base node using the UL CCE channel (such as UL CCE 212 of FIG. 2, and/or UL CCE 726 of FIG. 7). With this knowledge, the base node and the scheduler may, in some examples, predict the expected per-user DL and UL throughput for a given sub-band and include the impact of other spatially multiplexed users. Further, performance improvement may be possible by also including interference awareness as described herein.

BASE SINR (e.g., UL & DL BASE SINR)

In some examples, an expected throughput for a given scheduling decision may be computed (such as by UL & DL BASE SINR 720 of FIG. 7) as the sum of the expected throughput across sub-bands which in turn is computed from the resulting MCS on that sub-band and the error rate. As described herein, a look-up-table (LUT) MCS_LUT based on an effective SNR may be used to determine the MCS which in turn determines the throughput. Hence, in some examples, a method of predicting the throughput of a potential allocation decision includes computing (such as by UL & DL BASE SINR 720 of FIG. 7) an effective SINR from which the MCS can be predicted and thus also the throughput. In the following, that effective or expected SINR is, in some examples, called BASE SINR. A sounding SNR may be computed from the sounding channel knowledge and the transmit power. This sounding SINR may then be adjusted by the user margin, and the subMar, to produce a separate UL and DL BASE SINR. For example, the base SINR may be found by subtracting a margin particular to a user (e.g., userMargin) and a margin particular to a sub-band (e.g., subMar) from the sounding SINR. In some examples, a coUserLoss may also be subtracted from the sounding SNR to provide the base SINR. Equation (10) provides an example equation for calculating base SINR where $SINR_{base}(SB_k)$ is the base SINR for sub-band k, $SNR_{Sounding}(SB_k)$ is the sounding feedback for sub-band k, userMargin is the determined user margin for a user allocated to sub-band k, $subMar(SB_k)$ is the per-stream margin for sub-band k, and $coUserLoss(SB_k)$ is a loss from the presence of co-channel users.

$$SINR_{base}(SB_k) = SNR_{sounding}(SB_k) - \text{userMargin} - \text{subMar}(SB_k) - \text{coUserLoss}(SBk) \qquad \text{Equation (10)}$$

$$\text{Throughput}(SBk) = f(SINR_{base}(SB_k)) \qquad \text{Equation (11)}$$

In some examples, and from the BASE SINR, the expected throughput from a scheduling decision may then be calculated as shown in Equation (11), where the function f( ) represents a computation from the BASE SINR into an MCS using the look-up-table (LUT) MCS_LUT described herein, and then to throughput based on the allocation size and selected MCS. In examples, if more than one user is allocated to a sub-band, e.g., spatial multiplexing, a separate loss term coUserLoss, may be further inserted into Equation (10) to account for the potential SINR loss from the presence of other co-channel users. This term may be calculated from the sounding channel knowledge at the base node (such as base node 702) that includes information from scheduled co-channel users, all scheduled co-channel users in some examples. By basing an SINR calculation on a loss from the presence of co-channel users, the scheduler may, in some examples, avoid allocating non-spatially compatible users on the same sub-band.

As the allocator (e.g., scheduler 716 of FIG. 7) makes the decision of which sub-band to allocate, when the allocator uses the subMar values, the user of the subMar value(s) may, in some examples, drive allocations to sub-bands with low subMar that may indicate sub-bands with less interference. In some examples, this may be because the SINR calculated using Equation (10) may be larger for a particular sub-band that has a lower subMar. As such, the scheduler, such as scheduler 716 of FIG. 7, may be more likely to schedule communications into sub-bands having a higher SINR. Therefore, sub-bands having a lower subMar may be more likely to be allocated (e.g., scheduled) for communications. An extension of this may be an example where the interference is so strong that the subMar is high enough to push the expected SNR below the threshold for even the lowest MCS. In that example, the allocator (e.g., scheduler 716 of FIG. 7) may choose to not allocate and/or remove existing allocations that falls below this threshold. Thus, a fine-grained subMar combined with a fine grained MCS selection may play an important role in optimizing the system efficiency by avoiding errors but also avoid allocating and/or removing poor sub-bands.

In some examples, the SINR and scheduler allocation discussed herein may be performed for both the UL and DL through the UL & DL BASE SINR (such as UL & DL BASE SINR 720), the UL/DL subMar, and the UL/DL user margin. The scheduler (e.g., scheduler 716) may weigh the UL and DL traffic needs with the UL/DL throughput expectations when allocating a sub-band to a user. For example, a user with only DL traffic demands may be scheduled on a sub-band with a low DL subMar but a high UL subMar since the lower UL throughput may not a problem if an UL MCS low enough for low error rates is available.

Power Based Scheduling

In some examples, increasing the power may improve performance by increasing the relative signal strength of a desired signal over the interference. In some examples, this may also be applicable to cell-edge remote nodes where the signal strength is low and the performance is poor even in the absence of interference. In some examples, if the transmitter has spare power, it may increase the power directly. In some examples, if the transmitter is already using all the power, reduction in the number of sub-bands allocated to a user may occur, and in some examples, an increase in the transmit power per-sub-band may also occur, accordingly. In some examples, this is applicable for both the base node (such as base node 702) and the remote node (such as remote node 704). However, in some examples, it may be more often applied at the remote node. Useful metrics for this decision may include but are not limited to the BASE SINR, subMar, error rate, and the average MCS, as described herein. Hence, in some examples, by using those metrics, the scheduler (such as scheduler 716) may also consider and/or factor in the potential transmit power change in the allocation decision.

As one non-limiting example, a base node (and/or a remote node, etc.) may only be able to transmit or receive signals using up to a threshold value of power. In some examples, the power needed to transmit or receive signals may not reach the power threshold. In other examples, the power threshold may be reached. In some examples, the power threshold may be exceeded. Accordingly, in some examples, a scheduler (e.g., scheduler 116 of FIG. 1) may receive information that the base node (and/or remote node) has not reached its threshold power level. This information may come from one or more sources, such as the BASE SINR, subMar, error rate, and the average MCS, etc. In some examples, the scheduler may use this information to schedule (e.g., allocate) additional and/or alternative sub-bands for a user for signal transmission. In some examples, the scheduler may receive information that the base node (and/or remote node) has already reached its power threshold. In some examples, the scheduler may use this information to not allocate additional sub-bands, and/or unallocated already allocated sub-bands for a user for signal transmission. In some examples, the scheduler may dynamically alter (e.g., change, update, etc.) the number of and/or which sub-bands to allocate based on received information regarding the amount of power a base node (and/or a remote node) is using relative to a power threshold value.

In some examples, although power levels may be explicitly signaled between a transmitter and a receiver, the information may be additionally and/or alternatively obtained from the sounding information. In some examples, the sounding gives the pathloss that can be used to calculate an SINR under different power assumptions. For example, if the remote has a large pathloss but a small allocation, it may use all its power on those subbands. Given that, in some examples, the BN knows the maximum transmit power and the pathloss, it may know that the remote pooled all its power into those few subbands. In this example, a scheduler, such as the scheduler as described herein, might consider adding more subbands to that user since it may appear that that would increase the throughput. In some examples, with the power information described, the remote may then have to spread its power across more subbands and may provide lower throughput improvement than expected or none at all.

Fast-Attack Slow-Decay (FASD) Interference Aware MCS Selection Techniques

In some examples, the systems and methods descried herein may compute the beamforming weights as well as an SINR estimate, RS-SNR, from the reference symbols (RS) transmitted on symbols 1-2 as shown in FIG. 6 described herein. In some examples, a different SINR estimate P-SINR may additionally and/or alternatively be calculated in an analogous manner using the pilots that are transmitted throughout the frame as discussed herein. In some examples, a P-SINR value may calculated for different symbols across the frame yielding a separate value for each subset of symbols. If interference hits both the reference symbols and the pilot symbols, the two SINRs may be (and in some examples, will be) be similar. On the other hand, in some examples, if the interference only hits the pilots but not the reference symbols, the P-SINR calculated based on the interfered symbols of the pilot symbols may be lower than the RS-SINR calculated based on the reference symbols. This may be because the beamforming weights were computed when no interference was present but applied later in the frame when the interference was present. How much lower the P-SINR becomes may in some examples depend on the alignment of the interference and the subset of symbols used in calculating the P-SINR.

For example, if all symbols in the subset are affected, then the computed P-SINR may capture the full impact of the interference. However, if interference only affects a fraction of the symbols in the subset, the computed P-SINR will not reflect the full amount of interference. Note that interference resulting from scheduling other users on the same sub-band may, in some examples, be largely reflected already in the RS-SINR since co-channel users may be present throughout the sub-frame so the interference discussed herein is largely external interference.

In some examples, one way of detecting this condition and avoiding errors may be to compute (e.g., using multi-dimensional interference margin generator 136 of FIG. 1B, and/or MIMG 712 and/or MIMG 728 of FIG. 7) the sub-band margin subMar as the difference between the P-SINR and the RS-SINR and use that subMar in the MCS selection as shown in Equation (11), where the function f( ) represents a computation from the BASE SINR into an MCS using, in some examples, the look-up-table (LUT) MCS_LUT described herein, and then to throughput based on the allocation size and selected MCS.

As one non-limiting example, a UL & DL Base SINR, such as UL & DL Base SINR 720 of FIG. 7, may calculate (e.g., determine, etc.) SINR based on one or more reference symbols (RS) found in a particular place in a given frame. The UL & DL Base SINR may also calculate SINR based on the pilot symbols found in the same or other places found in the given frame. This information may be used by a margin generator, such as multidimensional interference margin generator 136 of FIG. 1B, to determine a margin. For example, the margin generator may find the difference between the SINR calculated for the reference symbols, and the SINR calculated for the pilot symbols. This difference may be used as the margin.

As should be appreciated, the BASE SINR may still be computed from sounding and then subtract out the user margin and the subMar as described herein. In some examples, the subMar in the case of FASD is calculated from the difference of RS-SINR and P-SINR.

As used herein, the difference between the RS-SINR and P-SINR will be referred to as droop. Note that, in some examples, the computations of RS-SINR and P-SINR have different delays so the two values may have to be time aligned as discussed herein.

Given that the interference can hit at any time, it may, in some examples, be desirable to use the minimum P-SINR across the frame when comparing with the RS-SINR to fully detect the interference. In some examples, computing (e.g., using multidimensional interference margin generator 136 of FIG. 1B, etc.) the difference between two estimated quantities of which one is a minimum of several values may result in potentially having a larger variance. In some examples, using a highly variable SINR difference as sub-Mar in the ACM selection as described herein may lead to a highly variable MCS with errors resulting from occasionally selecting too high of an MCS. It is therefore desirable in some examples to filter the droop to reduce the variance of the subMar. In some examples, once interference hits, it may be desirable to react quickly and lower the MCS (e.g., using ACM circuitry 126 of FIG. 1B, etc.) to avoid excessive errors. Filtering to reduce variance may slow down the reaction speed and result in errors while the filter converges.

In some examples, a solution to this is to use two different filters depending on the difference of the current droop and the filtered droop. A current droop larger than the filtered droop may be indicative of the SINR being lower on the payload symbols than at the reference symbols indicating presence of interference. On the other hand, a small droop difference may be indicative of the RS-SINR and the minimum P-SINR being similar, indicating no interference. Hence, with interference, the droop difference may be large and it may be better to use a fast-reacting filter with one set of coefficients. If the droop difference is small, indicating no interference, it may be better to use a slow filter with another set of coefficients. The slow filter may reduce the variance of the steady-state droop and thus the MCS and ensure good performance in the absence of interference. The fast filter may react quickly and result in rapidly increasing droop when interference hits. To allow for a fine-grained MCS and interference awareness, the droop and the subMar may be computed (e.g., using multidimensional interference margin generator 136 of FIG. 1B, etc.) per spatial stream, sub-band, and per-user. As should be appreciated, filter selection may be automatic, manual, or combinations thereof. In some examples, filter selection may be performed by one or more components of system 100 of FIGS. 1A and 1B, and/or system 700 of FIG. 7. In some examples, filter selection may be performed by UL ACM 714 and/or DL ACM 718 of FIG. 7, and/or ACM circuitry 126 of FIG. 1.

In some examples, systems and methods described herein may comprise and/or include a filter selection defined in the pseudo-code in Algorithm (5) where a droop larger than subMar selects the fast attach filter (alphaFA) and otherwise the slow-decay alphaSD. For example, if the droop is large, we may select alphaFA that could be 0.1 meaning that we incorporate 90% of the droop immediately. If the droop is small we may select alphaSD that could be 0.9999, which means that we may only incorporate 0.0001 of the new value resulting in a slow decay.

In example systems described herein, sub-bands may be dynamically allocated (e.g., using scheduler 116 of FIG. 1B, scheduler 716 of FIG. 7, etc.) and one sub-band that is allocated one frame may not be allocated to the same user or not allocated at all. Hence, the updating of the subMar may depend on if a sub-band is allocated or not. In some examples, if it is allocated, the fast-attack slow-decay filters may be used but if a sub-band is not allocated a different approach is needed. In some examples, one way is to just use the slow filter but, in many cases, it may be important to keep the subMar high after an interference event such that if interference returns, the droop and subMar is already high and the MCS select is low enough to avoid errors. Hence, a separate even slower decay may be considered for un-allocated sub-bands. The different steps in the fast-attack slow-decay (FASD) subMar interference aware MCS selection algorithm are summarized in Algorithm (5), below.

---

Algorithm (5)

---

If subband is allocated
    Compute droop per stream and subband in dB as
        droop(sb,strm) = max(min(RsSinr(sb,strm),high_threshold), ---
Algorithm (5)
---

```
low_threshold) - max(min(min_psym[
PSINR(sb,strm,psym)],high_threshold),low_threshold)
Compute droop(sb) per subband as max droop(sb,strm) across streams, offset droop
based on number of streams, and limit to positive droop in dB
        droop(sb) = max [ max_strm [droop(sb,strm)]- expDroop[numStrms], 0]
Filter allocated subbands using FASD filter with two alphas to get the per- sub-band
margin in dB
        if droop(sb) > subMar(sb)
                alpha = alpha_FA
            else
                alpha = alpha_SD
        where alpha_FA = 0.1 and alpha_SD=0.9999
        subMar(sb) = (alpha)*subMar(sb) + (1-alpha)*droop(sb)
    else
Update per subband counter k_sb =k_sb +1, once allocated, reset counter k_sb =0
    If k_sb > smFrameThr
        subMar(sb) = subMar(sb)*beta_sm, k_sb =0
    where smFrameThr and beta_sm are selected for desired long-term decay and
subMar is in dB.
```

Pseudo Code for FASD subMar Computation

Algorithm (5) contains additional and/or alternative details of the subMar computations described herein. In some examples, since the estimate of the RS-SINR and P-SINR may contain very large or very small values it is important in some examples to limit the range of these in the droop computation to avoid outsized impact from a few values. Hence, both the RS-SINR and P-SINR may be limited by a high threshold and low_threshold value. In some examples, various components of systems described herein may perform the thresholding. In some examples, MIMG module 136 of FIGS. 1 and/or 712 and/or 728 may perform the thresholding. Other component may singularly or in combination may additionally and/or alternately perform the thresholding. This thresholding may additionally and/or alternatively limit the variation in the high and low SNR regime further reducing the variance in the absence of interference. Although a subMar may have been computed (e.g., by multidimensional interference margin generator 136 of FIG. 1B, and/or MIMG 712 and/or MIMG 728 of FIG. 7) per-sub-band as well as stream, the pseudo code may be used by a UL & DL Base SINR, such as UL & DL Base SINR 720 of FIG. 7, to compute the maximum droop across streams offset by an expected droop. The expected droop may be due to the fact that the statistics of computing the minimum value across multiple values may introduce a negative bias. The two estimated SINRs may also inherently have different bias due to different estimators. The expected droop may thus compensate for this, and limits the droop to only positive values to avoid an SNR boost from a negative droop.

Although many different types of filter structures may be used to filter the droop to produce the subMar, and the many different types of filters are contemplated to be within the scope of this disclosure, in some examples, an Infinite Impulse Response (IIR) filter is used in the pseudo code in Algorithm (5), where the alpha coefficients may be selected based at least on the droop exceeding a current (e.g., present) subMar value. Examples of coefficients producing a fast filter alpha_FA=0.1 and slow-filter alpha_SD=0.9999, however, it should be appreciated that many other coefficients may be used and are contemplated to be within the scope of this disclosure.

In some examples, if the sub-band no longer is allocated, the stored subMar may use an exponential decay although other decay mechanisms can be used. Here, to reduce the HW and DSP processing, a counter may be used to only decrease every smFrameThr. In some examples, decay parameter beta_sm may also be selected as a value close to unity for slow decay. For example, selecting beta_sm=0.99995 and smFrameThr=200 may result in a 99% reduction of the sub margin in a day. The example pseudo code may be implemented in dB, but may also be implemented in non-logarithmic values.

The pseudo-code in Algorithm (5) may first be used by a UL & DL Base SINR, such as UL & DL Base SINR 720 of FIG. 7, to compute droop per-sub-band and per-stream and may then a margin generator may use the computed droop to select the largest droop across all allocated streams on a sub-band to yield a subMar per-sub-band and per-number-of-streams-per-user. In some examples, the droop may be computed inside of an MIMG as described herein. In some examples, additional and/or alternative components of systems described herein may compute the droop. In some examples, the impact of interference may depend on the spatial signatures of the interferer and the weights selected by each of the user's streams. For example, it may be possible that a single stream is almost unaffected by an interferer but if the same user instead uses two streams the impact of the interference may be severe. In some examples, separating the impact into separate streams is may be quite difficult since the weights may wander from frame to frame meaning that the spatial signature of each stream is wandering and even swapping between streams over time. Given this behavior, it may be advantageous to compute using a margin generator (e.g., multidimensional interference margin generator 136 of FIG. 1B) a per-sub-band per-number-of-streams subMar rather than a single per-sub-band subMar or a per-sub-band per-stream subMar, such as methods described herein. In some examples, the pseudo-code in Algorithm (5) may be modified to still compute using a margin generator (e.g., multidimensional interference margin generator 136 of FIG. 1B) the maximum across allocated streams but only update the single stream subMar if only a single stream is allocated to a user on a sub-band. If two streams are allocated to a user on that sub-band, instead, the two stream subMar may be updated, and so forth for more streams. Hence, only one per-sub-band per-number-ofstreams subMar may be updated per frame per-sub-band, advantageously keeping the computations low in some examples.

As should be appreciated, the term per-sub-band per-stream subMar and per-sub-band per-number-of-streams subMar is used interchangeably herein when the subMar is applied in different modules such as ACM and scheduler modules.

TBER Interference Aware Technique

The FASD technique described herein, in some examples, bases the per-sub-band margin subMar computation (e.g., using a margin generator such as multidimensional interference margin generator 136 of FIG. 1B, etc.) at least on the difference between the RS-SINR and the P-SINR to detect instances of interference and lower the MCS through subMar to avoid errors. In some examples, it reacts fast but can in some cases react too fast and then take a long time to recover. In some examples, a goal of the per-sub-band margin is to avoid errors on a portion of the band cause the user margin to go up which may lower the overall system throughput. In some examples, a more direct approach to achieve this goal may be to analyze the transport block errors (TBEs) on a per-sub-band basis. In some examples, this may have the benefit of capturing other types of localized errors that may not show up in the SINR droop computation.

Examples of non-interference types of errors could be hardware (HW) or operator-induced errors. In some examples, using TBE counters may allow for an implementation that requires more persistent errors over several frames to react which may result in better overall system performance rather than quickly reacting to a single frame of heavy interference as the FASD may do depending on parameter choices. Non-persistent errors may be resolved by retransmission schemes such as ARQ/HARQ. Using TBE counters for subMar may also allow for a more precise control of the target TBE rate (TBER) on a per-sub-band basis. It also complements the user margin that controls the TBER on a per-user basis (across all sub-bands and streams) also using TBE counters.

The per-user margin technique herein may be changed to additionally and/or alternatively operate on a per-sub-band basis. In some examples, with only a single sub-band, the accumulation of TBEs and TBs may be substantially slower than for the per-user margin.

In one example, a user may have 256 sub-band-streams allocated corresponding to 256 faster TB/TBE accumulation than a single sub-band and stream. With the goal of detecting the long-term interference landscape of the channel and not reacting to single occurrences, the speed difference between per-user margin and per-sub-band margin in some examples may not be a problem. An example setting is to select a TBER operating point of 1 e-3, N_ERR_INC=90, N_TBLOCK=90,000 corresponding to 90,000/200/4=112.5 s for a down step if low errors and 20 frames for an increase if all TBs in a sub-band are in error. For other operating points, there is a trade-off between time for a down step based on the N_TBLOCK size selection and the stability and increase speed based on the N_ERR_INC selection.

In some examples, another option is to use a drain-based technique where the subMar is decreased or drained by a small amount every frame. This provides a smooth decrease using smaller steps than the per-sub-band version of the user margin. In some examples, this drain may be performed using various components described herein, such as for example, multidimensional interference margin generator 136 of FIG. 1B, and/or MIMG 712 and/or MIMG 728 of FIG. 7. Another benefit of the drain-based technique over extending the per-user-margin based technique is that it may enable fine tuning of the behavior. In such examples, a filtered error counter may be used to decide when the subMar is increased. More details are included in Algorithm (6), where for each frame, the transport block errors (TBEs) per sub-sub-band and stream may be summed across all sub-bands in a sub-band group for each stream.

In one non-limiting example, a margin generator may receive information indicative of the need to reduce (e.g., decrease) the subMar for a particular sub-band. In some examples, this information may be received from various components of system 100 and/or system 700. The information may derive from, in some examples, interference metrics described herein. For example, the information from the interference metrics may indicate there is less (e.g., decreased) channel interference, which may result in the ability to use smaller (e.g., decreased) subMars per sub-band for a given channel. As such, in some examples, the margin generator may, based at least on this information, decrease or drain the subMar by a small amount every frame.

In some examples, a low complexity TBER update DeltaTber may then implemented by subtracting the number of transport blocks (TB) multiplied with a tbeDrain from the TBEs. The tbeDrain is typically selected to be equal to the desired TBER target. A filtered version tbeFilt may then be created by adding DeltaTber to the previous tbeFilt. To avoid negative values that may take a long time to recover from, tbeFilt may be limited to only zero or positive values. Note that due to the transport block striping, the number of TBEs may only be computed on a per-sub-band group basis. If the largest tbeFilt across all allocated streams for a sub-band exceeds a threshold tbeThreshold, the subMar is increased by subMarincStep and tbeFilt reset to zero. For all (or some of the) frames, the subMar is may be decreased by subMarDrain unless subMar is zero.

Algorithm (6)

Filter TBEs per subband and stream to detect subbands with higher error rate
    DeltaTber = sum across all subbands in subband group of sb
    [ TBE(sb,strm,n) - TB(sb,strm,n)*tbeDrain ]
    tbeFilt(sb,strm,n) = max[tbeFilt(sb,strm,n)+DeltaTber, 0]
        tbeDrain is selected based on TBER target
        Use the same update for TBE and TB for all subbands in a subband group
Update subband margin with threshold and drain
    if max$_{strm}$[tbeFilt(sb,strm,n)] > tbeThreshold
        subMar(sb,n) = subMar(sb,n-1) + subMarIncStep
        tberFilt(sb,strm,n) = 0 for all strm
    else
        subMar(sb,n)=subMar(sb,n-1)
    subMar(sb,n) = max[subMar(sb,n)-subMarDrain, 0]

Pseudo Code for TBER subMar Computation

The settings utilized to achieve a specific TBER target may be more involved than for the user-margin based algorithm described herein. The amount drained every frame may, in some example, need to be matched to the increase step size and the number of error threshold among other things. By selecting the subMarDrain as:

$$\text{subMarDrain} = \text{subMarincStep} \ast \text{TBER}/2 \ast \text{TbSBG}/\text{tbeThreshold} \quad \text{Equation (12)}$$

where TbSBG is the total number of TBs in a sub-band group per frame the error rate may be close but not exactly equal to the target error rate. Many variations of Equation (12) are possible to formulate to maintain the desired TBER rate. For example, if subMarincStep=0.1, TbSBG=9 and tbeThreshold=90, then subMarDrain=0.005 TBER. Hence, similar like the other methods described herein, the decreased speed is related to the TBER target. In one example, an error rate of TBER=1 e-3, the subMar decreases 0.005*1 e-3*200*100=0.1 over 100 s. This decay rate is similar to the subMar technique based on the user margin scheme discussed above with a decay of 112.5 s per down step.

In some examples, the pseudo code in Algorithm (6) may be used by, for example, multidimensional interference margin generator 136 of FIG. 1B, to compute a separate tbeFilt per-sub-band and stream and then increases the per-sub-band subMar if the maximum tbeFilt exceeds a threshold. Similar to the discussion on the FASD interference aware technique described herein, it may be advantageous to compute a per-sub-band per-number-of-streams subMar due to different spatial properties of individual streams and interference. Modifying the pseudo-code in Algorithm (6) to compute by, for example, multidimensional interference margin generator 136 of FIG. 1B, the DeltaTber as the sum across allocated streams and then update the single stream tbeFilt if only a single stream is allocated to a user on a sub-band and so forth for more streams. The per-sub-band per-number-of-stream subMar may be updated by comparing the tbeFilt for the corresponding number of streams with the threshold. In some examples, one per-sub-band per-number-of-streams subMar is updated per frame per-sub-band keeping the computations low.

As stated throughout, the term per-sub-band per-stream subMar and per-sub-band per-number-of-streams subMar will be used interchangeably, such as, for example, when the subMar is applied in different modules such as ACM and scheduler modules.

Allocator (e.g., Scheduler) Multi-Stream Behavior

In some examples, an allocator (e.g., a scheduler, such as scheduler 116 of FIG. 1, scheduler 204 of FIG. 2, and/or scheduler 716 of FIG. 7) may choose to allocate multiple streams to a user in a sub-band and the impact of interference may be quite different depending on how many streams are allocated. Although the channel knowledge from sounding may show that a user is capable of supporting a two-stream transmission, the interference environment may not enable the user to reliable spatially multiplex two streams and maintain a good user throughput. This may be especially common for dual polarized antenna systems where the interference may be primarily of one polarization.

In instances like these, it may be desirable for the scheduler (e.g., a scheduler, such as scheduler 116 of FIG. 1, scheduler 204 of FIG. 2, and/or scheduler 716 of FIG. 7) to get that direct feedback and therefore increase the allocations in the frequency domain instead of the spatial domain.

It is therefore important, in some examples, to have a fine-grained subMar approach also in terms of streams. Given that the per-stream beamforming weights are constantly changing, it may be difficult to designate a separate subMar per stream. In some examples, an alternate approach may be to calculate a separate subMar based on the number of streams and not the stream index as discussed herein. For example, if the beamformers are not capable of cancelling the interference when operating two streams, the two stream subMar might be high but the single stream subMar might be low.

In some examples, adding an extra stream may not only result in a lower SINR for the added stream but may also lower the SINR the existing streams and increase the user's error rate. This may be difficult to predict but a robust and conservative approach may be to emphasize the degradation of adding streams by using a multiplier on the subMar term in the computation of the expected SINR in Equation (11) which is then used in Equation (10) to estimate the predicted throughput. For example, if the single stream subMar is 0.1 and the two stream subMar is 9.0, the expected throughput addition by adding a second stream may be based on an expected SINR that is almost 18 dB lower than the first stream if using a multiplier of two. Such a low SINR may result in a relatively small throughput increase by adding a second stream so the allocator decision may be incentivized to not add the extra stream. This improves the overall efficiency of the network since allocating low SINR sub-band streams lowers the throughput per resource. Although the examples above use two streams, it should be appreciated that it may be extended to more streams. In some examples, and additional and/or alternative technique that may be more complex may have the scheduler (such as scheduler 716) reduce the expected throughput of the existing streams when adding more streams based on the difference in per-number-of-streams subMar.

A scheduler (e.g., a scheduler, such as scheduler 116 of FIG. 1, scheduler 204 of FIG. 2, and/or scheduler 716 of FIG. 7) making allocation decisions (e.g., allocating additional sub-bands, allocating sub-bands, swapping out and/or changing sub-bands, etc. for a user for a given communication) based on information received from various sources, such as interference metrics, has been described throughout.

Adaptive Rate of Change of subMar

Figure 13:
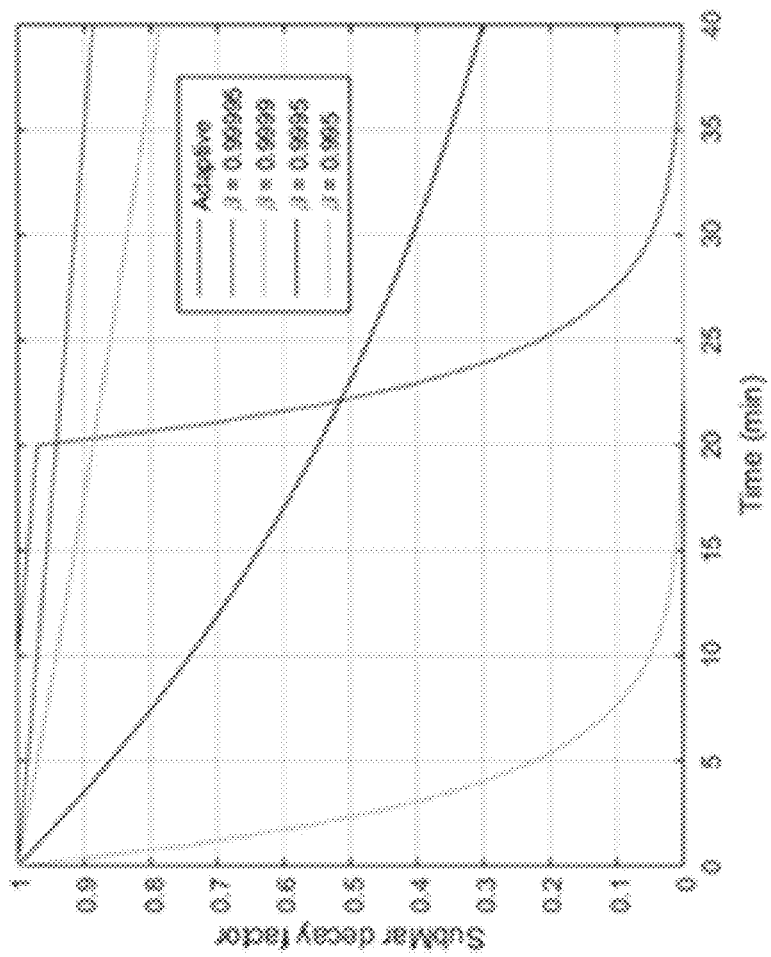
FIG. 13 is an example schematic illustration of an adaptive subMar decay with three regions, arranged in accordance with examples described herein.

In some examples, there may be a desire to have an adaptive decay of the subMar when a sub-band is not allocated. In some examples, the rate of decay may be controlled through the parameter beta as shown in Algorithm (5) which may be applicable to both FASD and TBER interference aware subMar. If a burst of interference has brought the subMar up to a high value for a portion of the band and the allocator has deallocated those sub-bands, it is important in some examples to not lower the subMar too quickly. If the subMar goes down quickly, the allocator may decide to bring those sub-bands back causing another burst of errors. In some examples, if this happens frequently, the link performance may suffer. Hence, it is of interest to hold the high value for some time but not for many hours or days which would be the case if a uniform decay rate is used to meet the requirement of holding the subMar to avoid frequent re-allocations. The interference techniques described herein may use a similar mechanism as outlined in Algorithm (3) for the user margin to implement an adaptive decay rate of the subMar by using a reduction counter that is increased for consecutive decreases in the subMar. In some examples, one possible way of implementing that is to use the number of consecutive drains to index into a drain look-up table. An example using a drain look-up table with three regions is shown FIG. 13, where the first 10 mins use a beta=1 which means no decay. The next 10 mins use a beta=0.99995 for a slow decay and after 20 mins a much faster decay beta=0.995 is used to quickly bring down the subMar due to the large number of consecutive decreases indicating that the interference may have disappeared.

As should be appreciated, although the discussion above focused on un-allocated sub-bands, similar techniques may be used to create an adaptive subMar decay also for allocated sub-bands, and such technique are considered to be within the scope of this disclosure. For example, a similar counter for frames since last subMar increase may be used to select a drain from a drain-lookup-table. Similarly, a counter of the number of frames between increases may be used to increase the rate of increase if strong persistent interference hits. In some examples, one way of doing this is by lowering the tbe_threshold if consecutive increases with few frames in between occur. The tbe_threshold parameter may also be made a function of the TBER target to optimize draining speed at different operating points.

As one non-limiting example, a margin generator, such as multidimensional interference margin generator 136 of FIG. 1B, may receive information indicative of channel interference (e.g., high channel interference). As such, the margin generator may, in some examples, generate a large valued subMar to send to the scheduler, such as scheduler 116 of FIG. 1B, to make allocation decisions. In some examples, those channels with high interference may maintain such interference for a prolonged time. However, in some examples, those channels may experience lesser and/or no interference at a later time. As such, the margin generator may implement an adaptive decay rate for the subMar associated with the channels experiencing high interference. In some examples, this may provide the scheduler with information to continue not scheduling the channels with high interference until a later date when those channels have less interference. As should be appreciated, and in some examples, implementing an adaptive decay rate may result in a faster decay when no interference has been present for some time, and in some examples, may enable those sub-bands to be used again.

Signaling

In some examples, the introduction of a per-sub-band margin (subMar) and the connection with the scheduler may introduce new signaling requirements. In some examples, a remote node may compute the subMar locally but in order for the ACM and the scheduler that reside at the base node to account for it, the computed subMar may need to be signaled to the base node. In some examples, on the other hand, the base node may compute the UL subMar locally and, in such examples, there may be no direct need to signal it to the remote node. However, a UL ACM (such as UL ACM 714 of FIG. 7) and a scheduler (such as scheduler 716 of FIG. 7) on the base node may, in some examples, need to know the UL subMar.

For some of the example systems and methods described herein, the DL subMar can be signaled to the ACM and scheduler in the base node in several different ways. In some examples, it is important to design the feedback channels such that they may support a fine-grained approach also to the per-sub-band margin. In some examples, the UL ACM, DL ACM, BASE SINR, and scheduler (as depicted at least in FIG. 7) may account for the DL subMar in different ways so separate solutions for each are possible. In some examples, the UL subMar may be computed locally at the base node and relayed to the ACM module and the scheduler through the UL BASE SINR computation that includes the current UL subMar value. There exist many possibilities for signaling the DL subMar to the ACM and scheduler. While two of those are described below, it should be appreciated that other possibilities are contemplated to be within the scope of this disclosure.

Derate Approach

In some examples, the derating approach may be based at least on derating the estimated DL SINR computed by the remote node with the DL subMar and feed back in the UL FCCH per-sub-band and stream. In some examples, this is the SINR that the ACM module use for selecting the next MCS. In some examples, that would substantially improve the error rate and link performance in presence of interference by accounting for the SINR drop in the MCS selection.

In some examples, the derating approach may be based at least on derating the sounding feedback from the remote node to the base node with the DL subMar, since the scheduler used the DL BASE SINR to decide allocations. With interference present, in some examples, the DL BASE SINR may drop due to the DL subMar derating allowing the scheduler to modify or avoid allocations on interfered sub-bands.

As used herein, derating is generally when a system or component is operated below its normal (and/or maximum) operating limit (e.g., current rating, power rating, voltage rating, etc.). In some examples, this reduces the deterioration rate of the component and minimizes failures attributed to extreme operating conditions. In some examples, operating a system or component below its normal (and/or maximum) operating limit may also prolong the system or component's lifespan. As should be understood, although interference aware ACM may prolong lifespan as described herein, interference aware ACM may have additional and/or alternative benefits, as discussed throughout.

Signaling Approach

In some examples, the signaling approach may be based at least on signaling the DL subMar from the remote node to the base node by extending the UL CCE (e.g., UL CCE 726 of FIG. 7) sounding feedback with the DL subMar. However, that feedback may be relatively slow and an additional fast feedback can be implemented by sending one bit feedback in the UL FCCH (e.g., UL FCCH 724 of FIG. 7) that updates the last known DL subMar from the UL CCE (e.g., UL CCE 726 of FIG. 7) sounding feedback. In some examples, with this approach, a fast per frame update may be received while the full feedback may be received at a slightly slower rate though the UL CCE (e.g., UL CCE 726 of FIG. 7) sounding feedback corresponding to a parsimonious approach in terms of the number of bits. At the base node, the received DL subMar may be then used inside the ACM module (e.g., used by ACM circuitry 126 of FIG. 1B, etc.) when selecting the DL MCS. Conversely, inside the BASE SINR module (such as UL & DL Base SINR 720 of FIG. 7) the DL subMar may be used to lower the DL BASE SINR which may be then sent to the scheduler (such as scheduler 716 of FIG. 7). The same information may also be used inside the scheduler directly to allow the scheduler to modify or avoid allocations on interfered sub-bands.

In some examples, although the first approach (e.g., the derate approach) may require no additional signaling, the base node may not learn the actual DL subMar values explicitly, which may be useful for link monitoring and network optimization. Additionally, in some examples, the sounding feedback may be relatively slow, resulting in slow reaction from the scheduler in removing allocations when interference hits. The direct signaling of the DL subMar with the fast incremental feedback may allow for the scheduler to remove or modify allocations much faster avoiding lingering poor allocations.

In some examples, one of the benefits of the TBER interference aware technique versus the FASD interference aware technique is that the interference aware target TBER may be selected in accordance with the user margins target TBER. The parameter selection is discussed herein, and may be implemented at the base node directly for the UL TBER target of, e.g., interference aware UL MIMG 712 of FIG. 7. In some examples, since the DL subMar may be computed by the DL MIMG 728 of FIG. 7 located in some examples at the remote node, knowledge of the target TBER may be required to align the DL subMar TBER target with the user margin TBER target. In some examples, this may be achieved in many different ways of which one is to add the TBER target to the DL broadcast channel DL PBCH. With that knowledge, the remote node may set the DL subMar parameters to target that TBER. In some examples, various components of system 100 and system 700 described herein may set the DL subMar parameters. In some examples, MIMG 728 and/or sounding 730 may set the DL subMar parameters. In some examples, no such signaling is required for the UL subMar TBER target since, in some examples, both the UL ACM 714 and UL MIMG 712 reside on the base node (see, e.g., FIG. 7) where the target error rate may be known (e.g., see UL TBE 710).

No Data MCS Indicator with Allocate and Interference Awareness

In some examples, a "no data" MCS indicator may be a solution to the problem that even the lowest MCS may not support low error transmissions. This "no data" MCS indicator may also be referred to, in some examples, as the FORBID option since it forbids user data to be striped on the affected sub-bands although these sub-bands may be allocated to this user by the scheduler. In some examples, transport block errors (e.g., TBEs) on FORBID sub-bands may not be included in the user-margin calculation or the TBER calculation but, in some examples, may be included in the per-sub-band subMar.

In some examples, one FORBID use case is cell edge users that may have an allocation with SNRs that fluctuate around the lowest MCS leading to many errors. In some examples, a no data MCS that results in sending just padding may avoid the case where a few poor sub-bands may dominate the throughput performance. In that case, the information bits and the effective throughput will not be impacted by the poor sub-bands since those do not carry any data and do not contribute to the user margin nor the TBER. Similarly, and in some examples, if a poor allocation happens, it takes time for scheduler to update allocations, during which time many errors may accumulate without FORBID and may limit link performance.

In some examples, the no data option may also be used in conjunction with an UL MIMG (such as UL MIMG 712 of FIG. 7), a DL MIMG (such as DL MIMG 728 of FIG. 7), or combinations thereof, to further improve link performance. In some examples, a scenario where the no data option is useful is where the subMar rises up to a point where the allocator decides to remove the allocation. Although the subMar decay may be slow as described herein, at one point it may fall enough to enable a sub-band to get allocated again. In some examples, if the interference still is present, even the lowest MCS may still result in errors. Depending on the rate of decay, this may happen several times and individually for each sub-band resulting in many error events that may limit the link performance. In some examples, this may be avoided by, e.g., the scheduler, using the FORBID option when re-allocating the sub-band. In some examples, if interference still is present, the subMar computed in some examples by multidimensional interference margin generator 136 of FIG. 1, may go up and the sub-band deallocated before the MCS moves out of FORBID. This may be implemented in several ways as described below.

As one non-limiting example, the allocator (e.g., scheduler 716 of FIG. 7, scheduler 116 of FIG. 1B, etc.) or ACM circuitry (e.g., ACM circuitry 126 of FIG. 1, UL ACM 714, and/or DL ACM 718) may mark a sub-band as a FORBID sub-band when an allocation is removed, e.g., by a scheduler, due to poor SINR and/or high subMar as calculated by a margin generator. In some examples, when the subMar has decayed and the sub-band get allocated again, the selected MCS may be FORBID for a long enough duration to have UL MIMG 712 and/or DL MIMG 728 react and increase the subMar if interference still is present. During this time, the UL MIMG 712 and/or DL MIMG 728 may count the TBEs as usual and may update the determined subMar but not the user margin. In some examples, if the interference still is severe enough, the sub-band may be deallocated again, e.g., by a scheduler, without incurring any data errors.

Some examples may start out an allocation with FORBID if the expected or BASE SINR is close to the lowest MCS. The FORBID duration may either be selected as a parameter or from using a threshold of a counter of error free frames.

Allocation Starvation Avoidance

In some examples, the per-sub-band margin, subMar, described herein provides fine-grained control by reducing the MCS or by de-allocating poor sub-bands suffering from interference or other issues. In some examples, it may be possible that all sub-bands have experienced interference as may be seen using the interference metrics described herein, which may result in a high subMar which may preclude allocating any sub-band. In such an example, this may result in no payload due to allocation starvation. Allocation starvation may be more common for the FASD method that quickly may rise when interference hits, as compared to the TBER method that may require consistent interference, with a given on/off pattern, for some time to rise to a high value.

In some examples, if the interference in fact has been reduced (e.g., minimized, eliminated, etc.), it may be possible for a scheduler, such as scheduler 116 of FIG. 1B, etc., to allocate some sub-bands faster than the slow decay of the subMar allows. In some examples, the slow decay may be selected to make the links stable and to avoid repeated error bursts but in the case of no payload at all, it may be better to allocate some sub-bands exploiting the FORBID feature discussed herein. Note that in some examples, the adaptive rate of change described herein may help reduce the starvation occurrences but there may still be a duration (e.g., 10-20 mins) before the subMar decays enough to allow for new allocations.

In some examples, if no sub-bands are possible to allocate to a user due to the BASE SINR for all sub-bands being below the lowest MCS, the sub-band with the highest BASE SINR may be selected. For that sub-band, the subMar may be artificially reduced or the BASE SINR may be artificially increased such that the sub-band becomes possible to allocate. In some examples, several different types of implementations are possible depending on the prevalence of allocation starvation, which are contemplated to be within the scope of this disclosure. In some examples, a conservative option may be to limit the starvation avoidance subMar reduction to a single sub-band that may allow a link to be present but at low throughput until the subMar naturally decreases. In some examples, another more aggressive option may be to lower the subMar or increase the BASE SINR one sub-band at a time using FORBID enabling faster recovery from large interference events at the cost of more variable throughput. In some examples, options in between include limiting the feature to only be active when the number of allocated sub-bands (e.g., when the number of sub-bands possible to allocate) is below a threshold, may additionally and/or alternatively be used.

In some examples, the above may be utilized for sub-bands but allocations are made per-sub-band and stream (e.g., by scheduler 116 of FIG. 1B) and the BASE SINR may be computed per-sub-band and per stream (e.g., by UL & DL Base SINR 720 of FIG. 7). The systems and methods discussed above target going from no stream to a single stream per-sub-band but extensions where the BASE SINR for a second stream is increased is also possible, but other scenarios are contemplated to be within the scope of this disclosure.

Dynamic Base Band Filter Selection

In some examples, wireless communication systems employ a base band analog filter to filter out noise and interference outside the frequencies where the information is sent before digitizing the signal through an analog-to-digital converter (ADC) (e.g., Dual ADC/DAC 104d, 104e, and/or 104f of FIG. 1A). While out-of-band interference can be suppressed to some extent by steep high order baseband analog filtering techniques, in-band interference sources hit the ADC with no attenuation. In some examples, strong in-band interference sources may cause the ADC to saturate and therefore require the system to operate at a lower receive gain, which comes with a worse receiver sensitivity and therefore throughput. In some examples, when these interference sources are spatially resolvable, the penalty of operating with a worse receiver noise figure may be warranted. However, if the interference is not spatially resolvable, and the subMar may increase to level (as computed by, for example, multidimensional interference margin generator 136 of FIG. 1B) where the allocator (such as scheduler 116 of FIG. 1B) would deallocate these sub-bands, then the user may be paying the price of a worse receiver sensitivity with no benefits at all. In some examples, it may be beneficial for the receiver to select a narrower baseband filter bandwidth that filters out the interference, and allows the receiver to operate at a higher gain, therefore improving the user's throughput.

In some examples, although many sources of this noise and interference knowledge exists, some example systems may use the per-sub-band margin subMar to determine the optimal bandwidth that optimizes the user's throughput by improving the receiver sensitivity. In some examples, by matching the subMar with different base band filters, the filter that best suppresses interference while maintaining as much bandwidth as possible is selected. An example is show in FIGS. 14A and 14B, where using a 40 MHz bandwidth filter (FIG. 14A) captures substantial amounts of interference detected using the subMar resulting in a low receive amplifier gain with a poor noise figure. If instead, using a 20 MHz bandwidth filter (FIG. 14B), the interference is suppressed allowing for a higher receive amplifier gain that reduces the noise figure. In some examples, for strong interference, large gains exceeding 10 dB may be possible to achieve in the scenario depicted in FIGS. 14A and 14B.

Figure 14:
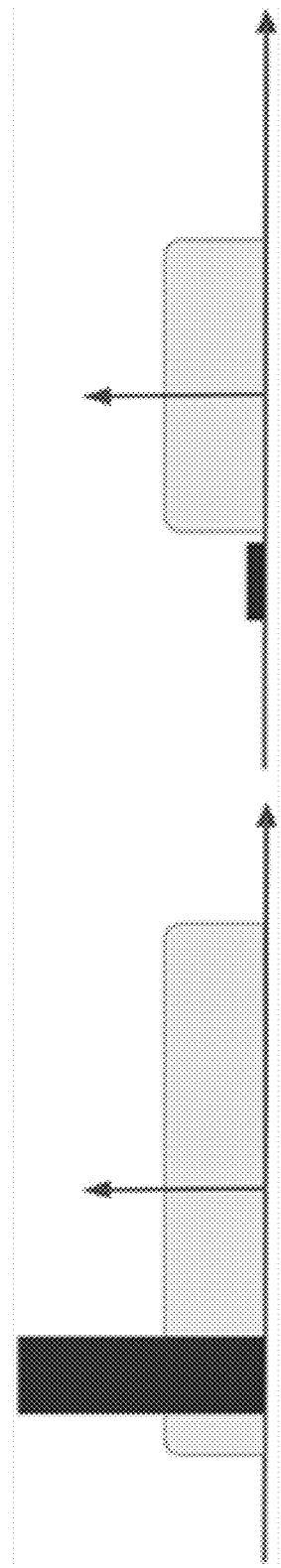
FIG. 14A is an example schematic illustration of a dynamic base band filter selection with 40 MHz filter operating at a low receiver gain, arranged in accordance with examples described herein.
FIG. 14B is an example schematic illustration of a 20 MHz filter operating at a high receiver gain, arranged in accordance with examples described herein.

In some examples, guided at least in part by the subMar magnitude and the received signal strength in different sub-bands, the benefit of different base-band filter may be evaluated on the tradeoff of improved noise figure and reduced bandwidth. In the scenario depicted in FIGS. 14A and 14B, the loss of 10 MHz of spectrum FIG. 14B is compensated by the improved noise figure resulting in overall higher throughput and system performance.

Interference Aware Network Management

In some examples, when operating in unlicensed bands, operators may typically be left with the decision to select an optimal carrier frequency to operate their networks. Although an initial spectrum scan is typically done at the time of the installation, the interference environment may vary with time, resulting in a degraded performance over time.

In some examples, with the explicit feedback of the DL subMar to the base node (such as base node 702 of FIG. 7) through the UL FCCH (e.g., UL FCCH 724 of FIG. 7) and UL CCE (e.g., UL CCE 726 of FIG. 7), the base node may be equipped with a network view of the local DL interference landscape near each of the users, as well as the UL interference landscape that could be impacting some or all of the users in the UL direction. Coupled with the path loss estimates for each of the users, the base SINR (as computed, in some examples, by UL & DL Base SINR 720 of FIG. 7) may be used by a network management system to determine whether the majority of the users are experiencing a throughput that is far from optimal. Specifically, the per-sub-band view of the interference landscape may enable the operators to know exactly how much the operating frequency of the sector needs to be moved by in order to avoid the interference that is not spatially resolvable.

SINR Post-Processing in the Presence of Interference

In some examples, the UL ACM 714 of FIG. 7 and DL ACM 718 of FIG. 7 as described herein may base the MCS selection at least partly on the reference symbols SINR RS-SINR. In some examples, in the presence of interference, the RS-SINR may vary drastically depending on if the interference is present on the reference symbol. In some examples, to maintain a certain transport block error (TBER), the user margin and the per-sub-band per-number of stream margin may adjust (e.g., as calculated by a margin generator, such as multidimensional interference margin generator 136 of FIG. 1B, and/or MIMG 712 and/or MIMG 728 of FIG. 7) based at least on the strength of the channel interference and how often it is present, e.g., in a given frame, and in some examples, relative to a given reference symbol and/or pilot symbol. In some examples, there may be a scenario where the SINR may be 25 dB when interference is not present but drops to 15 dB when interference is present. In order to avoid an excessive TBER, the combination of the two margins may become 10 dB to account for the SINR drop leading to an effective SNR of 15 dB without interference and 5 dB with interference. In some examples, however, when interference is present the actual SINR is 15 dB and selecting the MCS based on just 5 dB instead of 15 dB may result in a throughput loss.

One example of post-processing is to average the SINR in time and use the averaged SINR as one of the inputs to ACM circuitry 126 of FIG. 1B when selecting the MCS. In the example above, if a time averaged SINR is used for MSC selection, the post-processed SINR may be consistently at 20 dB with the resulting combined margins of 5 dB. In this example, the throughput may be substantially higher since the MCS is selected based on effective SINR of 15 dB all the time without the dips to just 5 dB when interference is present. Another benefit of this post-processing is that the variance of the effective SINR may be lower which may further lower the required margins.

As should be appreciated, many other types post-processing may be considered optimizing different performance metrics, and are considered to be within the scope of this disclosure. As one non-limiting example, order statistics may be used to achieve certain TBER rates and/or retransmission rates.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Examples described herein may refer to various components as "coupled" or signals as being "provided to" or "received from" certain components. It is to be understood that in some examples, the components are directly to one another, while in other examples, the components are coupled with intervening components disposed between them. Similarly, a signal(s) may be provided directly to and/or received directly from the recited components without intervening components, but also may be provided to and/or received from the certain components through intervening components.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A communications node comprising:
a plurality of transceivers, wherein each transceiver of the plurality of transceivers is configured to transmit, receive, or both, radio frequency (RF) signals in a frequency band spanning multiple sub-bands of frequencies;
a weight processor coupled to the plurality of transceivers, the weight processor configured to calculate weighted sums of RF signals received at the plurality of transceivers to provide a plurality of streams, or to provide RF signals for transmission by the plurality of transceivers from the plurality of streams in accordance with a set of weights, or both;
circuitry configured to select a modulation and coding scheme per-sub-band and per-stream, based at least on a channel condition metric indicative of interference in the channel, wherein the channel condition metric is provided per-sub-band and per-stream; and
a decoder configured to decode each stream of the plurality of streams, or encode the RF signals for transmission, in accordance with the selected modulation and coding scheme, wherein each decoded stream of the plurality of streams comprises decoded data bits and the encoded RF signals for transmission comprise encoded data bits.

2. The communications node of claim 1, further comprising a multidimensional interference margin generator configured to determine an uplink per-sub-band per-stream margin based at least on the channel condition metric indicative of interference in the channel, and wherein the circuitry is further configured to select the modulation and coding scheme per-sub-band and per-stream based at least on the determined uplink per-sub-band per-stream margin.

3. The communications node of claim 2, wherein the channel condition metric indicative of interference in the channel comprises an uplink reference symbol signal to interference plus noise power ratio metric, an uplink pilot-based signal to interference plus noise power ratio metric, an uplink transport block error metric, or combinations thereof.

4. The communications node of claim 2, further comprising:
a scheduler configured to determine an allocation, wherein the allocation comprises an uplink allocation, a downlink allocation, or combinations thereof, based at least on the determined uplink per-sub-band per-stream margin, a downlink per-sub-band per-stream margin, or a combination thereof.

5. The communications node of claim 4, wherein the circuitry is further configured to select the modulation and coding scheme per-sub-band and per-stream based at least on the determined uplink per-sub-band per-stream margin, the downlink per-sub-band per-stream margin, the determined uplink allocation, the determined downlink allocation, or combinations thereof.

6. The communications node of claim 4, wherein the circuitry is further configured to select the modulation and coding scheme per-sub-band and per-stream based at least on the determined uplink per-sub-band per-stream margin, a per-user margin for all sub-bands and streams in the selection, or combinations thereof.

7. The communications node of claim 1, further comprising:
a switch, communicatively coupled to the circuitry, wherein the switch is configured to receive, from another communications node of a wireless access communication system, the channel condition metric indicative of interference, wherein the another communications node is a remote node.

8. The communications node of claim 1, wherein the circuitry is further configured to select the modulation and coding scheme based at least on a look up table.

9. The communications node of claim 2, wherein the circuitry is configured to select the modulation and coding scheme based at least on selection parameters.

10. The communications node of claim 9, wherein the selection parameters include at least a margin, a hysteresis, or combinations thereof, wherein the margin is different from the determined uplink per-sub-band per-stream margin.

11. The communications node of claim 1, wherein the communications node is a base node.

12. The communications node of claim 7, wherein the another communications node is a base node.

13. The communications node of claim 10, wherein the circuitry is further configured to determine the margin based at least in part on a difference between signal to noise ratio (SINR) estimates from different parts of a frame.

14. The communications node of claim 13, wherein SINR estimates comprise estimates from reference symbols at a beginning of the frame and at least one pilot symbol in the frame.

15. The communications node of claim 3, wherein the multidimensional interference margin generator is further configured to determine the uplink per-sub-band per-stream margin based at least on per-sub-band error information.

16. The communications node of claim 15, wherein the per-sub-band error information comprises codec quality metrics, error-detection codes, or combinations thereof.

17. The communications node of claim 16, wherein the error-detection codes comprise cyclic redundancy check codes available per-sub-band and per-stream.

18. The communications node of claim 13, wherein the circuitry is further configured to filter the SINR difference, wherein the filter comprises a filter with coefficients corresponding to a fast response, a filter with coefficients corresponding to a slow response, or combinations thereof.

19. The communications node of claim 18, wherein the circuitry is further configured to filter the SINR difference using a filter with coefficients corresponding to the fast response when a present value is higher than a filtered value.

20. The communications node of claim 18, wherein the circuitry is further configured to filter the SINR difference using a filter with coefficients corresponding to the slow response when a present value is lower than a filtered value.

21. The communications node of claim 2, wherein the multidimensional interference margin generator is further configured to determine the uplink per-sub-band per-stream margin based at least on a rate of decay based on sub-band stream allocation.

22. The communications node of claim 2, wherein the multidimensional interference margin generator is further configured to adapt the uplink per-sub-band per-stream margin to meet a performance criterion.

23. The communications node of claim 22, wherein the performance criterion comprise a specific error rate, a re-transmission rate, decoder quality performance metrics, or combinations thereof.

24. The communications node of claim 2, wherein the uplink per-sub-band per-stream margin decays over a plurality of frames and increases based at least on a performance criterion.

25. The communications node of claim 24, wherein the performance criterion comprise a specific error rate, a re-transmission rate, decoder quality performance metrics, or combinations thereof.

26. The communications node of claim 2, wherein a rate of decay for the uplink per-sub-band per-stream margin is determined based at least on prior decrease decisions, increase decisions, or combinations thereof.

27. The communications node of claim 2, wherein the circuitry is further configured to adapt a rate of increase for the uplink per-sub-band per-stream margin based at least on one or more prior decrease decisions, increase decisions, or combinations thereof.

28. The communications node of claim 2, wherein a signaling channel for transmitting the uplink per-sub-band per-stream margin is beamformed using one or more of a plurality of antennas, wherein the signaling channel comprises a control channel element (CCE) channel, a fast control channel (FCCH), or combinations thereof.

29. The communications node of claim 2, wherein the circuitry is further configured to separate the uplink per-sub-band per-stream margin for transmission into a slower signaling channel and a faster signaling channel, wherein the slower signaling channel comprises a CCE and a faster signally channel comprises an FCCH.

30. The communications node of claim 4, wherein the scheduler is configured to determine the allocation based at least on an expected throughput per-sub-band per-stream.

31. The communications node of claim 30, wherein the scheduler is configured to determine the expected throughput per-sub-band per-stream based at least on channel sounding, transmit power, the uplink per-sub-band per-stream margin, or combinations thereof.

32. The communications node of claim 30, wherein the scheduler is configured to determine the expected throughput per-sub-band per-stream based at least on SINR, BASE SINR, or combinations thereof, and wherein the SINR, the BASE SINR, or combinations thereof are determined based at least on channel knowledge, transmit power, interference knowledge, spatial properties of co-channel users, or combinations thereof.

33. The communications nodes of claim 1, wherein selection of a modulation and coding scheme for a certain sub-band results in transmitting bits other than the encoded data bits, the decoded data bits, or combinations thereof.

34. The communications nodes of claim 33, wherein the bits other than the encoded data bits, the decoded data bits, or combinations thereof, comprise padding bits.

35. The communications node of claim 7, wherein the remote node comprises baseband analog filters including noise or interference suppression different from the communications node filters.

36. The communications node of claim 35, wherein the remote node is configured to select a baseband analog filter based at least on interference impact.

37. The communications node of claim 36, wherein the baseband analog filter selection comprises a margin, a BASE SINR, or combinations thereof.

38. The communications node of claim 1, wherein the circuitry is configured to select an initial modulation and coding scheme per-sub-band and per-stream for a new allocation based at least on channel information, wherein the channel information comprises channel feedback, transmit power, or combinations thereof.

39. The communications node of claim 1, wherein the circuitry is configured to select the modulation and coding scheme based at least on a post-processed SINR, wherein the post-processed SINR comprises SINR averaging.

40. The communications node of claim 1, wherein the circuitry comprises multidimensional interference aware adaptive modulation and coding scheme circuitry.

41. The communications node of claim 4, wherein the scheduler is an interference aware scheduler.

42. A method comprising:
receiving at least one channel condition metric per-sub-band and per-stream indicative of interference from a communication node of a wireless access system having a plurality of communication nodes;
selecting, based at least on the channel condition metric, a selected modulation and coding scheme per-sub-band and per-stream; and
transmitting an identification of the selected modulation and coding scheme to the communication node.

43. The method of claim 42, wherein the selecting is based at least on determining an uplink per-sub-band per-stream margin.

44. The method of claim 43, wherein determining the uplink per-sub-band per-stream margin is based at least on an uplink reference symbol signal to interference plus noise power ratio metric, an uplink pilot-based signal to interference plus noise power ratio metric, an uplink transport block error metric, or combinations thereof.

45. The method of claim 44, further comprising:
determining an allocation, wherein the allocation comprises an uplink allocation, a downlink allocation, or combinations thereof, based at least on the determined margin.

46. The method of claim 45, wherein the selecting is based at least on the determined uplink per-sub-band per-stream margin, a per-user margin for all sub-bands and streams in the selection, or combinations thereof.

47. The method of claim 42, wherein the selecting is based at least on a look up table.

48. The method of claim 42, wherein the selecting is based at least on selection parameters.

49. The method of claim 48, wherein the selection parameters include at least a margin, a hysteresis, or combinations thereof.

50. The method of claim 43, wherein determining the uplink per-sub-band per-stream margin is based at least in part on determining a difference between signal to noise ratio (SINR) estimates from different parts of a frame.

51. The method of claim 50, wherein SINR estimates comprise estimates from reference symbols at a beginning of the frame and at least one pilot symbol in the frame.

52. The method of claim 50, further comprising:
filtering the SINR difference using a filter with coefficients corresponding to a fast response when a current value is higher than a filtered value.

53. The method of claim of claim 42, further comprising:
determining, by a network management system, operating parameters including carrier frequency, carrier bandwidth, or a combination thereof, of network components based at least in part on a channel condition metric indicative of interference per-sub-band, per-stream, and per-link.

54. The method of claim 42, wherein signaling of the channel condition metric indicative of interference is per-sub-band, per-stream, and per-user.

55. The method of claim 45, wherein a number of streams to allocate is based in part on the per-sub-band, per-stream, and per-user channel condition metric indicative of interference.

56. The method of claim 42, further comprising:
performing allocation starvation avoidance based at least in part on adjusting the per-sub-band, per-stream, and per-user channel condition metric indicative of interference.

57. The method of claim 45, further comprising a modulation and coding scheme per-sub-band, per-stream, and per-user carrying no data or FORBID of data on one or more sub-bands, streams, and users.

58. The method of claim 57, wherein errors occurring on the one or more sub-bands, streams, and users with the no data modulation and coding scheme does not impact margins.

* * * * *